(12) United States Patent
Chen et al.

(10) Patent No.: US 12,361,711 B2
(45) Date of Patent: Jul. 15, 2025

(54) SLOW-MOTION VIDEO SHOOTING METHOD AND ELECTRONIC DEVICE

(71) Applicant: Huawei Technologies Co., Ltd., Shenzhen (CN)

(72) Inventors: Rui Chen, Shenzhen (CN); Yu Li, Shenzhen (CN); Di Zhang, Shenzhen (CN); Bin Chen, Shenzhen (CN); Xingguang Song, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 547 days.

(21) Appl. No.: 17/699,510

(22) Filed: Mar. 21, 2022

(65) Prior Publication Data

US 2022/0230438 A1   Jul. 21, 2022

Related U.S. Application Data

(63) Continuation of application No. PCT/CN2020/115885, filed on Sep. 17, 2020.

(30) Foreign Application Priority Data

Sep. 19, 2019   (CN) .......................... 201910888945.4

(51) Int. Cl.
*G06V 20/40* (2022.01)
*G06V 40/20* (2022.01)
(Continued)

(52) U.S. Cl.
CPC .............. *G06V 20/46* (2022.01); *G06V 40/23* (2022.01); *G11B 27/034* (2013.01); *G11B 27/34* (2013.01); *H04N 23/80* (2023.01)

(58) Field of Classification Search
CPC ...... G06V 20/46; G06V 40/23; G11B 27/034; G11B 27/34; H04N 23/611; H04N 23/62;
(Continued)

(56) References Cited

U.S. PATENT DOCUMENTS 10,187,607 B1 * 1/2019 Delachanal .......... H04N 23/951
10,388,322 B1   8/2019 Pena et al.
(Continued)

FOREIGN PATENT DOCUMENTS

CN   102611865 A   7/2012
CN   102957864 A   3/2013
(Continued)

*Primary Examiner* — Matthew C Bella
*Assistant Examiner* — Andrew B. Jones
(74) *Attorney, Agent, or Firm* — Conley Rose, P.C.

(57) ABSTRACT

A slow-motion video shooting method includes detecting that a preset motion occurs on a main object in a video stream; determining a first video clip in the video stream based on the preset motion; determining a first frame rate based on the preset motion; and processing the first video clip based on the first frame rate to obtain a second video clip, where a play time of the second video clip at a target play frame rate is greater than a collection time of the first video clip, and the first frame rate is greater than the target play frame rate. When a main object for shooting moves, the first video clip, for example, a highlight clip, is obtained from the video stream, so that an electronic device can accurately capture a highlight moment of the main object.

20 Claims, 35 Drawing Sheets

(51) Int. Cl.
*G11B 27/034* (2006.01)
*G11B 27/34* (2006.01)
*H04N 23/80* (2023.01)

(58) Field of Classification Search
CPC ...... H04N 23/667; H04N 23/80; H04N 5/144;
H04N 5/783; H04N 5/76; H04N 23/681
See application file for complete search history.

(56) References Cited

U.S. PATENT DOCUMENTS

| | | | |
|---|---|---|---|
| 11,917,291 B2* | 2/2024 | Baek | H04N 5/04 |
| 2010/0045812 A1 | 2/2010 | Miyakoshi | |
| 2010/0053345 A1 | 3/2010 | Kim et al. | |
| 2011/0255845 A1 | 10/2011 | Kikuchi | |
| 2012/0189287 A1 | 7/2012 | Otani | |
| 2017/0180653 A1* | 6/2017 | Kang | H04N 5/2621 |
| 2018/0192091 A1* | 7/2018 | Berglund | G11B 27/005 |
| 2019/0082108 A1 | 3/2019 | Kinoshita et al. | |
| 2019/0204930 A1* | 7/2019 | Li | G06F 3/0304 |
| 2020/0389591 A1* | 12/2020 | Liu | H04N 5/772 |
| 2022/0301351 A1* | 9/2022 | Zhao | H04N 23/61 |

FOREIGN PATENT DOCUMENTS

| | | | | |
|---|---|---|---|---|
| CN | 104967803 A | | 10/2015 | |
| CN | 105812853 A | * | 7/2016 | |
| CN | 107396019 A | * | 11/2017 | ......... H04N 21/4334 |
| CN | 108184165 A | * | 6/2018 | ........ H04M 1/72555 |
| CN | 109376266 A | | 2/2019 | |
| CN | 107396019 B | | 5/2019 | |
| CN | 110086905 A | | 8/2019 | |

* cited by examiner

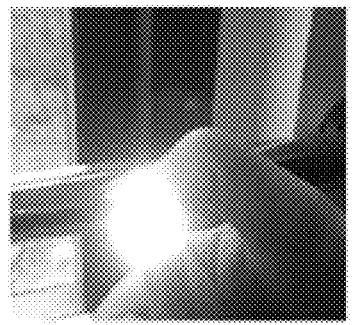
FIG. 7A
FIG. 7B
FIG. 7C
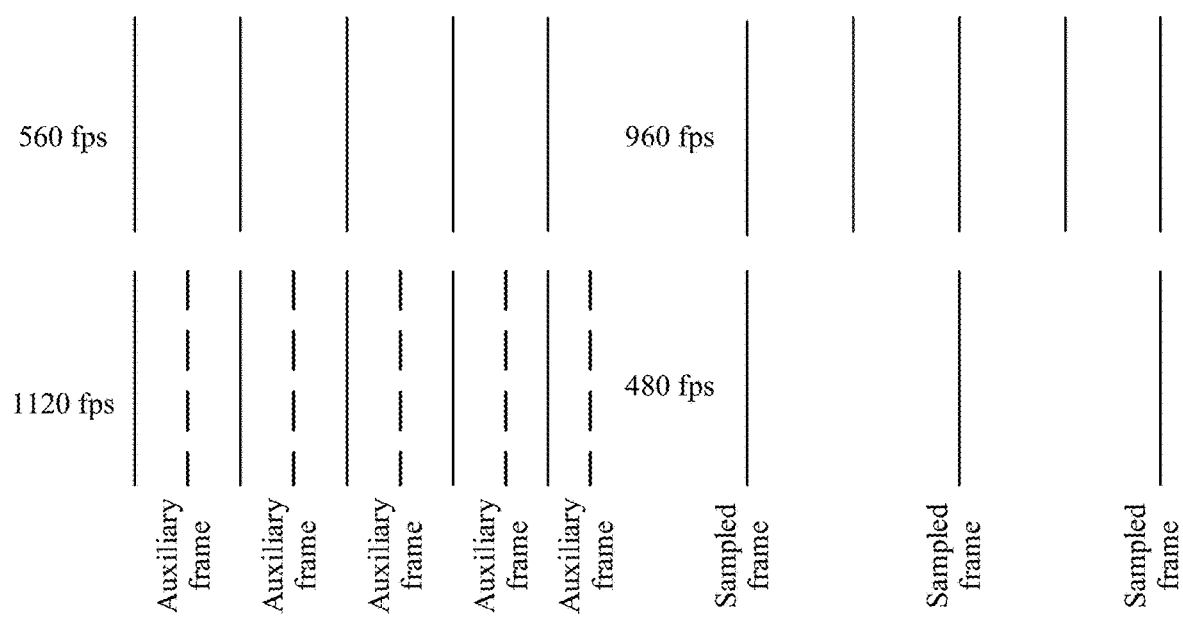
FIG. 7D
FIG. 7E

SLOW-MOTION VIDEO SHOOTING METHOD AND ELECTRONIC DEVICE

CROSS-REFERENCE TO RELATED APPLICATIONS

This is a continuation of International Patent Application No. PCT/CN2020/115885 filed on Sep. 17, 2020, which claims priority to Chinese Patent Application No. 201910888945.4 filed on Sep. 19, 2019. The disclosures of the aforementioned applications are hereby incorporated by reference in their entireties.

TECHNICAL FIELD

This application relates to the field of video shooting, and in particular, to a slow-motion video shooting method and an electronic device.

BACKGROUND

Slow-motion shooting is a novel shooting manner. Currently, shooting a slow-motion video is to manually obtain a wonderful moment of a main object by a person by using an electronic device. However, the person cannot accurately determine occurrence of the wonderful moment of the main object, and therefore cannot obtain the moment of the main object by using the electronic device. This causes poor use experience to the user.

SUMMARY

Embodiments of this application provide a slow-motion video shooting method and an electronic device, to help accurately obtain a wonderful moment of a main object, and improve user experience.

According to a first aspect, an embodiment of this application provides a slow-motion video shooting method, including: detecting that a preset motion occurs on a main object in a video stream; determining a first video clip in the video stream based on the preset motion; determining a first frame rate based on the preset motion; and processing the first video clip based on the first frame rate to obtain a second video clip, where a play time of the second video clip at a target play frame rate is greater than a collection time of the first video clip, and the first frame rate is greater than the target play frame rate.

It should be understood that the first video clip and the second video clip each are a combination of a group of video frames, and play duration of the video clip is related to a frame quantity and a play frame rate of the video clip.

When a main object for shooting moves, the first video clip (namely, a highlight clip) is obtained from the video stream, so that an electronic device can accurately capture a highlight moment of the main object. This improves user experience.

With reference to any one of the first aspect or the foregoing possible implementations, in a possible embodiment, the main object in the video stream is a non-human object, and the detecting that a preset motion occurs on a main object in a video stream includes: detecting that displacement of the non-human object occurs in a shooting scene.

Further, before detecting that the motion occurs on the main object, the method in this application further includes: detecting displacement of the non-human object in the video stream.

With reference to any one of the first aspect or the foregoing possible implementations, in another possible implementation, the main object in the video stream is a person, and the detecting that a preset motion occurs on a main object in a video stream includes: detecting that the person makes a target posture in a shooting scene.

Further, before it is detected that a motion posture of the main object is the target posture, the method in this application further includes: detecting a posture of the person in the video stream in the shooting scene.

The displacement or the posture of the main object in the shooting scene is detected, to avoid an operation of determining the first video clip in the video stream mistakenly triggered by shake of the electronic device or a slight change of an image.

With reference to any one of the first aspect or the foregoing possible implementations, in another possible embodiment, before the determining a first video clip in the video stream based on the preset motion, the method in this application further includes: when a slow-motion video recording function is enabled or after a slow-motion video recording function is enabled, obtaining a detection image from the video stream, and detecting that a main object in the detection image is a person or a non-human object.

When the slow-motion video recording function is started or after the slow-motion video recording function is started, the detection image is obtained from the video stream, and detection is performed on the detection image. If it is detected that the main object is a stationary object or an object that cannot be recognized by the electronic device, the electronic device continues to obtain a detection image from the video stream for performing detection. Optionally, obtaining the detection image from the video stream for performing detection may be: obtaining the detection image from the video stream in real time for performing detection, or obtaining one frame of image from the video stream as the detection image at a time interval of x for performing detection until it is detected that the main object is a person or a non-human object.

With reference to any one of the first aspect or the foregoing possible implementations, in another possible embodiment, the determining a first video clip in the video stream based on the preset motion includes: obtaining a first target image from the video stream, where the first target image is an image that is in the video stream and that corresponds to a moment at which the main object has largest acceleration in a process of the preset motion; obtaining a timestamp $t_{w1}$ of the first target image in the video stream; and obtaining the first video clip based on the timestamp $t_{w1}$ of the first target image and a time span t of the first video clip, where a timestamp of a start frame of the first video clip is $t_2=t_{w1}-at$, a timestamp of an end frame of the first video clip is $t_3=t_{w1}+bt$, a and b are constants, a+b=1, and the first video clip includes an image with a timestamp not less than $t_2$ and not greater than $t_3$.

It should be noted herein that the moment at which the main object has the largest acceleration is a moment at which a velocity change of the main object is the largest.

For example, t=0.8 s, a is 0.4, and b is 0.6. In this case, the timestamp of the start frame of the first video clip is $t_2=t_{w1}-0.32$ s, and the timestamp of the end frame is $t_3=t_{w1}+0.48$ s. In other words, in the video stream, image frames with a time span of 0.8 s is selected by using the first target image as a center, to obtain the first video clip, where the first video clip includes the first target image.

It should be noted that the first target image shows that the preset motion of the main object occurs, for example, in the case of shooting a slow motion of landing of a small ball, a preset motion is that the small ball starts to bounce after it touches the bottom, and for another example, in the case of a slow motion of making a fire with a lighter, the preset motion is that the lighter starts to burst out sparks.

With reference to any one of the first aspect or the foregoing possible implementations, in another possible embodiment, the determining a first video clip in the video stream based on the preset motion includes: obtaining a second target image from the video stream, where a timestamp of the second target image is a moment at which a preset to-be-captured action of the main object is detected; obtaining a timestamp $t_{w2}$ of the second target image in the video stream; and obtaining the first video clip from the video stream based on the timestamp $t_{w2}$ of the second target image and a time span t of the first video clip, where a timestamp of a start frame of the first video clip is $t_2=t_{w2}-at$, a timestamp of an end frame of the first video clip is $t_3=t_{w2}+bt$, a and b are constants, a+b=1, and the first video clip includes an image with a timestamp not less than $t_2$ and not greater than $t_3$.

For a non-human object, for example, in the case of landing of a small ball, a preset to-be-captured action is that the small ball starts to bounce after it touches the bottom; for example, in the case of making a fire with a lighter, a preset to-be-captured action is that the lighter bursts out sparks. For a person, in the case of jumping, a preset to-be-captured action is leaping from the ground.

With reference to any one of the first aspect or the foregoing possible implementations, in another possible embodiment, the determining a first video clip in the video stream based on the preset motion includes: obtaining a third video clip from the video stream, where the third video clip is a video clip including a preset to-be-captured action; obtaining a timestamp $t_{q1}$ of a start frame and a timestamp $t_{s1}$ of an end frame of the third video clip; and obtaining the first video clip based on the timestamp $t_{q1}$ of the start frame and the timestamp $t_{s1}$ of the end frame of the third video clip and a time span t of the first video clip, where a timestamp of a start frame of the first video clip is $t_2=t_{q1}-at$, a timestamp of an end frame of the first video clip is $t_3=t_{s1}+bt$, a and b are constants, $at+bt+t_{s1}-t_{q1}=t$, and the first video clip includes an image with a timestamp not less than $t_2$ and not greater than $t_3$.

For example, in the case of shooting a slow motion of landing of a small ball, the third video clip is a video clip including that the small ball starts to bounce after it touches the bottom. For another example, in the case of a slow motion of making a fire with a lighter, the third video clip is a video clip including that the lighter starts to burst out sparks until flame burns out. For another example, in the case of shooting a slow motion of waving a hand, the third video clip is a video clip including waving the hand left and right or up and down.

With reference to any one of the first aspect or the foregoing possible implementations, in another possible embodiment, the determining a first video clip in the video stream based on the preset motion includes: obtaining a third target image from the video stream; obtaining a timestamp $t_{w3}$ of the third target image in the video stream, where the timestamp $t_{w3}$ is a moment at which the person or an object starts to move; and obtaining the first video clip based on the timestamp $t_{w3}$ of the third target image and a time span t of the first video clip, where a timestamp of a start frame of the first video clip is $t_2=t_{w3}$, a timestamp of an end frame of the first video clip is $t_3=t_{w3}+t$, and the first video clip includes an image with a timestamp not less than $t_2$ and not greater than $t_3$.

It should be noted that the moment corresponding to the timestamp of the third target image is a moment at which the person makes the target posture in the shooting scene or a moment at which displacement of the non-human object occurs in the shooting scene.

According to this embodiment, the first video clip (namely, a highlight clip) can be obtained based on a motion or an action of the main object, to resolve a problem that a user cannot accurately determine a moment at which a wonderful moment of the main object appears and consequently the highlight clip cannot be obtained.

With reference to any one of the first aspect or the foregoing possible implementations, in another possible implementation, the determining a first frame rate based on the preset motion includes: obtaining a motion velocity of the main object from the video stream, and determining the first frame rate based on the motion velocity of the main object, where a larger motion velocity of the main object indicates a larger first frame rate.

It should be noted herein that the motion velocity of the main object may be an instantaneous velocity, an average velocity, or a largest instantaneous velocity of the main object, and certainly may be another velocity, which is not enumerated herein.

With reference to any one of the first aspect or the foregoing possible implementations, in another possible implementation, the determining a first frame rate based on the preset motion includes: obtaining the first frame rate based on the target posture of the main object, where different target postures of the main object indicate different first frame rates. According to this method, a frame rate (namely, the first frame rate) of a slow-motion video can be adaptively obtained.

With reference to any one of the first aspect or the foregoing possible implementations, in another possible embodiment, the processing the first video clip based on the first frame rate to obtain a second video clip includes: if the first frame rate is greater than a collection frame rate of the video stream, performing frame interpolation on the first video clip to obtain the second video clip; or if the first frame rate is less than a collection frame rate of the video stream, performing sampling on the first video clip to obtain the second video clip, where a ratio of a frame quantity of the second video clip to a frame quantity of the first video clip is equal to a ratio of the first frame rate to the collection frame rate of the video stream.

With reference to any one of the first aspect or the foregoing possible implementations, in another possible embodiment, the first frame rate is different from the collection frame rate of the video stream.

For a slow-motion video, a video clip used for normal-speed play is included both before and after a highlight clip. In a feasible embodiment, the method in this application further includes: obtaining a fourth video clip and a fifth video clip from the video stream; and obtaining a target video based on the fourth video clip, the fifth video clip, and the second video clip, where a timestamp of a start frame of the fourth video clip is $t_{q2}=t_2-t_x$, an end frame of the fourth video clip is a previous frame of the start frame of the first video clip, a start frame of the fifth video clip is a next frame of the end frame of the first video clip, a timestamp of an end frame of the fifth video clip is $t_{s2}=t_3+t_y$, the fourth video clip includes an image with a timestamp greater than $t_{q2}$ and less than $t_2$, the fifth video clip includes an image with a timestamp greater than $t_3$ and less than $t_{s2}$, and $t_x$ and $t_y$ are the same or different.

With reference to any one of the first aspect or the foregoing possible implementations, in another possible embodiment, the obtaining a target video based on the fourth video clip, the fifth video clip, and the second video clip includes: if the collection frame rate of the video stream is greater than a play frame rate of the target video, performing sampling on the fourth video clip and the fifth video clip to obtain a sixth video clip and a seventh video clip, where a ratio of a frame quantity of the sixth video clip to a frame quantity of the fourth video clip is equal to a ratio of a play frame rate of the target video to the collection frame rate of the video stream, a ratio of a frame quantity of the seventh video clip to a frame quantity of the fifth video clip is equal to a ratio of the play frame rate of the target video to the collection frame rate of the video stream, the target video includes the second video clip, the sixth video clip, and the seventh video clip, and the second video clip, the sixth video clip, and the seventh video clip are temporally consecutive.

It should be noted that, that the second video clip, the sixth video clip, and the seventh video clip are temporally consecutive means that image frames in the second video clip, the sixth video clip, and the seventh video clip are temporally consecutive.

With reference to any one of the first aspect or the foregoing possible implementations, in another possible embodiment, after the timestamp $t_3$ of the end frame of the first video clip is obtained, the method in this application further includes: determining a moment for ending slow-motion video recording, where the moment for ending slow-motion video recording is $t_4$, $t_4=t_3+t'$, and $t'$ is preset duration; or the moment for ending slow-motion video recording is a moment after an instruction of the user for stopping slow-motion video recording is received, and the moment is before $t_4$.

After the timestamp $t_3$ of the end frame of the first video clip is determined, the moment $t_4$ for ending slow-motion video recording is determined based on the timestamp $t_3$ and the preset duration $t'$. The moment for ending slow-motion video recording is $t_4=t_3+t'$. Alternatively, the moment for ending slow-motion video recording is the moment after the instruction of the user for stopping slow-motion video recording is received, the moment is before $t_4$, and the moment for ending slow-motion video recording is a moment at which the video stream is no longer obtained.

With reference to any one of the first aspect or the foregoing possible implementations, in another possible embodiment, after the obtaining a target video, the method in this application further includes: obtaining scene information of the second video clip; obtaining, based on the scene information of the second video clip, a music database corresponding to the second video clip; and determining any piece of music in the music database corresponding to the second video clip as background music of the target video.

It should be noted herein that the shooting scene includes a background and the main object. In an entire recording process, the background remains unchanged, and the main object moves.

It should be noted herein that the collection frame rate of the video stream is a rate at which an image sensor or a camera of the electronic device collects images, or a rate at which a camera collects images.

According to a second aspect, an embodiment of this application provides an electronic device, including: a detection unit, configured to detect that a preset motion occurs on a main object in a video stream; a determining unit, configured to: determine a first video clip in the video stream based on the preset motion, and determine a first frame rate based on the preset motion; and a processing unit, configured to process the first video clip based on the first frame rate to obtain a second video clip, where a play time of the second video clip at a target play frame rate is greater than a collection time of the first video clip, and the first frame rate is greater than the target play frame rate.

With reference to any one of the second aspect or the foregoing possible implementations, in a possible embodiment, the main object in the video stream is a non-human object, and in the aspect of detecting that a preset motion occurs on a main object in a video stream, the detection unit is configured to detect that displacement of the non-human object occurs in a shooting scene.

With reference to any one of the second aspect or the foregoing possible implementations, in another possible embodiment, the main object in the video stream is a person, and in the aspect of detecting that a preset motion occurs on a main object in a video stream, the detection unit is configured to: detect that the person makes a target posture in a shooting scene.

With reference to any one of the second aspect or the foregoing possible implementations, in another possible embodiment, the detection unit is further configured to: before the first video clip in the video stream is determined based on the preset motion, when a slow-motion video recording function is enabled or after a slow-motion video recording function is enabled, obtain a detection image from the video stream, and detect that a main object in the detection image is a person or a non-human object.

With reference to any one of the second aspect or the foregoing possible implementations, in another possible embodiment, in the aspect of determining a first video clip in the video stream based on the preset motion, the determining unit is configured to: obtain a first target image from the video stream, where the first target image is an image that is in the video stream and that corresponds to a moment at which the main object has largest acceleration in a process of the preset motion; obtain a timestamp $t_{w1}$ of the first target image in the video stream; and obtain the first video clip from the video stream based on the timestamp $t_{w1}$ of the first target image and a time span $t$ of the first video clip, where a timestamp of a start frame of the first video clip is $t_2=t_{w1}-at$, a timestamp of an end frame of the first video clip is $t_3=t_{w1}+bt$, a and b are constants, a+b=1, and the first video clip includes an image with a timestamp not less than $t_2$ and not greater than $t_3$.

With reference to any one of the second aspect or the foregoing possible implementations, in another possible embodiment, in the aspect of determining a first video clip in the video stream based on the preset motion, the determining unit is configured to: obtain a second target image from the video stream, where a timestamp of the second target image is a moment at which a preset to-be-captured action of the main object is detected; obtain a timestamp $t_{w2}$ of the second target image in the video stream; and obtain the first video clip from the video stream based on the timestamp $t_{w2}$ of the second target image and a time span $t$ of the first video clip, where a timestamp of a start frame of the first video clip is $t_2=t_{w2}-at$, a timestamp of an end frame of the first video clip is $t_3=t_{w2}+bt$, a and b are constants, a+b=1, and the first video clip includes an image with a timestamp not less than $t_2$ and not greater than $t_3$.

With reference to any one of the second aspect or the foregoing possible implementations, in another possible embodiment, in the aspect of determining a first video clip in the video stream based on the preset motion, the determining unit is configured to: obtain a third target image from the video stream; obtain a timestamp $t_{w3}$ of the third target image in the video stream, where the timestamp $t_{w3}$ is a moment at which the person in the shooting scene makes the target posture or a moment at which the displacement of the non-human object occurs; and obtain the first video clip based on the timestamp $t_{w3}$ of the third target image and a time span t of the first video clip, where a timestamp of a start frame of the first video clip is $t_2=t_{w3}$, a timestamp of an end frame of the first video clip is $t_3=t_{w3}+t$, and the first video clip includes an image with a timestamp not less than $t_2$ and not greater than $t_3$.

With reference to any one of the second aspect or the foregoing possible implementations, in another possible embodiment, in the aspect of determining a first video clip in the video stream based on the preset motion, the determining unit is configured to: obtain a third video clip from the video stream, where the third video clip is a video clip including a preset to-be-captured action; obtain a timestamp $t_{q1}$ of a start frame and a timestamp $t_{s1}$ of an end frame of the third video clip; and obtain the first video clip based on the timestamp $t_{q1}$, the timestamp $t_{s1}$, and a time span t of the first video clip, where a timestamp of a start frame of the first video clip is $t_2=t_{q1}-at$, a timestamp of an end frame of the first video clip is $t_3=t_{s1}+bt$, a and b are constants, $at+bt+t_{s1}-t_{q1}=t$, and the first video clip includes an image with a timestamp not less than $t_2$ and not greater than $t_3$.

With reference to any one of the second aspect or the foregoing possible implementations, in another possible embodiment, in the aspect of determining a first frame rate based on the preset motion, the determining unit is configured to: obtain a motion velocity of the main object from the video stream, and determine the first frame rate based on the motion velocity of the main object, where a larger motion velocity of the main object indicates a larger first frame rate.

With reference to any one of the second aspect or the foregoing possible implementations, in another possible embodiment, in the aspect of determining a first frame rate based on the preset motion, the determining unit is configured to: obtain the first frame rate based on the target posture of the main object, where different target postures of the main object indicate different first frame rates.

With reference to any one of the second aspect or the foregoing possible implementations, in another possible embodiment, the processing unit is configured to: if the first frame rate is greater than a collection frame rate of the video stream, perform frame interpolation on the first video clip to obtain the second video clip; or if the first frame rate is less than a collection frame rate of the video stream, perform sampling on the first video clip to obtain the second video clip, where a ratio of a frame quantity of the second video clip to a frame quantity of the first video clip is equal to a ratio of the first frame rate to the collection frame rate of the video stream.

With reference to any one of the second aspect or the foregoing possible implementations, in another possible embodiment, the first frame rate is different from the collection frame rate of the video stream.

With reference to any one of the second aspect or the foregoing possible implementations, in another possible embodiment, the electronic device further includes: an obtaining unit, configured to: obtain a fourth video clip and a fifth video clip from the video stream; and obtain a target video based on the fourth video clip, the fifth video clip, and the second video clip.

A timestamp of a start frame of the fourth video clip is $t_{q2}-t_2-t_x$, an end frame of the fourth video clip is a previous frame of the start frame of the first video clip, a start frame of the fifth video clip is a next frame of the end frame of the first video clip, a timestamp of an end frame of the fifth video clip is $t_{s2}=t_3+t_y$, the fourth video clip includes an image with a timestamp greater than to and less than $t_2$, the fifth video clip includes an image with a timestamp greater than $t_3$ and less than $t_{s2}$, and $t_x$ and $t_y$ are the same or different.

With reference to any one of the second aspect or the foregoing possible implementations, in another possible embodiment, in the aspect of obtaining a target video based on the fourth video clip, the fifth video clip, and the second video clip, the obtaining unit is configured to: if the collection frame rate of the video stream is greater than a play frame rate of the target video, perform sampling on the fourth video clip and the fifth video clip to obtain a sixth video clip and a seventh video clip.

A ratio of a frame quantity of the sixth video clip to a frame quantity of the fourth video clip is equal to a ratio of a play frame rate of the target video to the collection frame rate of the video stream, a ratio of a frame quantity of the seventh video clip to a frame quantity of the fifth video clip is equal to a ratio of the play frame rate of the target video to the collection frame rate of the video stream, the target video includes the second video clip, the sixth video clip, and the seventh video clip, and the second video clip, the sixth video clip, and the seventh video clip are temporally consecutive.

With reference to any one of the second aspect or the foregoing possible implementations, in another possible embodiment, the determining unit is further configured to: after the timestamp $t_3$ of the end frame of the first video clip is obtained, determine a moment for ending slow-motion video recording, where the moment for ending slow-motion video recording is $t_4$, $t_4=t_3+t'$, and t' is preset duration; or the moment for ending slow-motion video recording is a moment after an instruction of the user for stopping slow-motion video recording is received, and the moment is before $t_4$.

According to a third aspect, an embodiment of this application provides an electronic device, including a touchscreen, a memory, and one or more processors. One or more programs are stored in the memory. When the one or more processors executes the one or more programs, the electronic device is enabled to implement a part of or all of the method according to the first aspect.

According to a fourth aspect, an embodiment of this application provides a computer storage medium, including computer instructions. When the computer instructions are run on an electronic device, the electronic device is enabled to perform a part or all of the method according to the first aspect.

According to a fifth aspect, an embodiment of this application provides a computer program product. When the computer program product is run on a computer, the computer is enabled to perform a part or all of the method according to the first aspect.

It should be understood that any of the foregoing possible implementations may be freely combined without violating a natural law. Details are not described in this application.

It should be understood that descriptions of technical features, technical solutions, beneficial effects, or similar words in this application do not imply that all features and advantages can be implemented in any individual embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to a same embodiment. Further, the technical features, the technical solutions, and the beneficial effects described in embodiments may be combined in any proper manner. Persons skilled in the art understands that an embodiment may be implemented without one or more specific technical features, technical solutions, or beneficial effects in a specific embodiment. In other embodiments, additional technical features and beneficial effects may be further identified in a specific embodiment that does not reflect all the embodiments.

BRIEF DESCRIPTION OF DRAWINGS

FIG. 7A, FIG. 7B, and FIG. 7C are schematic diagrams of first target images according to an embodiment of this application;

FIG. 7D and FIG. 7E are schematic diagrams of frame interpolation and sampling according to an embodiment of this application;

DESCRIPTION OF EMBODIMENTS

The following clearly describes the technical solutions in embodiments of this application in detail with reference to the accompanying drawings.

The terms such as "first" and "second" mentioned below are merely intended for description in some cases, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

Figure 1:
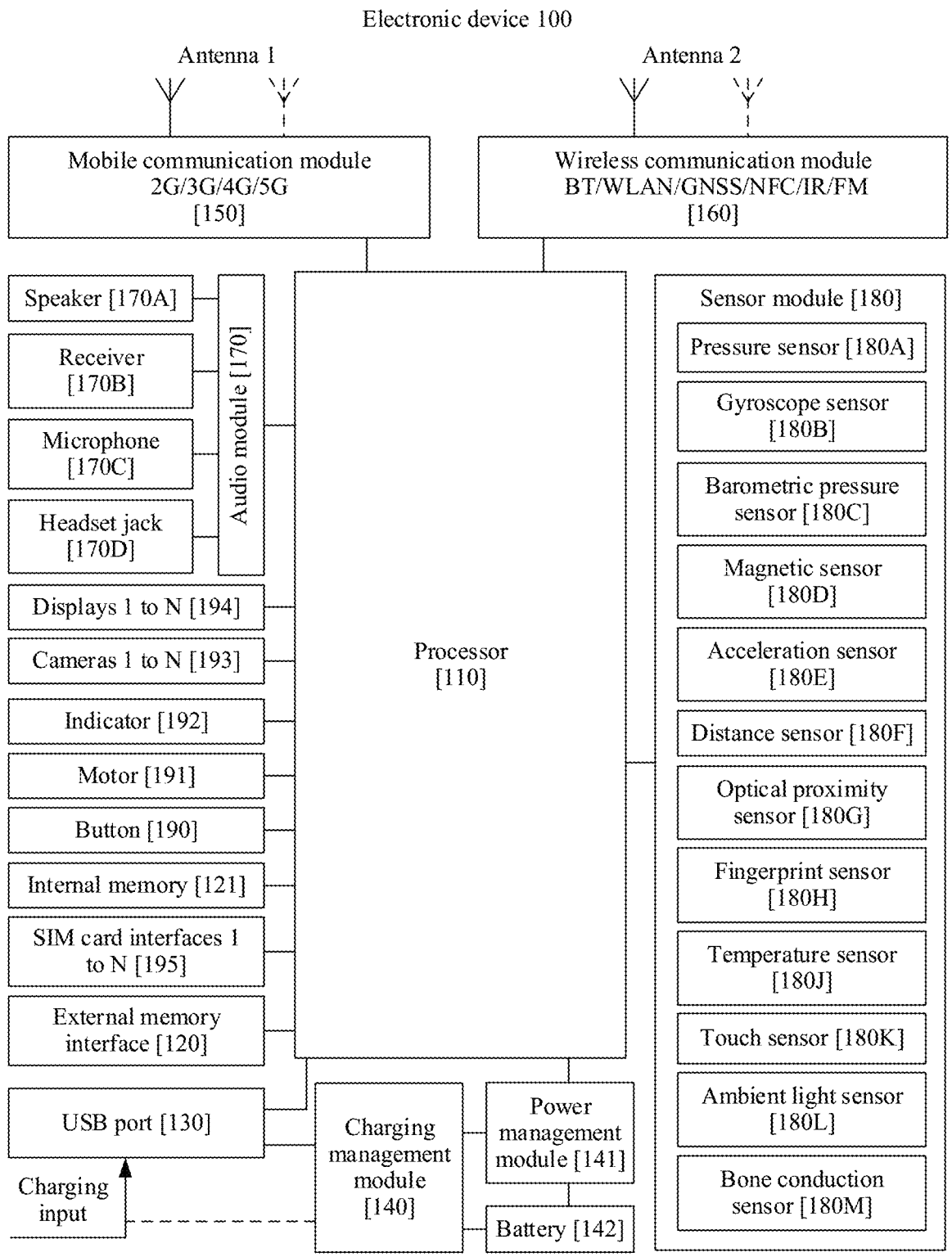
FIG. 1 is a schematic diagram of a structure of an electronic device according to an embodiment of this application.

FIG. 1 is a schematic diagram of a structure of an electronic device 100.

The electronic device 100 is used as an example below to describe embodiments in detail. It should be understood that the electronic device 100 may have more or fewer components than those shown in the figure, or may combine two or more components, or may have different component configurations. Various components shown in the figure may be implemented in hardware including one or more signal processing and/or application-specific integrated circuits, software, or a combination of hardware and software.

The electronic device 100 may include a processor 110, an external memory interface 120, an internal memory 121, a universal serial bus (USB) port 130, a charging management module 140, a power management module 141, a battery 142, an antenna 1, an antenna 2, a mobile communication module 160, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache. The memory may store instructions or data that has just been used or is cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

It may be understood that an interface connection relationship between the modules shown in this embodiment is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from a charger. The charger may be a wireless charger or a wired charger.

The power management module 141 is configured to connect the battery 142 and the charging management module 140 to the processor 110. The power management module 141 receives input of the battery 142 and/or the charging management module 140, and supplies power to the processor 110, the internal memory 121, an external memory, the display 194, the camera 193, the wireless communication module 160, and the like.

A wireless communication function of the electronic device 100 may be implemented by using the antenna 1, the antenna 2, the mobile communication module 150, the wireless communication module 160, the modem processor, the baseband processor, and the like.

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, quantum dot light emitting diodes (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scene. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for conversion into a digital image signal. The ISP outputs the digital image signal to the DSP for processing. The DSP converts the digital image signal into an image signal in a standard format such as RGB or YUV. In embodiments, the camera 193 includes a camera that captures an image required for facial recognition, for example, an infrared camera or another camera. The camera that captures an image required for facial recognition is usually located at the front of the electronic device, for example, above a touchscreen, or may be located at another position. This is not limited in embodiments. In some embodiments, the electronic device 100 may include another camera. The electronic device may further include a dot matrix transmitter (which is not shown in the figure), to emit light. The camera collects light reflected by a face to obtain a face image. The processor processes and analyzes the face image, and compares the face image with stored face image information for verification.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more types of video codecs. Therefore, the electronic device 100 can play or record videos in a plurality of coding formats such as moving picture experts group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition on the electronic device 100, for example, image recognition, facial recognition, speech recognition, and text understanding, may be implemented by using the NPU.

The external memory interface 120 may be configured to connect to an external memory card, for example, a micro SD card, to extend a storage capability of the electronic device 100. The external memory card communicates with the processor 110 through the external memory interface 120, to implement a data storage function. For example, data such as music and videos is stored in the external storage card.

The internal memory 121 may be configured to store computer-executable program code, where the executable program code includes instructions. The processor 110 runs the instruction stored in the internal memory 121 to perform various function applications of the electronic device 100 and data processing. The internal memory 121 may include a program storage area and a data storage area. The program storage area may store an operating system and an application required by at least one function (for example, a facial recognition function, a fingerprint recognition function, and a mobile payment function). The data storage area may store data (such as facial information template data and a fingerprint information template) created during use of the electronic device 100. In addition, the internal memory 121 may include a high-speed random access memory, and may further include a nonvolatile memory, for example, at least one magnetic disk storage device, a flash memory, and a universal flash storage (UFS).

The electronic device 100 may implement audio functions such as music playing and recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal.

The speaker 170A, also referred to as a "loudspeaker", is configured to convert an electrical audio signal into a sound signal.

The receiver 170B, also referred to as an "earpiece", is configured to convert an electrical audio signal into a sound signal.

The microphone 170C, also referred to as a "mike" or a "mic", is configured to convert a sound signal into an electrical signal.

The headset jack 170D is configured to connect to a wired headset. The headset jack 170D may be the USB port 130, or may be a 3.5 mm open mobile terminal platform (OMTP) standard interface or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, for example, a resistive pressure sensor, an inductive pressure sensor, and a capacitive pressure sensor.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B.

The optical proximity sensor 180G may include, for example, a light-emitting diode (LED) and an optical detector, for example, a photodiode. The light-emitting diode may be an infrared light-emitting diode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. The fingerprint sensor 180H may be disposed below the touchscreen. The electronic device 100 may receive a touch operation of the user in an area corresponding to the fingerprint sensor on the touchscreen, and the electronic device 100 may collect fingerprint information of a finger of the user in response to the touch operation, to implement opening of a hidden album after fingerprint recognition succeeds, starting of a hidden application after fingerprint recognition succeeds, account logging after fingerprint recognition succeeds, payment after fingerprint recognition succeeds, and the like described in embodiments of this application.

The temperature sensor 180J is configured to detect a temperature. In some embodiments, the electronic device 100 executes a temperature processing policy based on the temperature detected by the temperature sensor 180J.

The touch sensor 180K is also referred to as a "touch panel". The touch sensor 180K may be disposed on the display 194. The touch sensor 180K and the display 194 form a touchscreen, which is also referred to as a "touch screen". The touch sensor 180K is configured to detect a touch operation on or near the touch sensor 180K. The touch sensor may transfer the detected touch operation to the application processor to determine a type of a touch event. A visual output related to the touch operation may be provided through the display 194. In some other embodiments, the touch sensor 180K may also be disposed on a surface of the electronic device 100 at a position different from that of the display 194.

The button 190 includes a power button, a volume button, and the like. The button 190 may be a mechanical button, or may be a touch-sensitive button. The electronic device 100 may receive a button input, and generate a button signal input related to user settings and function control of the electronic device 100.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a micro-kernel architecture, a micro service architecture, or a cloud architecture. In embodiments, an Android system of a layered architecture is used as an example to describe a software structure of the electronic device 100.

In this application, after detecting a touch command of starting the camera 193, the touch sensor 180K sends an instruction of starting the camera 193 to the processor 110, and the processor 110 starts the camera 193. The camera 193 starts to obtain a video stream for a main object, and the video stream obtained by the camera 193 in real time is displayed on the display 194. After detecting a command of starting recording, the touch sensor 180K sends a command of starting recording a slow-motion video to the processor 110. The processor 110 detects that a preset motion occurs on the main object in the video stream, determines a first video clip in the video stream based on the preset motion, determines a first frame rate based on the preset motion, and processes the first video clip based on the first frame rate to obtain a second video clip. A play time of the second video clip is greater than a collection time of the first video clip.

Figure 2:
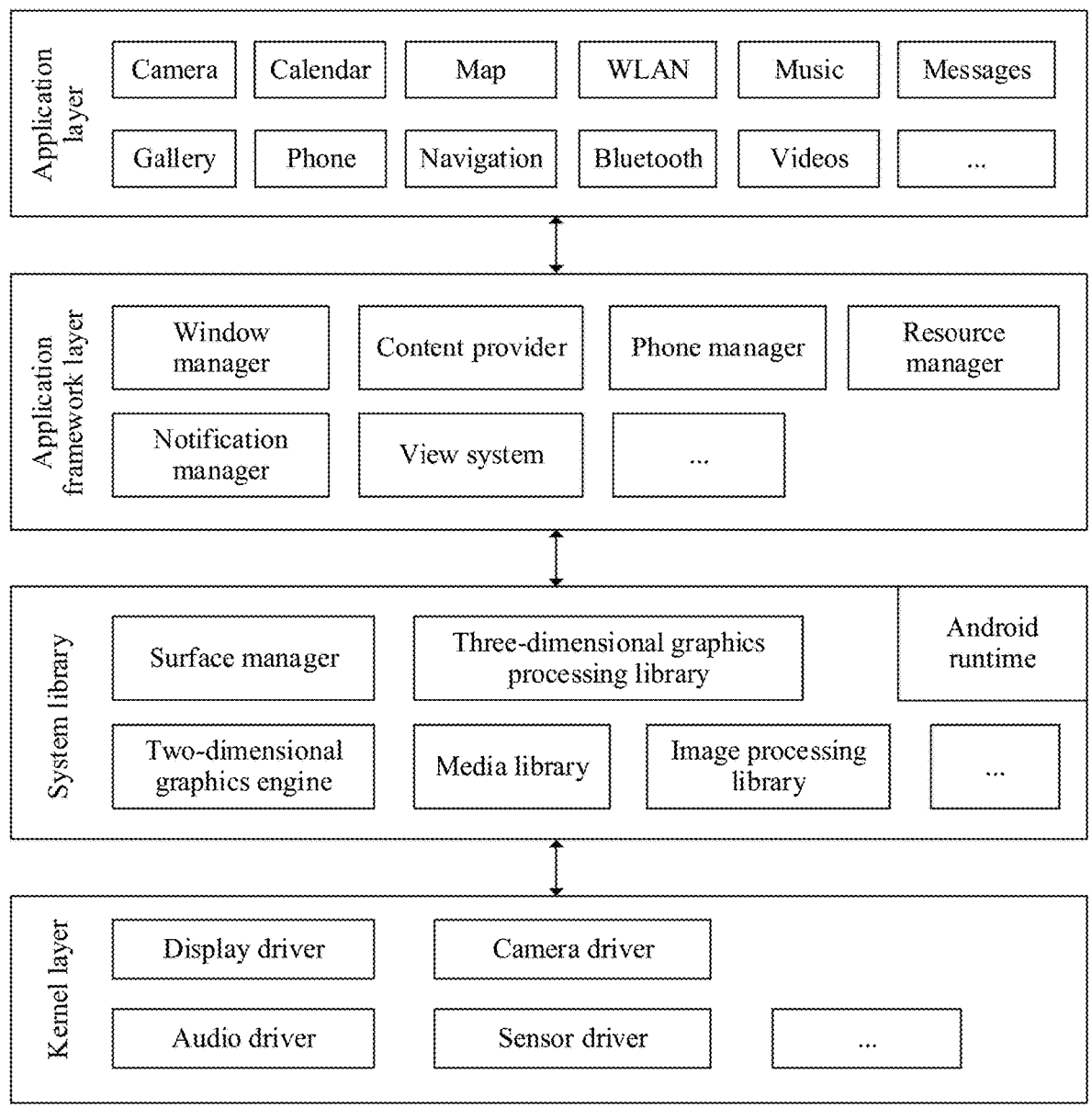
FIG. 2 is a schematic diagram of a software structure of an electronic device according to an embodiment of this application.

FIG. 2 is a block diagram of a software structure of the electronic device 100 according to an embodiment.

In a layered architecture, software may be divided into several layers, each of which is assigned a clear role and task. The layers communicate with each other through a software interface. In some embodiments, an Android system is divided into four layers: an application layer, an application framework layer, an Android runtime and system library, and a kernel layer from top to bottom.

The application layer may include a series of application packages.

As shown in FIG. 2, the application packages may include application programs (or referred to as applications) such as Camera, Gallery, Calendar, Phone, Map, Navigation, wireless local area network (WLAN), Bluetooth, Music, Videos, and Messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and a bookmark, an address book, and the like.

The view system includes visual controls such as a control for displaying a text and a control for displaying a picture. The view system may be configured to construct an application. A display interface may include one or more views. For example, a display interface including an SMS message notification icon may include a text display view and an image display view.

The phone manager is configured to provide a communication function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The message may automatically disappear after a short stay without user interaction. For example, the notification manager is configured to notify download completion, give a message notification, and the like. The notification manager may alternatively be a notification that appears in a status bar on top of the system in a form of a chart or scroll bar texts, for example, a notification of an application running in the background, or a notification that appears on the screen in a form of a dialog interface. For example, text information is displayed in the status bar, an announcement is given, the electronic device vibrates, or an indicator light blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, MPEG-4, H.264, MP3, AAC, AMR, JPG, PNG, and the like.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In this embodiment of this application, refer to FIG. 2. Optionally, the system library may further include an image processing library. After a camera application is started, the camera application can obtain a video stream, collected by the electronic device, for a main object. The image processing library detects that a preset motion occurs on the main object in the video stream, determines a first video clip in the video stream based on the preset motion, determines a first frame rate based on the preset motion, and processes the first video clip based on the first frame rate to obtain a second video clip. A play time of the second video clip is greater than a collection time of the first video clip.

Slow-motion shooting is a novel shooting manner. Shooting a slow-motion video means manually obtaining a wonderful moment of a main object by a person by using the electronic device. However, because a person cannot accurately determine occurrence of the wonderful moment of the main object, the electronic device cannot obtain the moment of the main object, which is a poor use experience for the user. For example, if a small ball lands and then bounces, a user wants to capture a moment at which the small ball lands and bounces, instead of shooting a large part of a falling process before the landing. In addition, in different shooting scenes, different main objects have different motion states such as different motion modes and velocities. To meet higher aesthetic pursuits, more suitable expected processing frame rates are adapted to different main objects and different motion states and velocities of main objects. This improves wonderfulness shown by slow-motion videos. However, a slow-motion mode used on a current mobile phone does not have such a function, or such a design. Finally, a slow-motion mode on a current mobile phone also lacks a function of customizing a soundtrack for specific picture content.

For the foregoing problems, this application proposes a slow-motion video shooting method. The method may include: detecting that a main object in a to-be-shot scene is a person or a non-human object; detecting that a preset motion occurs in the main object in a video stream; determining a first video clip (which may be understood as a highlight video clip) in the video stream based on the preset motion; determining a first frame rate (which can be understood as a frame rate of a slow-motion video) based on the preset motion; then determining a target video (which may be understood as a slow-motion video) based on the first video clip and the first frame rate; and finally adding background music for the target video. For details, refer to the following related description.

Figure 3A:
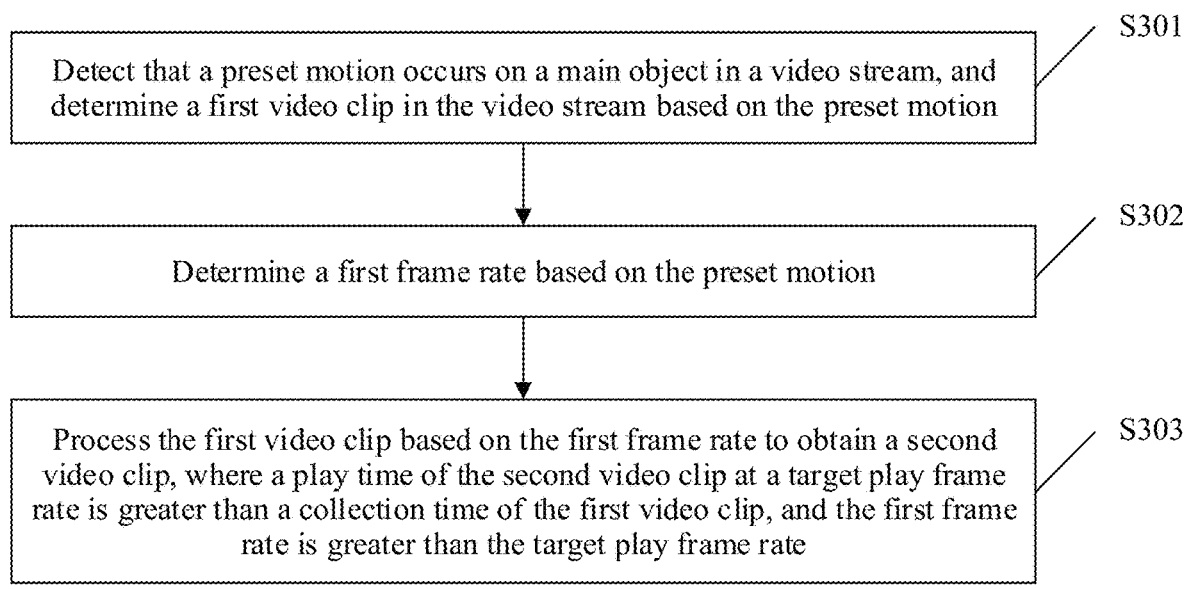
FIG. 3A is a schematic flowchart of a slow-motion video shooting method according to an embodiment of this application.

Refer to FIG. 3A. FIG. 3A is a schematic flowchart of a slow-motion video shooting method according to an embodiment of this application. As shown in FIG. 3A, the method includes the following steps.

S301. Detect that a preset motion occurs on a main object in a video stream, and determine a first video clip in the video stream based on the preset motion.

Common shooting scenes for users may be classified into person scenes or non-human scenes.

The person scene includes a person and a background, and the non-human scene includes a non-human object and a background.

In a feasible embodiment, the main object in the video stream is a non-human object, and the detecting that a preset motion occurs on a main object in a video stream includes: detecting that displacement of the non-human object occurs in a shooting scene. This may be represented by relative movement of the non-human object relative to a background in the shooting scene. The background is relatively stationary relative to a shooting terminal (a relative shake within a small range caused due to a shake of a user's hand or other factors is acceptable).

Further, before detecting that the motion occurs on the main object, the method in this application further includes: detecting displacement of the non-human object in the video stream.

When it is determined that the main object in the video stream is a non-human object, displacement of the non-human object in the video stream is detected. A displacement detection image is obtained from the video stream, and the displacement detection image is input into an optical flow network for computing to obtain an optical flow image of the displacement detection image. Then, the optical flow image is input into a displacement detection network for computing to obtain eigenvectors of the displacement detection image. Finally, a detection result is determined based on the eigenvectors. The displacement detection result includes the following: displacement of the non-human object occurs, displacement of the non-human object does not occur, an electronic device shakes, and an image slightly changes, as shown in FIG. 3B.

If the displacement detection result indicates that displacement of the non-human object occurs, a subsequent operation is performed. If the displacement detection result indicates that displacement of the non-human object does not occur, the electronic device shakes, or the image slightly changes, a subsequent operation is not performed.

Figure 3B:
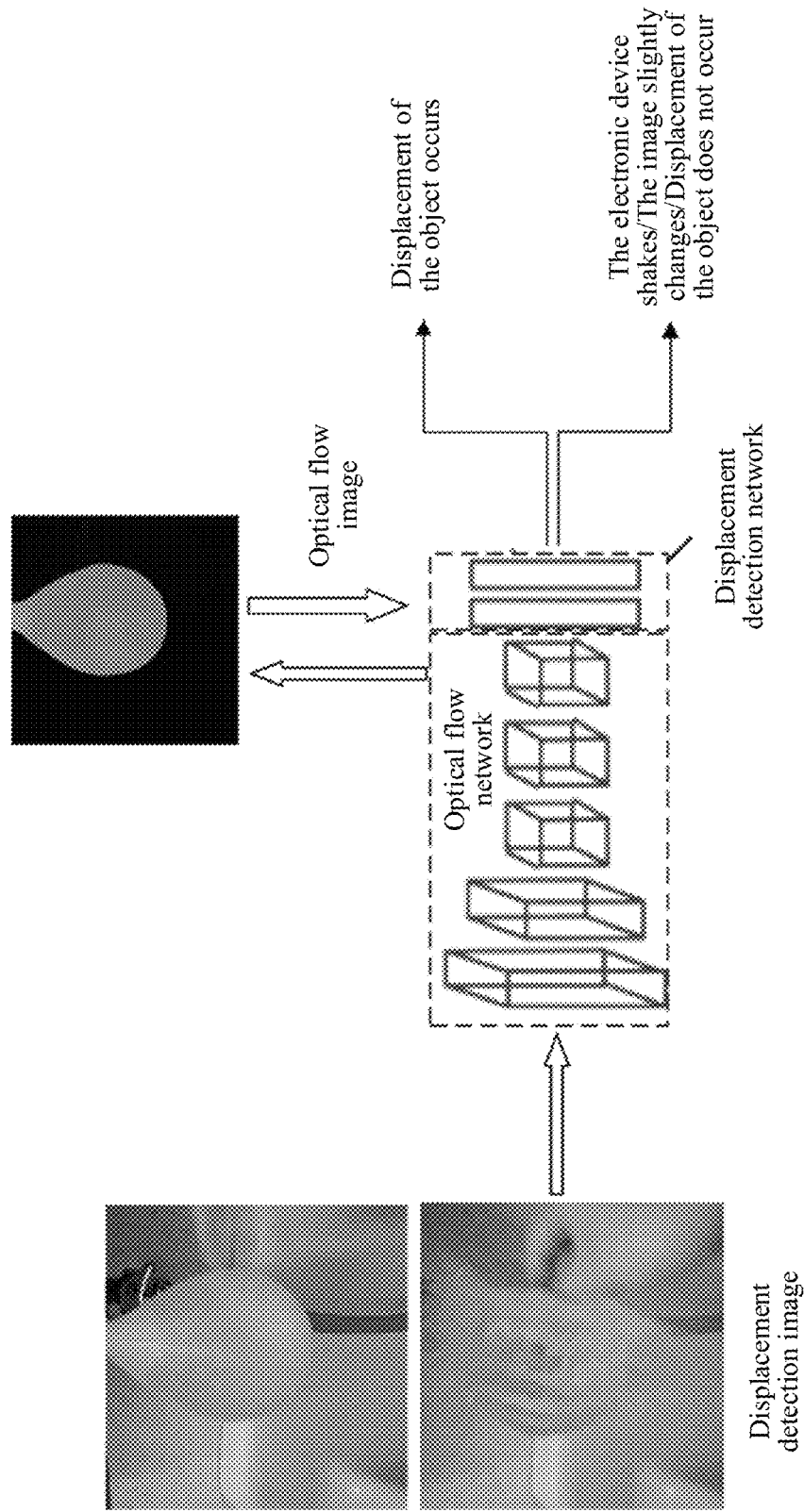
FIG. 3B is a schematic diagram of principles of detecting a non-human object according to an embodiment of this application.

Optionally, in an example, if the displacement detection result indicates that displacement of the non-human object does not occur, the electronic device shakes, or the image slightly changes, the electronic device continues to obtain a displacement detection image from the video stream, and the detection process shown in FIG. 3B is performed to obtain a displacement detection result until the displacement detection result indicates that displacement of the non-human object occurs or it is detected that obtaining the video stream stops. According this method, a moment at which displacement of the non-human object in the shooting scene starts can be determined.

In a feasible embodiment, the main object in the video stream is a person, and the detecting that a preset motion occurs on a main object in a video stream includes: detecting that the person makes a target posture in a shooting scene.

Further, before detecting that a motion posture of the main object is the target posture, the method in this application further includes: detecting a posture of the person in the video stream in the shooting scene.

Figure 3C:
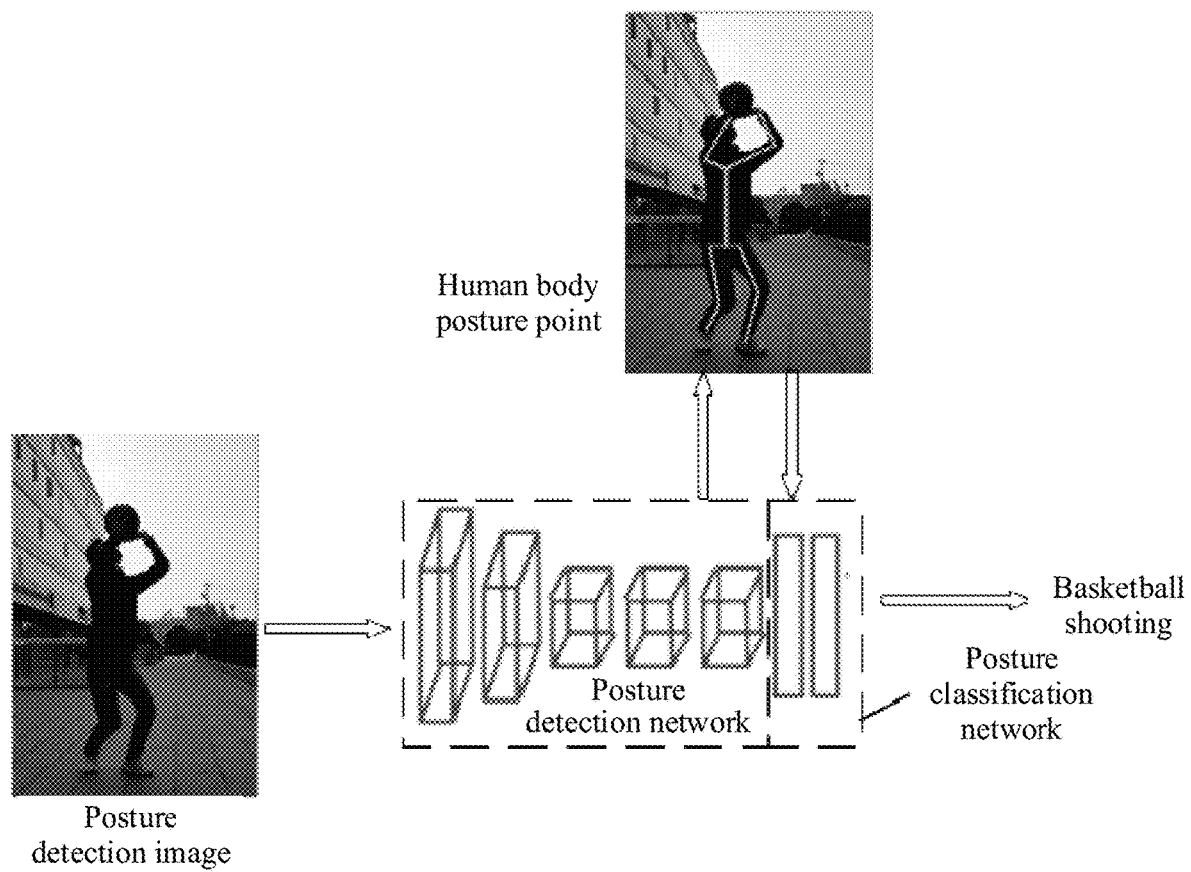
FIG. 3C is a schematic diagram of principles of detecting a person according to an embodiment of this application.

When it is determined that the main object in the video stream is a person, a posture of the person in the video stream is detected. A plurality of frames of posture detection images are obtained from the video stream, and the plurality of frames of posture detection images are input into a posture detection network for computing to obtain coordinates of key posture points (also referred to as human body key points and human body skeleton points) of the person in the plurality of frames of posture detection images. The coordinates of the key posture points of the person in the plurality of frames of posture detection images form a high-dimensional vector, then the high-dimensional vector is input into a posture classification network for computing to obtain corresponding eigenvectors, and finally a posture detection result is obtained based on the eigenvectors. As shown in FIG. 3C, a plurality of frames of images including a scene of performing basketball shooting by a person are obtained from a video stream, and the images are input into a posture detection network for computing to obtain coordinates of human body posture points of the person that performs basketball shooting in each frame of image in the plurality of images. Then, the coordinates of the human body posture points in the plurality of frames of images form a high-dimensional vector. Finally, the high-dimensional vector is input into an action classification network for computing to obtain a posture detection result. The posture detection result indicates basketball shooting.

If the posture detection result indicates the target posture, a subsequent operation is performed. If the posture detection result does not indicate the target posture, a subsequent operation is not performed.

It should be noted herein that, the subsequent operation may include the determining a first video clip in the video stream based on the preset motion in step S301 and related content in steps S302 and S303.

In a feasible embodiment, if the posture detection result does not indicate the target posture, the electronic device continues to obtain a posture detection image from the video stream, and a posture of the person is detected based on the posture detection image by using the foregoing method.

Optionally, in an example, if the posture detection result does not indicate the target posture, the electronic device continues to obtain a posture detection image from the video stream, and the detection process shown in FIG. 3C is performed to obtain a posture detection result until a posture detection result indicates the target posture or it is detected that obtaining the video stream stops. According this method, a moment at which the person in the shooting scene makes the target posture can be determined.

Optionally, the target posture includes leaping up, basketball shooting, a dance spin, a dance split jump, golfing, a basketball layup, cheering, a skateboard jump, basketball dribbling, walking, running, jumping, waving, and other postures. As shown in FIG. 3C, the posture detection result indicates basketball shooting, in other words, the posture detection result indicates the target posture, which is equivalent to that the main object (that is, the person) makes the target posture.

In a feasible embodiment, before determining the first video clip in the video stream based on the preset motion, the method in this application further includes: when a slow-motion video recording function is enabled or after a slow-motion video recording function is enabled, obtaining a detection image from the video stream, and detecting the main object in the detection image.

When the slow-motion video recording function is started or after the slow-motion video recording function is started, the detection image (which may be one frame of image in the video stream) is obtained from the video stream, and detection is performed on the detection image. If it is detected that the main object is not a preset object, where the preset object includes a person or a non-human object, or the detected main object is a stationary object or is an object that cannot be recognized by the electronic device, the electronic device continues to obtain a detection image from the video stream for performing detection. Optionally, continuing to obtain the detection image from the video stream for performing detection may be: obtaining the detection image from the video stream in real time for performing detection, or obtaining one frame of image from the video stream as the detection image at a time interval of x for performing detection until it is detected that the main object is the preset object, to determine that a scene of current slow-motion shooting is the person scene or the non-human scene.

Figure 3D:
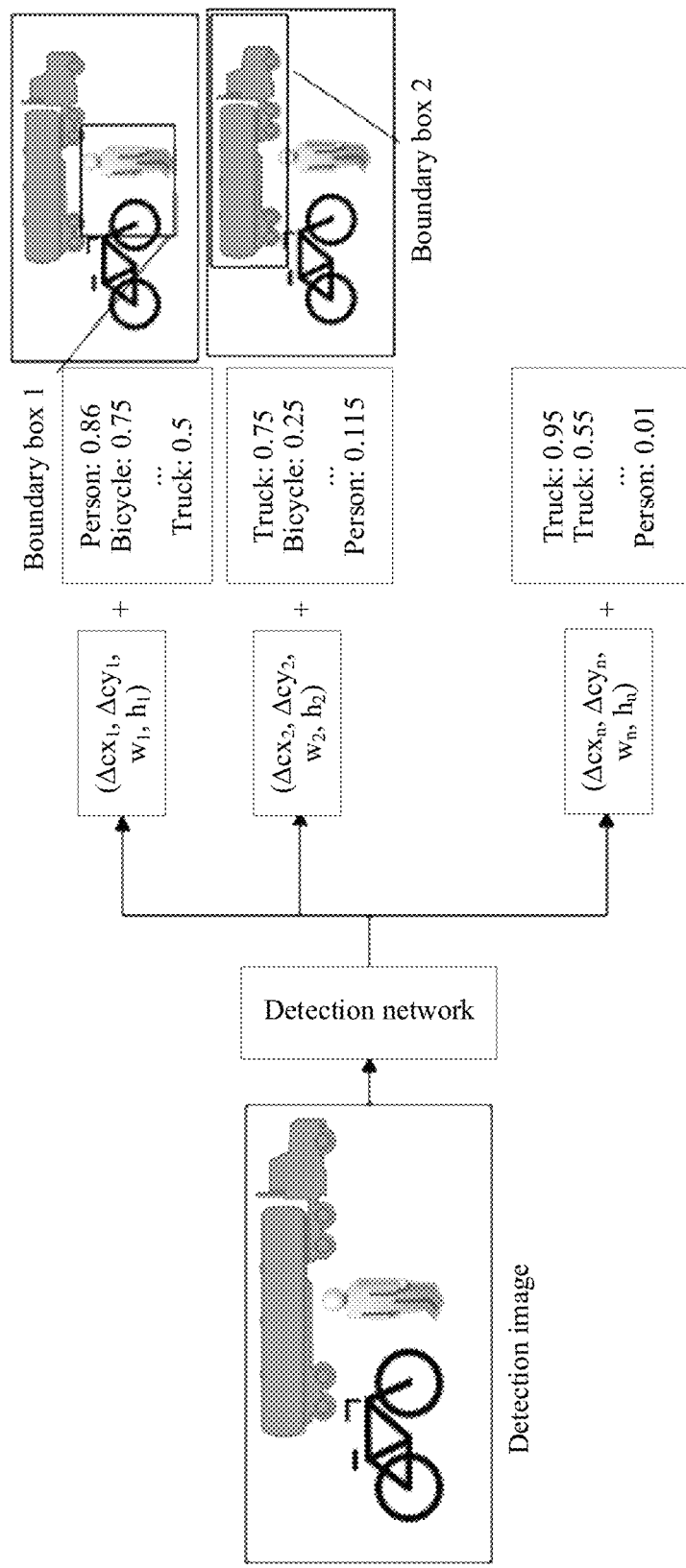
FIG. 3D is a schematic diagram of principles of detecting a non-human object and a person according to an embodiment of this application.

A process of detecting the detection image is shown in FIG. 3D. The detection image is input into a detection network for computing to obtain a proportion of each object in a boundary box. As shown in FIG. 3D, $(\Delta cx_1, \Delta cy_1)$ represents coordinates of a top left point of a boundary box 1 in the detection image, and $(w_1, h_1)$ represents a size of the boundary box. "Person: 0.86" indicates that a proportion occupied by the person in the boundary box 1 is 0.86, "Bicycle: 0.75" indicates that a proportion occupied by the bicycle in the boundary box 1 is 0.75, and "Truck: 0.5" indicates that a proportion occupied by the truck in the boundary box 1 is 0.5. $(\Delta cx_2, \Delta cy_2)$ represents coordinates of a top left point of a boundary box 2 in the detection image, and $(w_2, h_2)$ represents a size of the boundary box. "Person: 0.115" indicates that a proportion occupied by the person in the boundary box 2 is 0.115, "Bicycle: 0.25" indicates that a proportion occupied by the bicycle in the boundary box 2 is 0.25, and "Truck: 0.75" indicates that a proportion occupied by the truck in the boundary box 2 is 0.75.

Then, the main object in the detection image is determined based on a proportion of a person in each boundary box. If a proportion occupied by a person in any boundary box in the detection image is the largest, it is determined that the main object in the detection image is the person. If a proportion occupied by a person in each boundary box in the detection image is not the largest, it is determined that the main object in the detection image is a non-human object. As shown in FIG. 3D, the proportion occupied by the person in the boundary box 1 is the largest, and therefore the main object in the detection image is the person.

Optionally, in a feasible embodiment, before the detection image is input into the detection network, a size of the detection image is adjusted to obtain an adjusted detection image. For example, the size of the detection image is adjusted to 256*256. Then, the adjusted detection image is input into the detection network for performing detection, to determine the main object in the detection image. For a specific process, refer to the foregoing description.

Figure 4A:
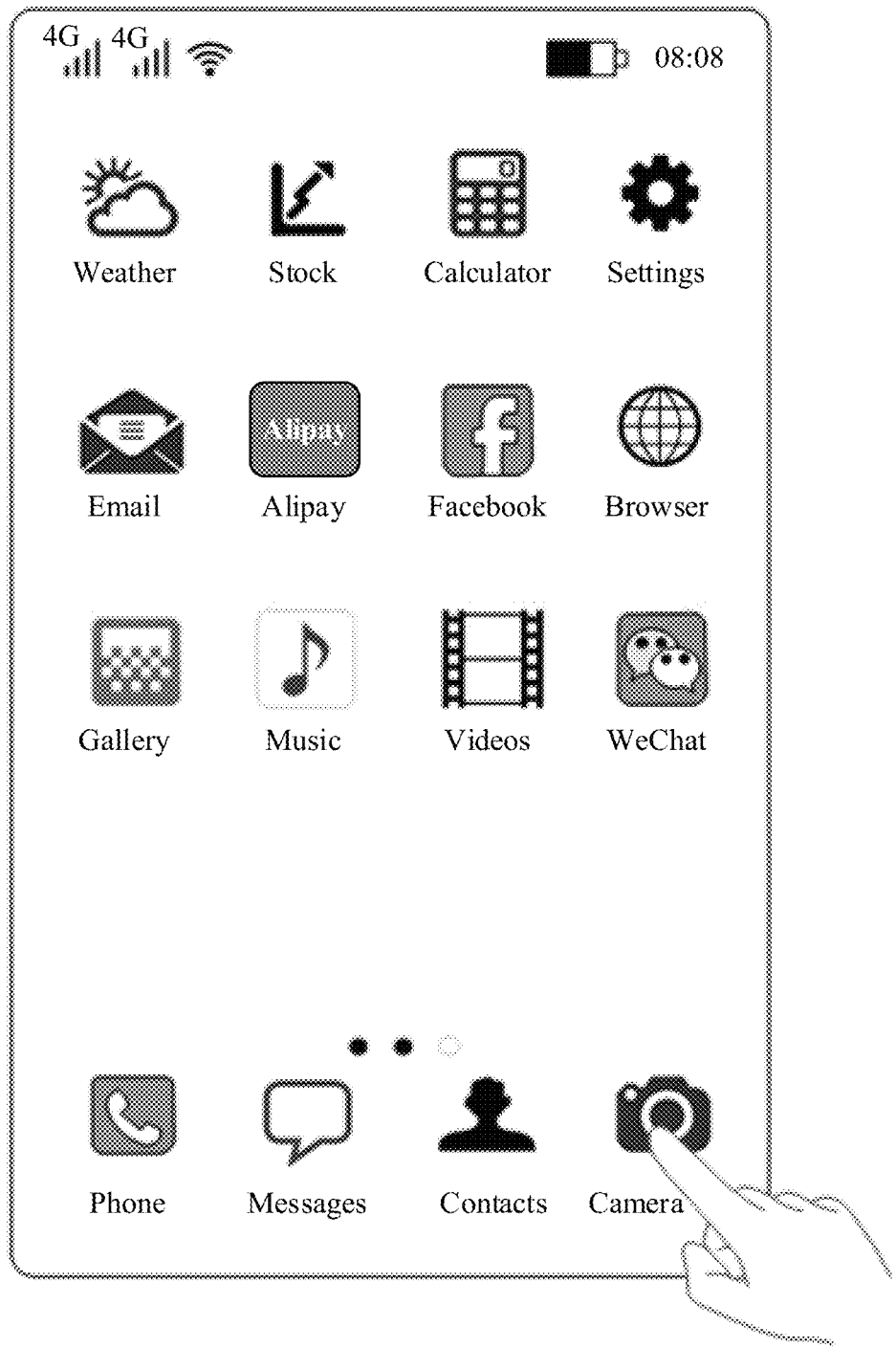
FIG. 4A, FIG. 4B, FIG. 4C, and FIG. 4D are UI interfaces for recording a slow-motion video according to an embodiment of this application.
Figure 4B:
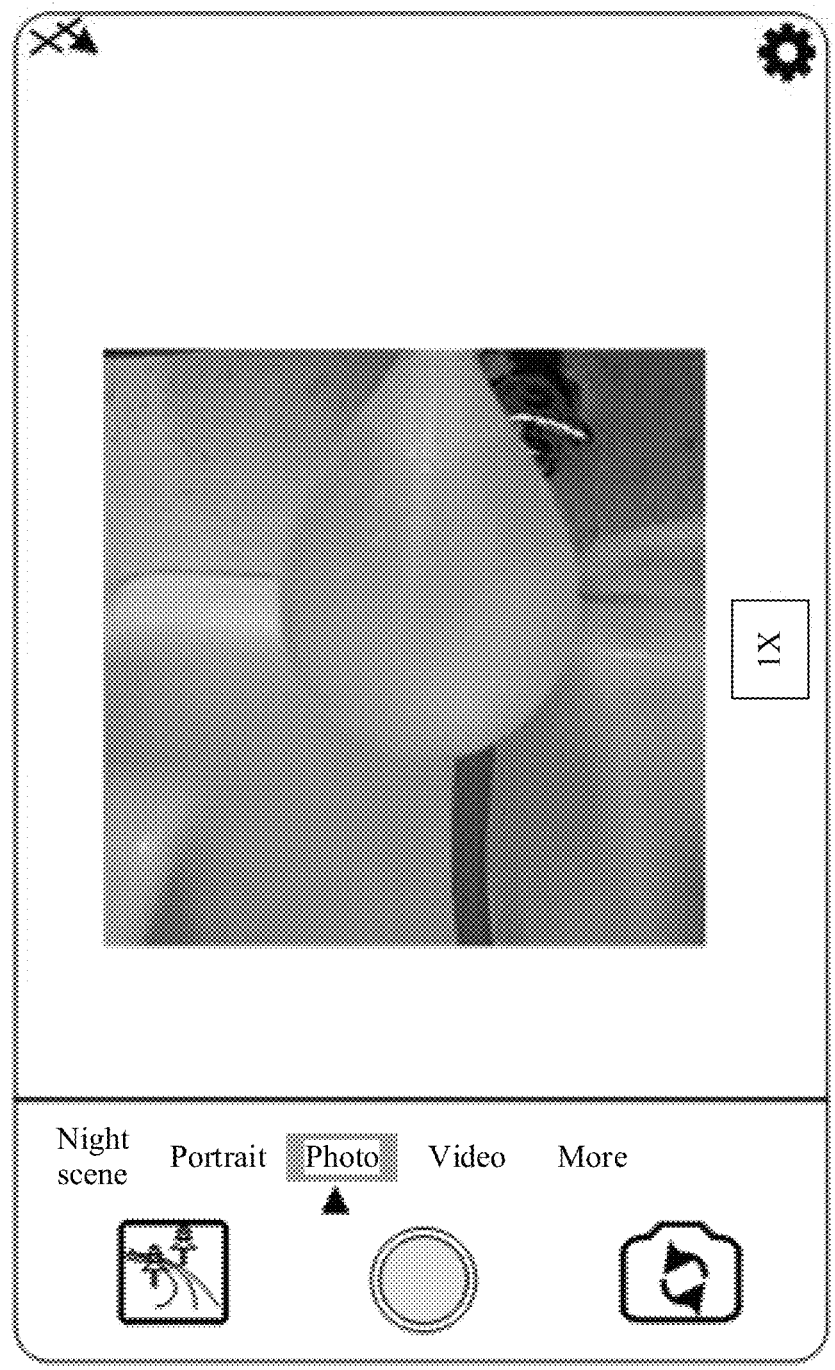
Figure 4C:
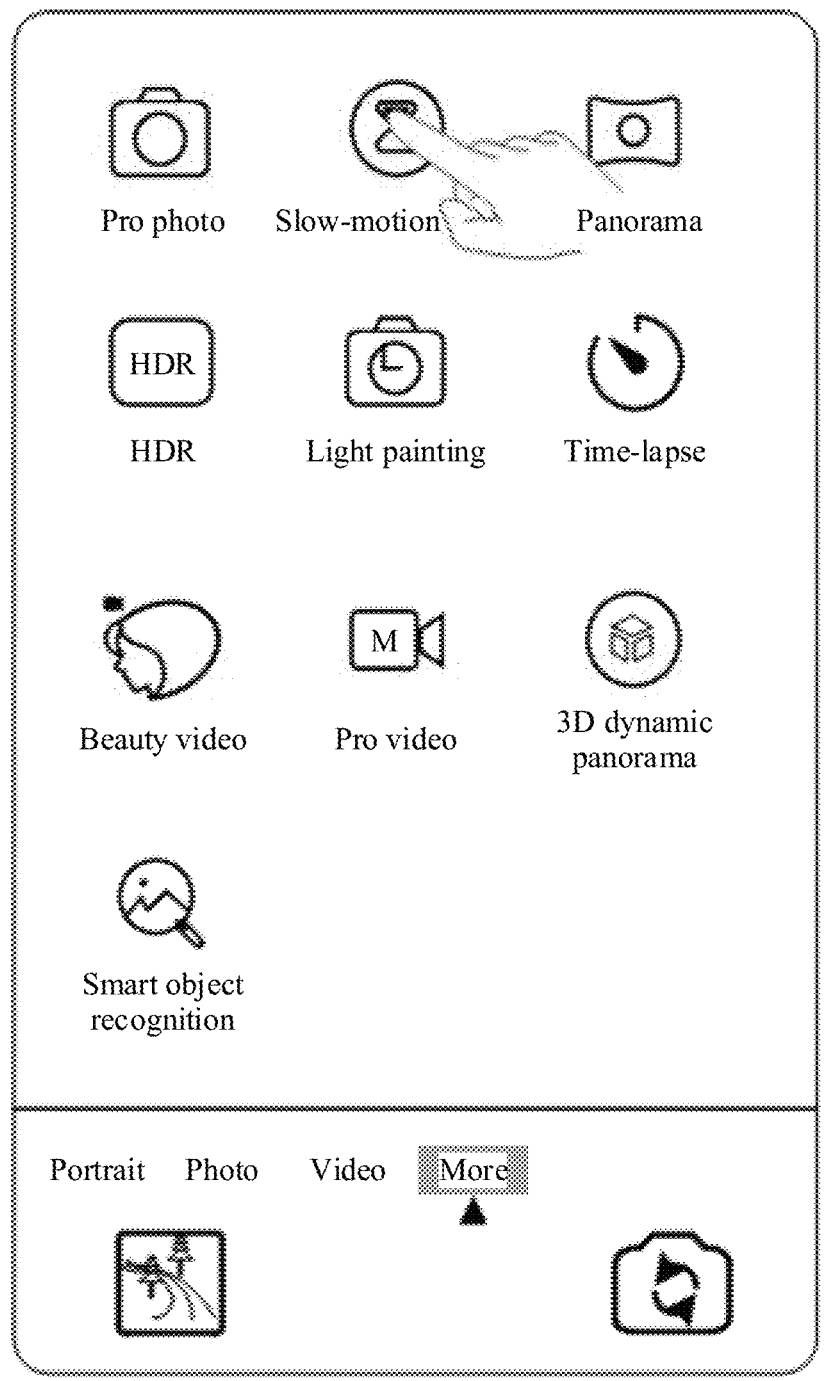
Figure 4D:
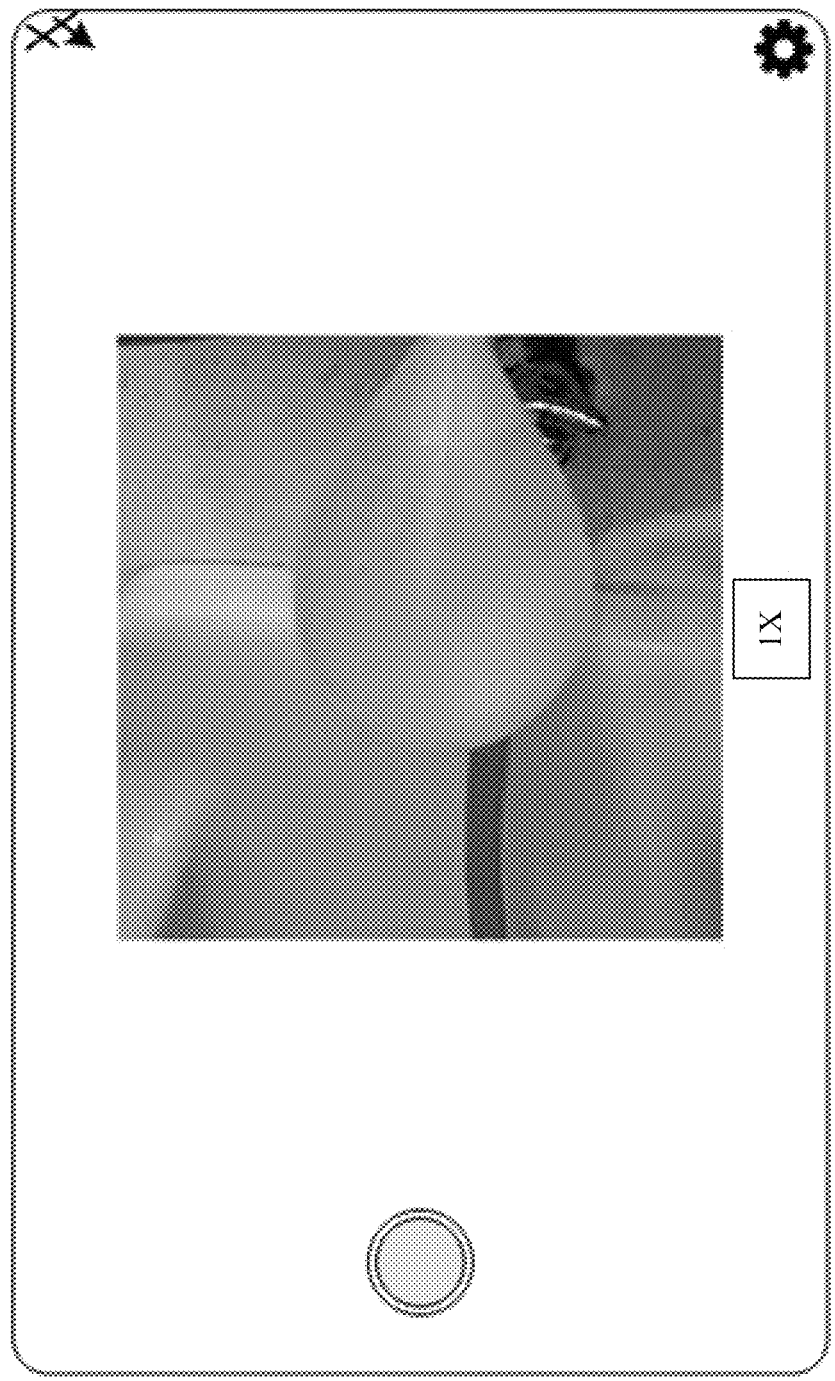

Optionally, in a specific embodiment, it is assumed that the user needs to record a slow-motion video. As shown in FIG. 4A, a user taps an icon of a camera on the electronic device to start the camera, and a shooting interface is displayed. In this case, as shown in FIG. 4B, the camera is in a shooting mode, and "Slow-motion" is not displayed on the displayed interface. For some terminals, a dedicated slow-motion mode may be used. The user taps the "More" label to enter an interface shown in FIG. 4C. This interface shows more shooting modes. The user taps the "Slow-motion" label to display a slow-motion video recording interface, as shown in FIG. 4D.

Figure 4E:
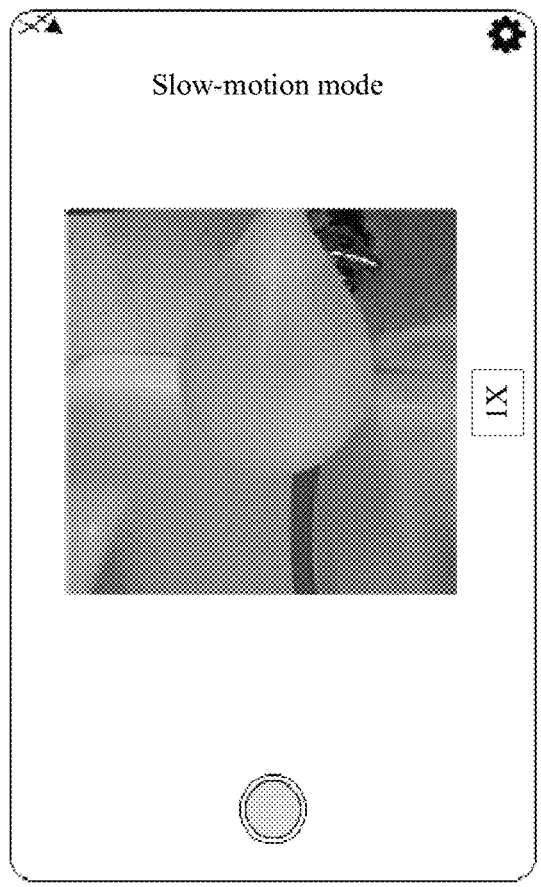
FIG. 4E and FIG. 4F are a UI interface for recording a slow-motion video according to an embodiment of this application.

Optionally, in an example, the slow-motion video recording interface includes a first prompt label, and this prompt label is used to indicate a working mode of the current camera. As shown in FIG. 4E, content of the first prompt label is "Slow-motion mode", to prompt the user that the current camera works in the slow-motion mode.

Figure 4F:
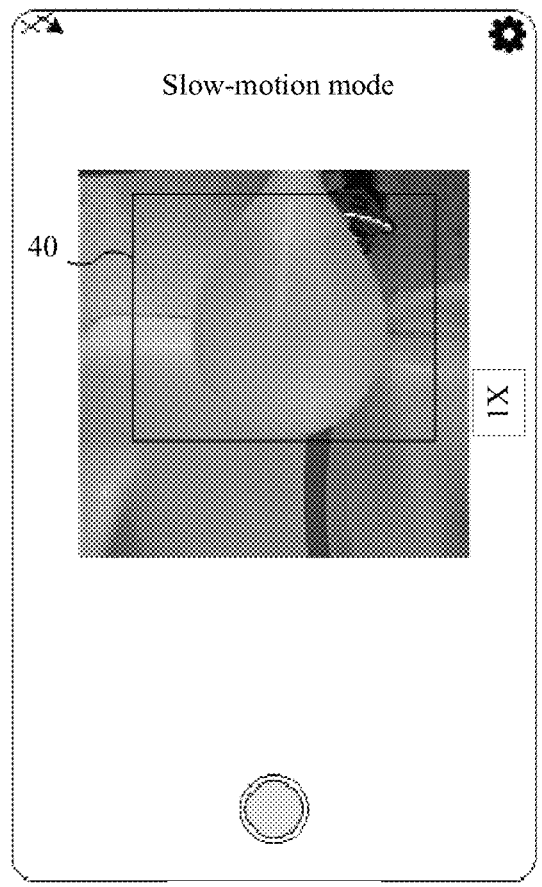

Optionally, in an example, the slow-motion video recording interface includes a detection box, and a function of the detection box is to prompt the user to aim at the main object, so that a main body of the main object is located in the detection box. As shown in FIG. 4F, a main body of a main object, that is, a balloon, is located within a detection box 40. The detection box provided in FIG. 4E is merely an example for description, and is not intended to limit this application.

Optionally, in a feasible embodiment, the detection box may be manually adjusted by the user. If the detection box is manually adjusted by the user, the user manually adjusts the detection box before starting to record the slow-motion video. After adjusting the detection box, the detection box includes the main body of the main object.

Optionally, in an example, the electronic device may determine, based on a selection instruction of the user, that the main object is a person or a non-human object, or the electronic device may determine the main object based on a selection instruction of the user. For example, the shooting scene includes a person P1 and a person P2, and the user wants to shoot a slow-motion video for the person P1. The electronic device receives a selection instruction of the user, and determines, based on the selection instruction, that the main object is the person P1.

Optionally, the selection instruction may be a touch instruction, a voice instruction, or another instruction.

Figure 4G:
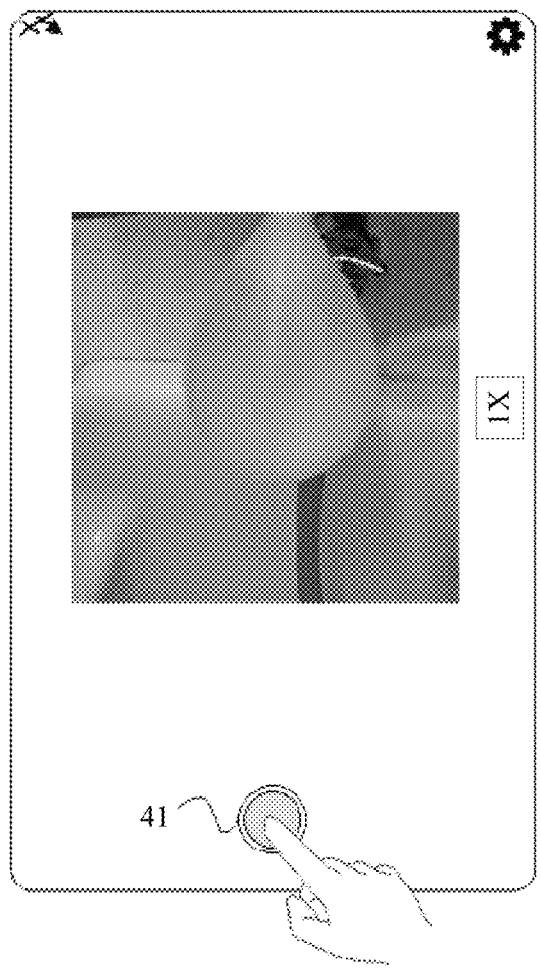
FIG. 4G and FIG. 4H are a UI interface for recording a slow-motion video according to an embodiment of this application.
Figure 4H:
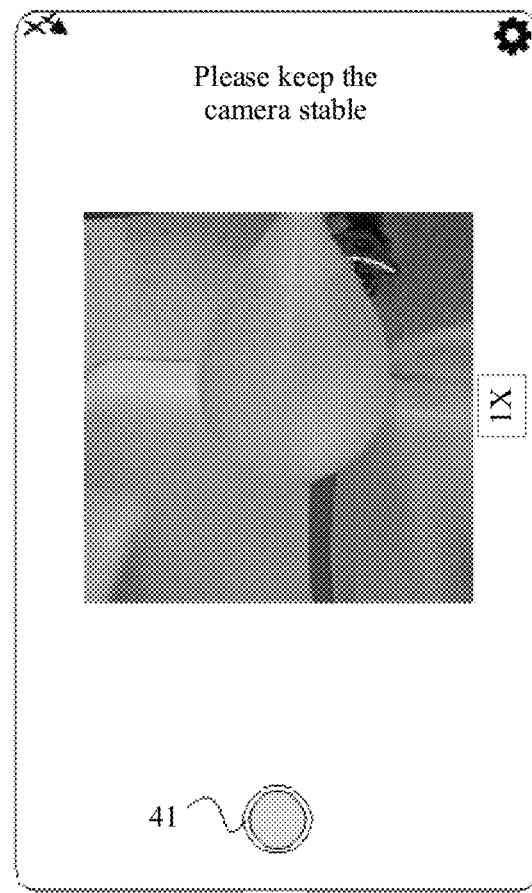
Figure 4K:
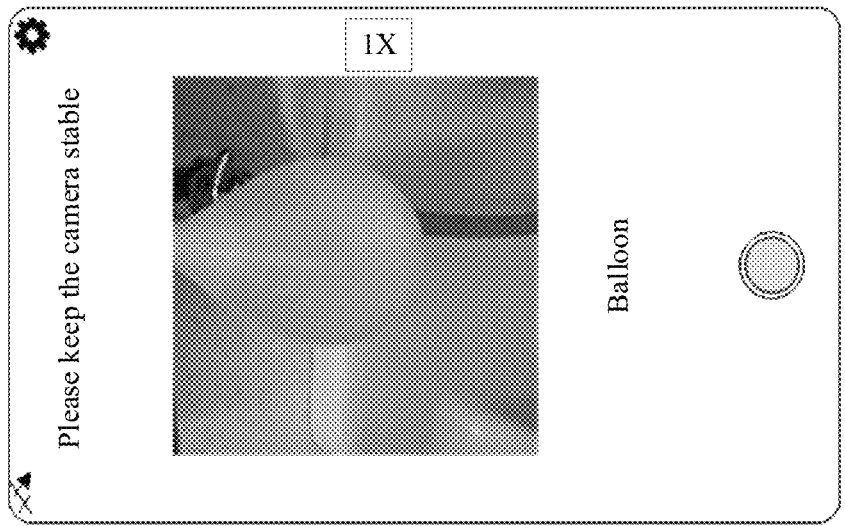
FIG. 4I, FIG. 4J, and FIG. 4K are a UI interface for recording a slow-motion video according to an embodiment of this application.
Figure 4J:
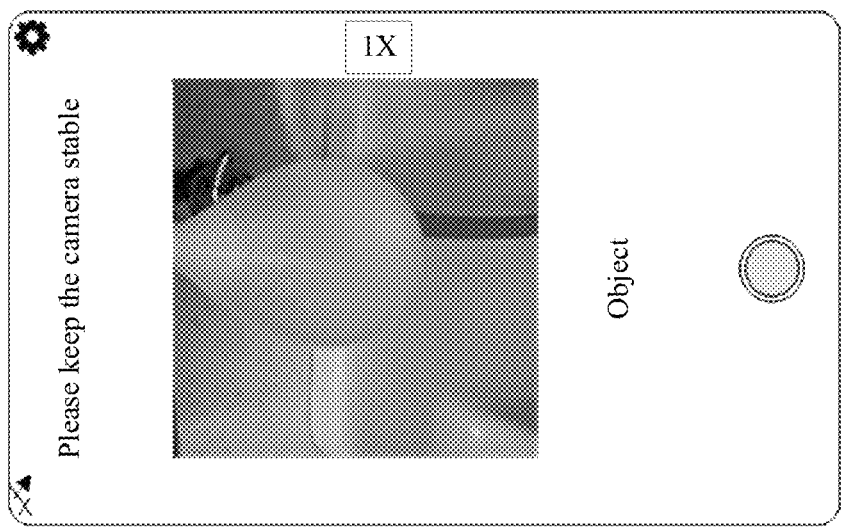
Figure 4I:
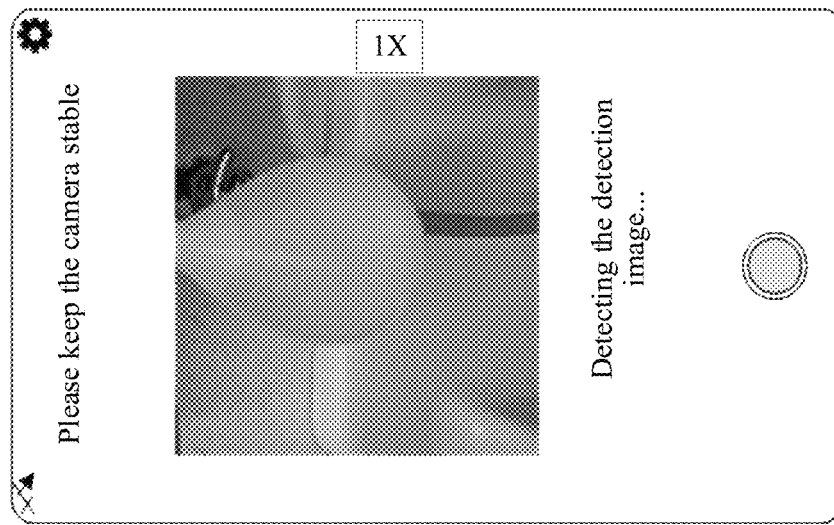

Optionally, in an example, as shown in FIG. 4G, after the slow-motion video recording interface is displayed, the user taps a recording start function button 41, to display a recording start interface shown in FIG. 4H. A moment at which the user taps the recording start function button 41 is $t_1$. The recording start interface includes a second prompt label, and this prompt label is used to prompt the user that the electronic device is recording a slow-motion video. In the recording start interface shown in FIG. 4H, content of the second prompt label is "Please keep the camera stable", to indicate that the electronic device is recording a slow-motion video, and to prompt the user of a shooting posture. The recording start function button 41 provided in the figure is merely an example for description, and is not intended to limit this application.

Optionally, in an example, the recording start interface further includes a third prompt label, and this label is used to prompt the user of a current slow-motion recording status. As shown in FIG. 4-4a, content of the third prompt label is "Detecting the detection image . . . ", to prompt the user that the electronic device is detecting a main object in the detection image. The third prompt label is used to display the main object (including a person or a non-human object). As shown in FIG. 4-4b, content of the third prompt label is "Non-human object". Further, the third prompt label is used to display a name of the main object. For example, as shown in FIG. 4-4c, the main object is a balloon, and the content of the third prompt label is "Balloon".

Figure 5A:
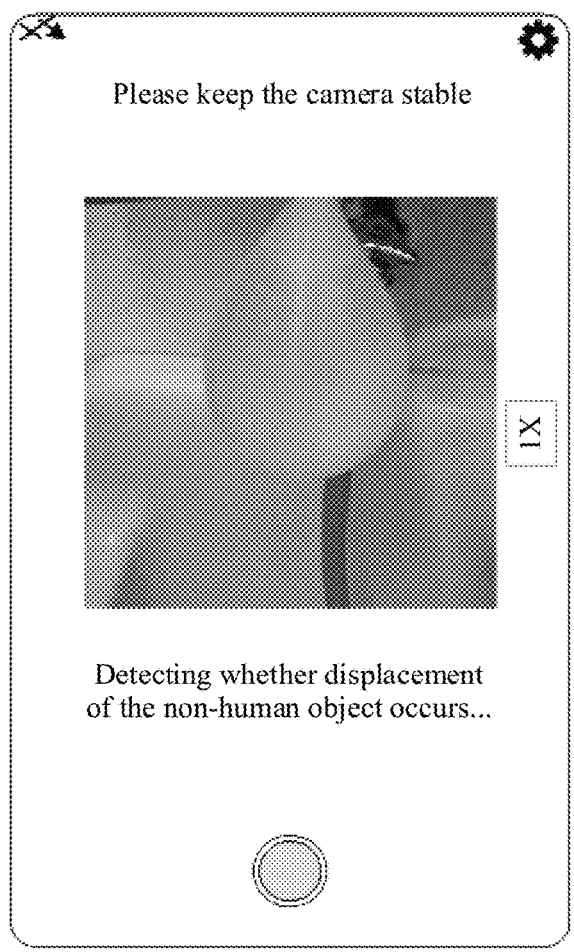
FIG. 5A and FIG. 5B are a UI interface for recording a slow-motion video according to an embodiment of this application.
Figure 5B:
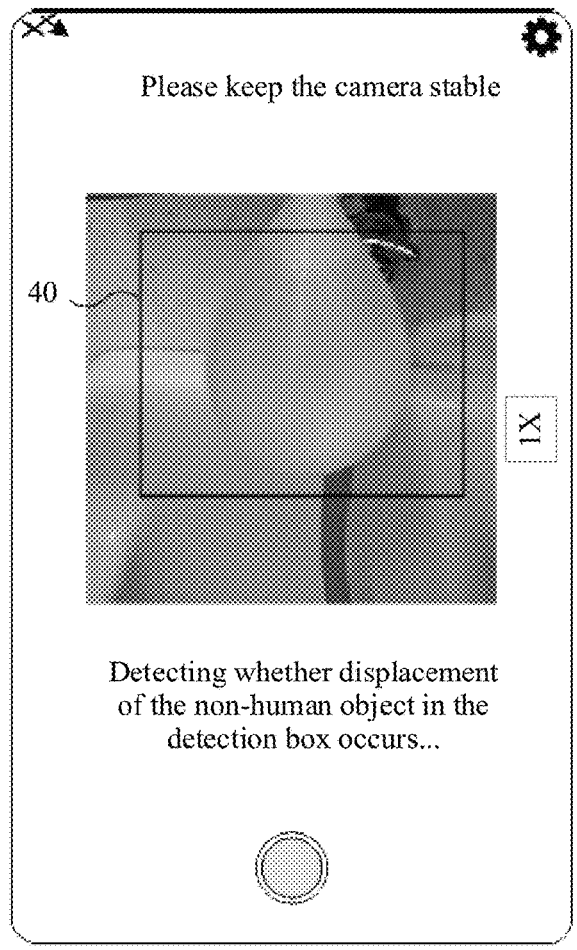

Optionally, in an example, during detection of a non-human object, as shown in FIG. 5A, content of the third prompt label is "Detecting whether displacement of the non-human object occurs . . . "; or as shown in FIG. 5B, content of the third prompt label is "Detecting whether displacement of the non-human object in the detection box occurs . . . ".

Optionally, in a feasible embodiment, the third prompt label is further used to indicate that displacement of the main object occurs or does not occur.

In a feasible embodiment, the displacement detection network is implemented based on a convolutional neural network, and the posture detection network is also implemented based on a convolutional neural network.

Optionally, in a feasible embodiment, before the displacement detection network is used, the displacement detection network is trained. A plurality of training samples are obtained, and each training sample includes an image sample and a motion type corresponding to the image sample. Then, image samples in all training samples are sequentially input into an initial network for performing detection, to obtain a motion detection result corresponding to each image sample. After that, a parameter in the initial network is adjusted based on the motion type corresponding to the image sample and the motion detection result corresponding to the image sample, to obtain an adjusted initial network. The adjusted initial network is trained for a plurality of times according to this method to obtain the foregoing displacement detection network. Similarly, the posture detection network may also be obtained through training based on the foregoing method.

Figure 5C:
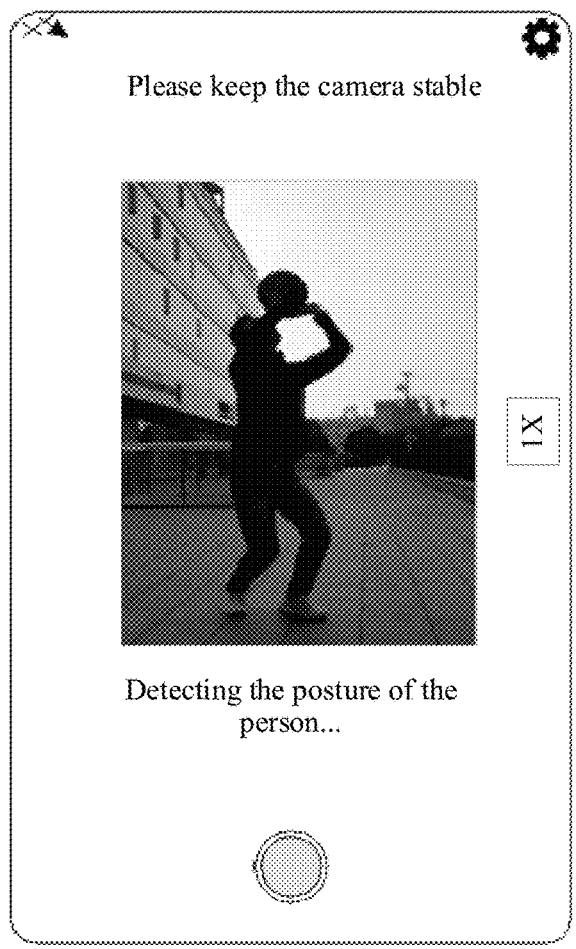
FIG. 5C and FIG. 5D are a UI interface for recording a slow-motion video according to an embodiment of this application.
Figure 5D:
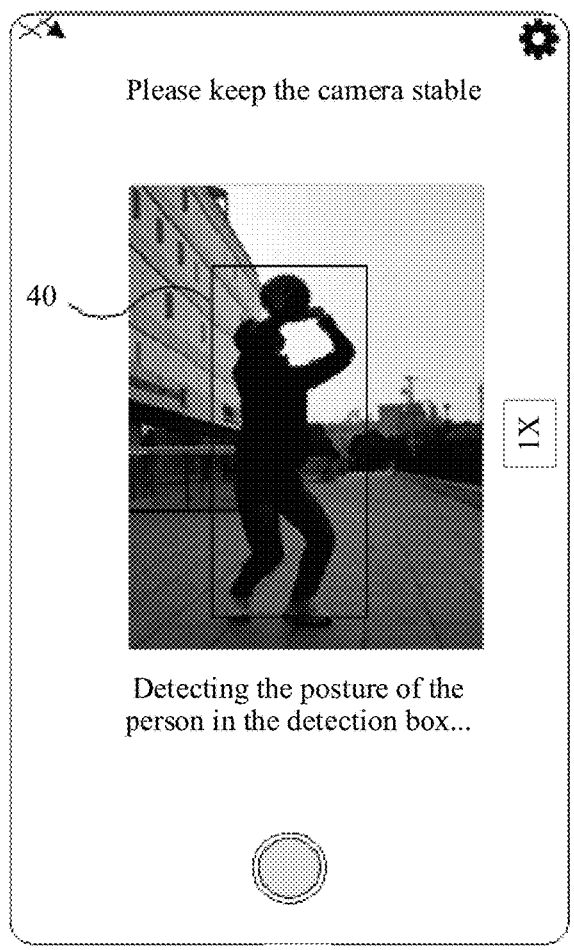

In an example, during detection of a posture of the person, display content of the third prompt label is shown in FIG. 5C, and content of the third prompt label is "Detecting the posture of the person . . . "; or is shown in FIG. 5D, and content of the third prompt label is "Detecting the posture of the person in the detection box . . . ".

In a feasible embodiment, the determining a first video clip in the video stream based on the preset motion includes: obtaining a first target image from the video stream, where the first target image is an image that is in the video stream and that corresponds to a moment at which the main object has largest acceleration in a process of the preset motion; obtaining a timestamp $t_{w1}$ of the first target image in the video stream; and obtaining the first video clip based on the timestamp $t_{w1}$ of the first target image and a time span t of the first video clip, where a timestamp of a start frame of the first video clip is $t_2=t_{w1}-at$, a timestamp of an end frame of the first video clip is $t_3=t_{w1}+bt$, a and b are constants, a+b=1, and the first video clip includes an image with a timestamp not less than $t_2$ and not greater than $t_3$.

Figure 6A:
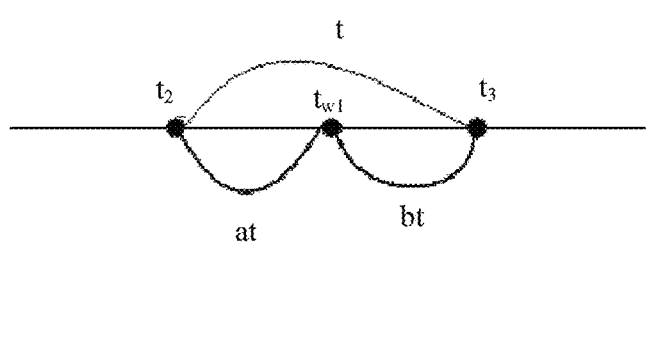
FIG. 6A is a schematic diagram of a manner of obtaining a first video clip according to an embodiment of this application.
Figure 6A:
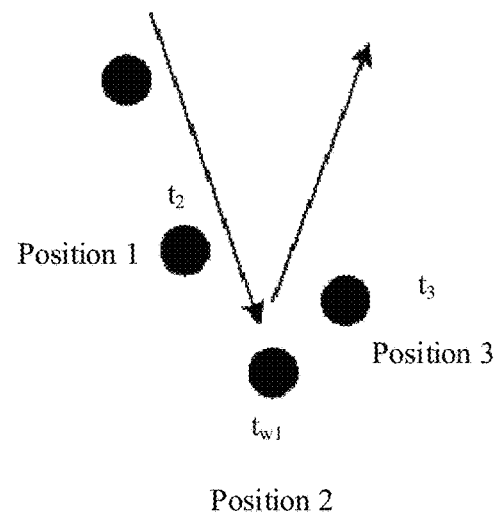

For example, in the case of shooting a slow motion of landing and bouncing of a small ball, as shown in FIG. 6A, the small ball is located at a position 1 at a moment $t_2$, located at a position 2 at a moment $t_{w1}$, and located at a position 3 at a moment $t_3$. The small ball touches the ground and starts to bounce at the position 2, and acceleration is the largest (that is, a velocity change is the largest). Therefore, an image with a timestamp $t_{w1}$ is determined as the first target image. The first video clip is obtained based on the timestamp $t_{w1}$ of the first target image and the time span t of the first video clip, where the timestamp of the start frame of the first video clip is $t_2=t_{w1}-at$, and the timestamp of the end frame of the first video clip is $t_3=t_{w1}+bt$.

It should be noted herein that the moment at which the main object has the largest acceleration is a moment at which a velocity change of the main object is the largest. The acceleration of the main object is obtained based on two adjacent frames in the video stream. It is assumed that acceleration obtained based on two adjacent frames of images A and B in the video stream is the largest. The first target image may be the image A or the image B.

It should be understood that, when displacement of the main object occurs or the main object makes a preset posture, it indicates that, in the video stream, a pixel corresponding to the main object changes between two adjacent frames of images, or it may indicate that a pixel corresponding to a specific position of the main object changes between adjacent images. Such a change can be represented by relative displacement of the pixel. A motion velocity of the pixel can be determined based on displacement on a scale of pixels. For example, for any two frames of images, a ratio of displacement of a pixel of same content to a time interval between the two frames of images may be expressed as a motion velocity of the pixel. Because the image is an objective reflection of a real scene, a motion velocity of a pixel at a particular position of the main object may reflect a motion velocity of the main object in a real scene.

In an example, for a scene of making a fire with a lighter, a first target image corresponding to the scene is shown in FIG. 7A, where the lighter bursts out spark. For a scene of pouring water into a balloon, a first target image corresponding to the scene is shown in FIG. 7B, where the balloon explodes. For a scene of throwing a U-shaped pillow, a first target image corresponding to the scene is shown in FIG. 7C, where a moment at which the U-shaped pillow starts to land is shown.

In a feasible embodiment, the obtaining a first target image from the video stream includes: obtaining N frames of images from the video stream at equal time intervals, separately inputting two adjacent frames of images in the N frames of images into the optical flow network for computing to obtain N-1 optical flow images, and then obtaining N-1 eigenvectors based on the N-1 optical flow images. If the main object in the video stream is a non-human object, the N-1 eigenvectors are obtained by separately inputting two adjacent frames in the N frames of images into the displacement detection network for computing. If the main object in the video stream is a person, the N-1 eigenvectors are obtained by separately inputting two adjacent frames in the N frames of images into the posture detection network for computing. A degree of similarity between each of N-2 eigenvectors and an eigenvector V to obtain N-2 degrees of similarity. The eigenvector V is the first eigenvector of the N-1 eigenvectors, and the first eigenvector of the N-1 eigenvectors is obtained based on the first frame and the second frame of the N frames of images. The N-2 eigenvectors are eigenvectors in the N-1 eigenvectors except the eigenvector V. An image corresponding to a smallest degree of similarity in the N-2 degrees of similarity is determined as the first target image.

A degree of similarity between an $i^{th}$ eigenvector and the first eigenvector of the N-1 eigenvectors may be expressed as:

$$Sim_i = \frac{Vec_i \cdot Vec_1}{|Vec_1||Vec_i|} \quad \text{Formula 1}$$

$Sim_i$ is a degree of similarity between the $i^{th}$ and the first eigenvector of the N-1 eigenvectors, $Vec_i$ is the $i^{th}$ eigenvector of the N-1 eigenvectors, and $Vec_1$ is the first eigenvector of the N-1 eigenvectors, where i=2, 3, 4, . . . , N-1.

According to the foregoing Formula 1, N-2 degrees of similarity can be obtained through computing. An image corresponding to a smallest degree of similarity in the N-2 degrees of similarity is selected as the first target image. For example, a degree of similarity between an eigenvector $Vec_4$ and $Vec_1$ (namely, the third degree of similarity of the N-2 degrees of similarity) is the smallest, and the eigenvector $Vec_4$ is obtained based on optical flow images of the fourth frame and the fifth frame in the N frames of images. Therefore, an image corresponding to the third degree of similarity of the N-2 degrees of similarity is the fourth frame of the N frames of images. That is, the first target image is the fourth frame in the N frames of images.

For example, it is assumed that a buffered video stream includes 960 frames of images, from which 30 frames (for example, the $32^{nd}$, $64^{th}$, $96^{th}$, $128^{th}$, . . . , $960^{th}$ frames in the 960 frames of images) are extracted at equal time intervals. According to the foregoing method, 29 optical flow images can be obtained based on the 30 frames of images, and 29 eigenvectors can be obtained based on the 29 optical flow images. Degrees of similarity between the $2^{nd}$, $3^{rd}$, $4^{th}$, . . . , $29^{th}$ eigenvectors of the 29 eigenvectors and the first eigenvector are separately computed, to obtain 28 degrees of similarity in total. Assuming that the fourth degree of similarity in the 28 degrees of similarity is the smallest, the fifth frame (the $160^{th}$ frame in the 960 frames of images) in the 30 frames of images is determined as the first target image.

Optionally, a may be 0.1, 0.2, 0.3, 0.4, 0.5, 0.6, 0.7, or another value, and b may be 0.1, 0.2, 0.3, 0.4, 0.5, 0.6, 0.8, 0.9, or another value.

For example, t=0.8 s, a is 0.4, and b is 0.6. In this case, the timestamp of the start frame of the first video clip is $t_2=t_{w1}-0.32$ s, and the timestamp of the end frame is $t_3=t_{w1}+0.48$ s. In other words, in the video stream, image frames with a time span of 0.8 s is selected by using the first target image as a center, to obtain the first video clip, where the first video clip includes the first target image.

Optionally, the first target image may show that the preset motion occurs on the main object. For example, in the case of shooting a slow motion of landing of a small ball, a preset motion is that the small ball starts to bounce after it touches the bottom. For another example, in the case of a slow motion of making a fire with a lighter, the preset motion is that the lighter starts to burst out sparks.

In a feasible embodiment, the determining a first video clip in the video stream based on the preset motion includes: obtaining a second target image from the video stream, where a timestamp of the second target image is a moment at which a preset to-be-captured action of the main object is detected; obtaining a timestamp $t_{w2}$ of the second target image in the video stream; and obtaining the first video clip from the video stream based on the timestamp $t_{w2}$ of the second target image and a time span t of the first video clip, where a timestamp of a start frame of the first video clip is $t_2=t_{w2}-at$, a timestamp of an end frame of the first video clip is $t_3=t_{w2}+bt$, a and b are constants, a+b=1, and the first video clip includes an image with a timestamp not less than $t_2$ and not greater than $t_3$.

Optionally, a may be 0.1, 0.2, 0.3, 0.4, 0.5, 0.6, 0.7, or another value, and b may be 0.1, 0.2, 0.3, 0.4, 0.6, 0.8, 0.9, or another value.

For a non-human object, for example, in the case of landing of a small ball, a preset to-be-captured action is that the small ball starts to bounce after it touches the bottom; for example, in the case of making a fire with a lighter, a preset to-be-captured action is that the lighter bursts out sparks. For a person, in the case of jumping, a preset to-be-captured action is leaping from the ground.

In a feasible embodiment, the determining a first video clip in the video stream based on the preset motion includes: obtaining a third video clip from the video stream, where the third video clip is a video clip including a preset to-be-captured action; obtaining a timestamp $t_{q1}$ of a start frame and a timestamp $t_{s1}$ of an end frame of the third video clip; and obtaining the first video clip based on the timestamp $t_{q1}$ of the start frame and the timestamp $t_{s1}$ of the end frame of the third video clip and a time span t of the first video clip, where a timestamp of a start frame of the first video clip is $t_2=t_{q1}-at$, a timestamp of an end frame of the first video clip is $t_3=t_{s1}+bt$, a and b are constants, $at+bt+t_{s1}-t_{q1}=t$, and the first video clip includes an image with a timestamp not less than $t_2$ and not greater than $t_3$.

For example, in the case of shooting a slow motion of landing of a small ball, the third video clip is a video clip including that the small ball starts to bounce after it touches the bottom. For another example, in the case of a slow motion of making a fire with a lighter, the third video clip is a video clip including that the lighter starts to burst out sparks until flame burns out. For another example, in the case of shooting a slow motion of waving a hand, the third video clip is a video clip including waving the hand left and right or up and down.

Figure 6B:
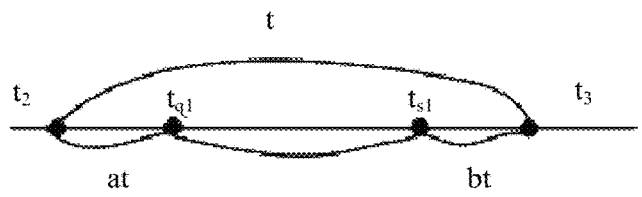
FIG. 6B is a schematic diagram of another manner of obtaining a first video clip according to an embodiment of this application.
Figure 6B:
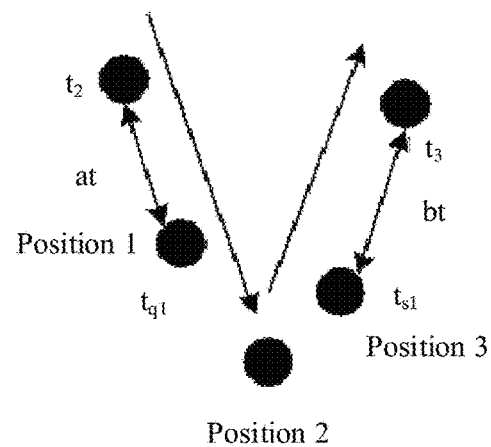

For example, in the case of shooting a slow motion of landing and bouncing of a small ball, as shown in FIG. 6B, the third video clip is a video including a displacement change process of the small ball from the position 1 to the position 3 at which the small ball bounces after it touches the ground. A moment at which the small ball is located at the position 1 is $t_{q1}$, a moment at which the small ball is located at the position 3 is $t_{s1}$, the timestamp of the start frame of the third video clip is $t_{q1}$, and the timestamp of the end frame is $t_{s1}$. The first video clip includes the third video clip. Therefore, the timestamp of the start frame of the first video clip is $t_2=t_{q1}-at$, the timestamp of the end frame of the first video clip is $t_3=t_{s1}+bt$, and $at+bt+t_{s1}-t_{q1}=t$.

In a feasible embodiment, the determining a first video clip in the video stream based on the preset motion includes: obtaining a third target image from the video stream; obtaining a timestamp $t_{w3}$ of the third target image in the video stream, where the timestamp $t_{w3}$ is a moment at which the person or an object starts to move; and obtaining the first video clip based on the timestamp $t_{w3}$ of the third target image and a time span t of the first video clip, where a timestamp of a start frame of the first video clip is $t_2=t_{w3}$, a timestamp of an end frame of the first video clip is $t_3=t_{w3}+t$, and the first video clip includes an image with a timestamp not less than $t_2$ and not greater than $t_3$.

It should be noted that the moment corresponding to the timestamp of the third target image is a moment at which the person makes the target posture in the shooting scene or a moment at which displacement of the non-human object occurs in the shooting scene.

Figure 6C:
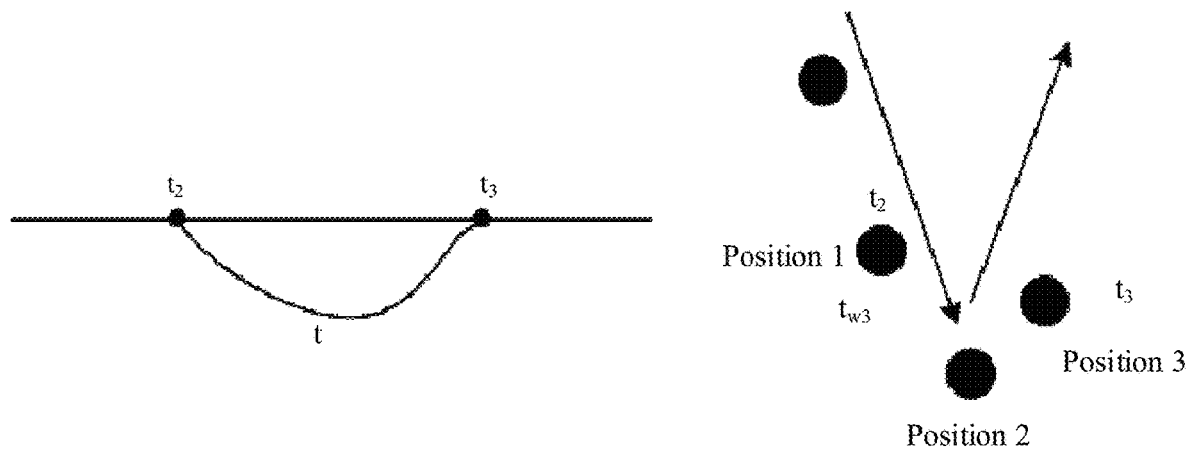
FIG. 6C is a schematic diagram of another manner of obtaining a first video clip according to an embodiment of this application.

For example, in the case of shooting a slow motion of landing and bouncing of a small ball, as shown in FIG. 6C, it is detected that the small ball starts to fall (that is, displacement of the small ball starts to occur) at a moment to. Therefore, the timestamp $t_2$ of the start frame of the first video clip is determined as $t_{w3}$. The timestamp $t_3=t_{w3}+t$ of the end frame of the first video clip is determined based on the time span t of the first video clip. By the time, the small ball has touched the ground and bounced off the ground at the moment $t_3$.

The time span t of the first video clip may be preset duration, or may be determined by the electronic device based on a shooting status.

S302. Determine a first frame rate based on the preset motion.

In a feasible embodiment, the determining a first frame rate based on the preset motion includes: obtaining a motion velocity of the main object from the video stream, and determining the first frame rate based on the motion velocity of the main object, where a larger motion velocity of the main object indicates a larger first frame rate.

Optionally, in a feasible embodiment, the obtaining a motion velocity of the main object from the video stream, and determining the first frame rate based on the motion velocity of the main object includes: obtaining N frames of images from the video stream, and obtaining N-1 motion velocities of the main object based on two adjacent frames of images in the N frames of images, where the motion velocity of the main object may be an instantaneous velocity, an average velocity, or a largest instantaneous velocity of the main object, or may be a linear velocity or an angular velocity of the main object. Certainly, the motion velocity may be another velocity, which is not enumerated herein. Then, a target velocity is obtained based on the N-1 motion velocities, and the target motion velocity is a largest value, an average value, or the like of the N-1 motion velocities of the main object. Finally, a frame rate corresponding to the target velocity is obtained based on a correspondence between a velocity and a frame rate, where the frame rate is the first frame rate.

Optionally, in a feasible embodiment, the obtaining a motion velocity of the main object from the video stream, and determining the first frame rate based on the motion velocity of the main object includes: obtaining N frames of images from the video stream at equal time intervals; separately inputting two adjacent frames of images in the N frames of images into the optical flow network for computing to obtain N-1 optical flow images, and inputting the N-1 optical flow images into the displacement detection network for computing to obtain N-1 eigenvectors; obtaining N-1 motion velocities based on the N-1 eigenvectors, where the N-1 eigenvectors have a one-to-one correspondence with the N-1 motion velocities; and obtaining the first frame rate based on a largest value $V_{max}$ of the N-1 motion velocities.

Figure 6D:
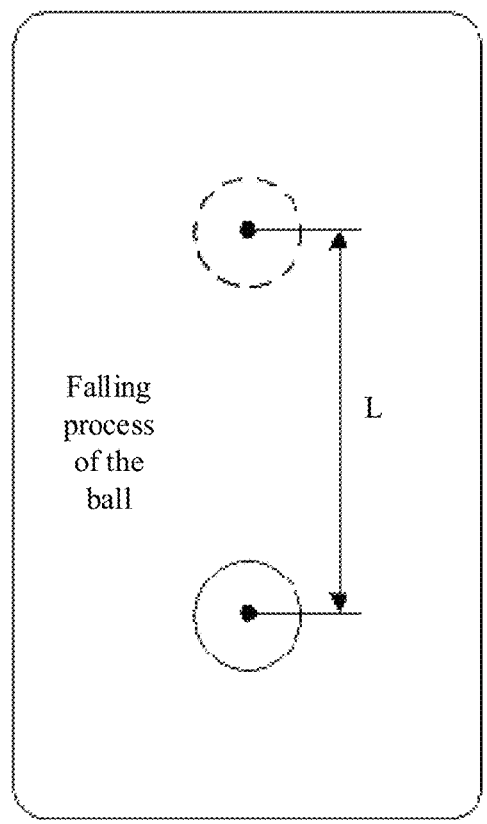
FIG. 6D is a schematic diagram of principles of a motion velocity of an object according to an embodiment of this application.

It should be noted herein that the motion velocity is a quantity of pixels between positions of a preset point of the main object in two adjacent frames in the N frames of images per unit time. As shown in FIG. 6D, the figure shows positions of the ball in two adjacent frames in a falling process. L represents a relative position of a mass point of the small ball in two adjacent frames, and a motion velocity corresponding to the two adjacent frames is a quantity of pixels on the distance L per unit time.

Further, for a correspondence between the motion velocity and the frame rate, refer to the following Table 1.

TABLE 1

| Value range of a motion velocity | First frame rate |
|---|---|
| $V_{max} < 2$ | 120 fps |
| $2 \leq V_{max} < 4$ | 240 fps |
| $4 \leq V_{max} < 10$ | 480 fps |
| $10 \leq V_{max} < 20$ | 960 fps |
| $20 \leq V_{max} < 40$ | 1920 fps |
| $40 \leq V_{max}$ | 7680 fps |

$V_{max}$ is the largest motion velocity in the N-1 motion velocities. When $V_{max}<2$, the first frame rate is 120 fps. When $2 \leq V_{max}<4$, the first frame rate is 240 fps. When $4 \leq V_{max}<10$, the first frame rate is 480 fps. When $10 \leq V_{max}<20$, the first frame rate is 960 fps. When $20 \leq V_{max}<40$, the first frame rate is 1920 fps. When $40 \leq V_{max}$, the first frame rate is 7680 fps. The motion velocity in the table above is expressed in pixels/frame.

Figure 6E:
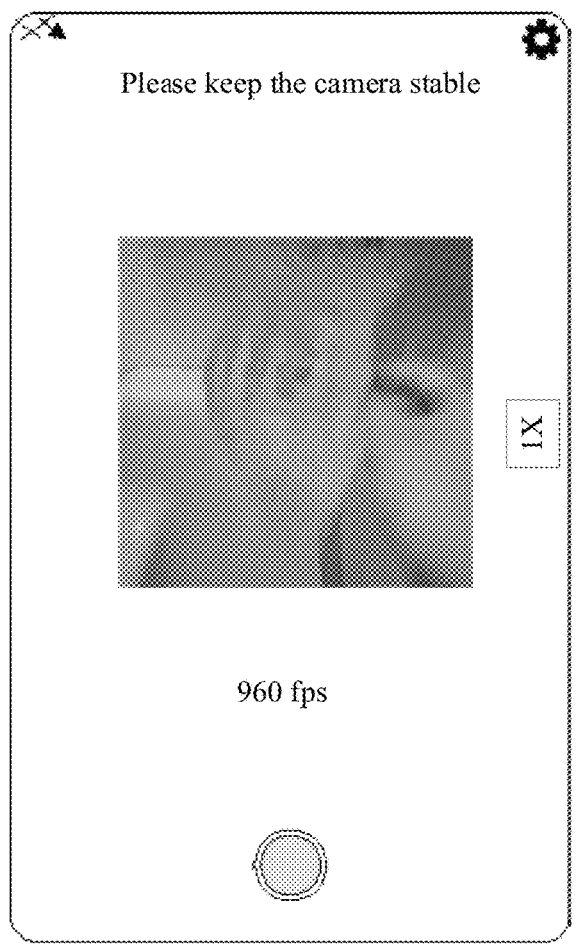
FIG. 6E and FIG. 6F are a UI interface for recording a slow-motion video according to an embodiment of this application.
Figure 6F:
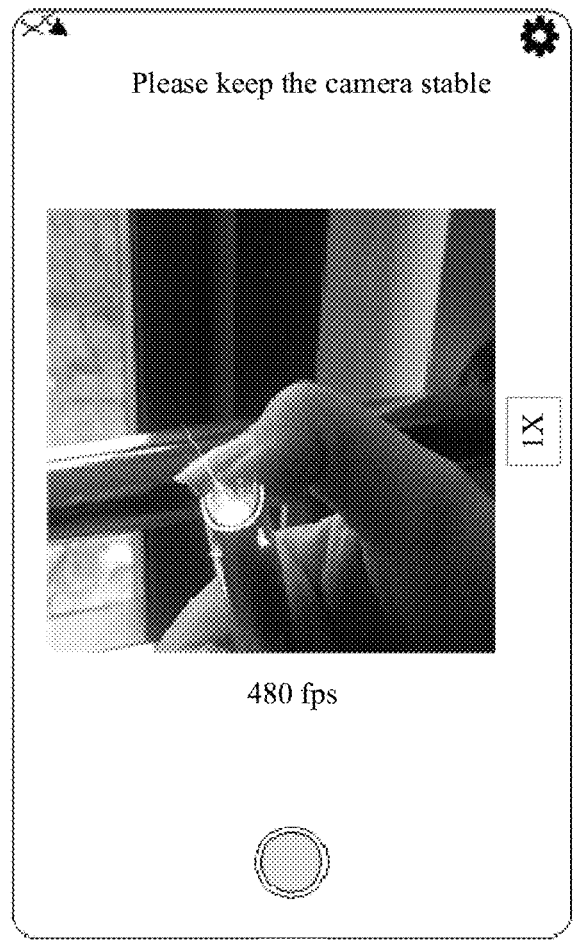

In an example, the third prompt label is further used to prompt the user of the current first frame rate. As shown in FIG. 6E, during recording of a slow-motion video of pouring water into a balloon until explosion occurs, content of the third prompt label is "960 fps", indicating that the first frame rate is 960 fps. As shown in FIG. 6F, during recording of a slow-motion video of making a fire with a lighter, content of the third prompt label is "480 fps", indicating that the first frame rate is 480 fps. For the scene of making a fire with a lighter, the motion velocity is a velocity of forming a flame.

In a feasible embodiment, the determining a first frame rate based on the preset motion includes: obtaining the first frame rate based on the target posture of the main object, where different target postures of the main object indicate different first frame rates.

A frame rate corresponding to the target posture can be determined based on a correspondence between a posture of a person and a frame rate, and the frame rate is the first frame rate.

Figure 6G:
FIG. 6G and FIG. 6H are UI interfaces for recording a slow-motion video according to an embodiment of this application.
Figure 6H:

Main objects with different postures may correspond to different first frame rates, and a same person with different postures may also correspond to different first frame rates. As shown in FIG. 6G, an action of a person is running, and a frame rate corresponding to the action is 240 fps. As shown in FIG. 6H, an action of a person is basketball shooting, and a frame rate corresponding to the action is 480 fps.

In a feasible embodiment, after the timestamp $t_3$ of the end frame of the first video clip is obtained, the method in this application further includes: determining a moment for ending slow-motion video recording, where the moment for ending slow-motion video recording is $t_4$, $t_4=t_3+t'$, and $t'$ is preset duration or is determined by the electronic device based on a shooting status; or the moment for ending slow-motion video recording is a moment after an instruction of the user for stopping slow-motion video recording is received, and the moment is before $t_4$.

After the timestamp $t_3$ of the end frame of the first video clip is determined, the moment $t_4$ for ending slow-motion video recording is determined based on the timestamp $t_3$ and the preset duration $t'$. The moment for ending slow-motion video recording is $t_4=t_3+t'$. Alternatively, the moment for ending slow-motion video recording is the moment $t_{34}$ after the instruction of the user for stopping slow-motion video recording is received, the moment $t_{34}$ is before $t_4$, and the moment for ending slow-motion video recording is a moment at which the video stream is no longer obtained.

It should be understood that, in this application, a collection frame rate of the video stream is a frame rate at which an image sensor of the electronic device collects images or a frame rate at which a camera collects images.

Optionally, the instruction of stopping slow-motion video recording is a touch instruction of taping the recording start function button again by the user, or may be a voice instruction of the user.

S303. Process the first video clip based on the first frame rate to obtain a second video clip.

A play time of the second video clip at a target play frame rate is greater than a collection time of the first video clip, and the first frame rate is greater than the target play frame rate.

It should be understood that the first video clip and the second video clip each are a combination of a group of video frames, and play duration of the video clip is related to a frame quantity and a play frame rate of the video clip.

In a feasible embodiment, the processing the first video clip based on the first frame rate to obtain a second video clip includes: if the first frame rate is greater than a collection frame rate of the video stream, performing frame interpolation on the first video clip to obtain the second video clip; or if the first frame rate is less than a collection frame rate of the video stream, performing sampling on the first video clip to obtain the second video clip, where a ratio of a frame quantity of the second video clip to a frame quantity of the first video clip is equal to a ratio of the first frame rate to the collection frame rate of the video stream.

In a feasible example, the first frame rate is different from the collection frame rate of the video stream.

After the first video clip is obtained, it is determined whether the first frame rate is the same as the collection frame rate of the video stream. When the first frame rate is the same as the collection frame rate of the video stream, processing on the first video clip is skipped, that is, the first video clip is the second video clip. It can be understood that skipping processing on the first video clip is a special processing manner. If the first frame rate is greater than the collection frame rate of the video stream, frame interpolation is performed on the first video clip to obtain the second video clip. Alternatively, if the first frame rate is less than the collection frame rate of the video stream, sampling is performed on the first video clip to obtain the second video clip. The ratio of the frame quantity of the second video clip to the frame quantity of the first video clip is equal to the ratio of the first frame rate to the collection frame rate of the video stream.

It should be noted herein that, a purpose of performing frame interpolation on a video clip is to make the video clip include more images, so that a play time at the target play frame rate is longer, and further, the user can view more details of the main object in motion.

For example, the image sensor performs collection for 0.5 s at a collection frame rate of 560 fps to obtain a video clip with a frame quantity of 280. Frame interpolation is performed on the video clip. It is assumed that the frame quantity of the video clip after the frame interpolation is 560 frames, which may be considered that the image sensor collects 560 frames of images in 0.5 s.

Optionally, the collection frame rate of the video stream may be 240 fps, 360 fps, 480 fps, 720 fps, 960 fps, 1920 fps, or another value.

It may be understood that, assuming that the collection frame rate of the video stream is 240 fps, 360 fps, 480 fps, 720 fps, 960 fps, or another frame rate less than 1920 fps, if the user expects to perform collection at 1920 fps or at a frame rate greater than 1920 fps to obtain a video clip in the video stream, frame interpolation may be performed on the video clip, so that a quantity of frames collected in a unit time is increased. An interpolated frame is obtained based on two frames that are respectively before and after an interpolation position, or is obtained by using a particular algorithm, so that images are consecutive and harmonious. Because a play frame rate of the second video clip is less than a frame rate expected by the user, a play time of the second video clip is greater than the collection time of the first video clip.

Similarly, because a moving velocity or a motion velocity of the main object is very slow, a frame quantity of a video clip obtained by performing collection for 0.5 s at a collection frame rate of 720 fps is 360 frames. If the video clip is played at a play speed of 30 fps, the video clip needs to be played for 16 s. However, for a video clip in which a moving velocity or a motion velocity of the main object is very slow, the user expects that play of the video clip can be completed in 4 seconds or less. Therefore, it is necessary to perform sampling on the obtained video clip.

The frame interpolation operation includes: interpolating an auxiliary frame between two adjacent frames of the first video clip. A background of the auxiliary frame is the same as backgrounds of the two adjacent frames that are respectively before and after the auxiliary frame. A position of the main object in the auxiliary frame is located in a position range of the main object in the two adjacent frames. As shown in FIG. 7D, the solid line represents an image before frame interpolation, and the dashed line represents an auxiliary frame. The collection frame rate of the video stream is 560 fps. Assuming that collection is performed for 0.5 s at this frame rate to obtain the first video clip, a frame quantity of the first video clip is 280. After an auxiliary frame is interpolated between two adjacent frames, a frame quantity of an obtained video clip is 559.

Optionally, one frame may be interpolated before a start frame of the video clip or one frame may be interpolated after an end frame of the video clip, to obtain a second video clip. A frame quantity of the second video clip is 560, which is equivalent to performing collection for 0.5 s to obtain 560 frames. This is equivalent to that the collection frame rate of the video stream is 1120 fps. If two auxiliary frames are interpolated between two adjacent frames, a frame quantity of an obtained video clip is 838 frames. Optionally, two frames may be interpolated before a start frame of the video clip or two frames may be interpolated after an end frame of the video clip, to obtain a second video clip. A frame quantity of the second video clip is 840, which is equivalent to that the collection frame rate of the video stream is 1680 fps.

The sampling operation includes: performing uniform sampling or non-uniform sampling on the second video clip or a non-second video clip. The uniform sampling means that in the first video clip, a quantity of image frames between two adjacent sampled frames is fixed, and the non-uniform sampling means that in the second video clip, a quantity of image frames between two adjacent sampled frames varies. As shown in FIG. 7E, the collection frame rate of the video stream is 960 fps. Assuming that collection is performed for 0.5 s at this frame rate to obtain the first video clip, a frame quantity of the first video clip is 480. One frame is sampled from the first video clip at an interval of one frame, and a frame quantity of images of a sampled second video clip is 240, which is equivalent to that 240 frames are collected in 0.5 s. This is equivalent to that the collection frame rate of the video stream is 480 fps.

Figure 7F:
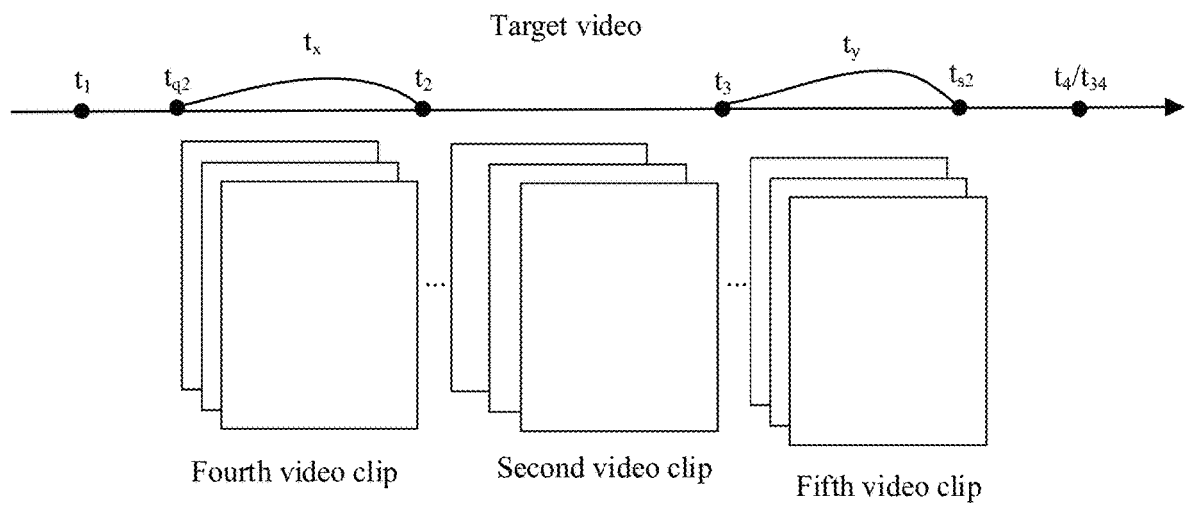
FIG. 7F is a schematic diagram of a target video according to an embodiment of this application.

For a slow-motion video, a video clip used for normal-speed play is included both before and after a highlight clip. In a feasible embodiment, the method in this application further includes: obtaining a fourth video clip and a fifth video clip from the video stream; and obtaining a target video based on the fourth video clip, the fifth video clip, and the second video clip, where a timestamp of a start frame of the fourth video clip is $t_{q2}=t_2-t_x$, an end frame of the fourth video clip is a previous frame of the start frame of the first video clip, a start frame of the fifth video clip is a next frame of the end frame of the first video clip, a timestamp of an end frame of the fifth video clip is $t_{s2}=t_3+t_y$, the fourth video clip includes an image with a timestamp greater than $t_{q2}$ and less than $t_2$, the fifth video clip includes an image with a timestamp greater than $t_3$ and less than $t_{s2}$, and $t_x$ and $t_y$ are the same or different, as shown in FIG. 7F.

Optionally, $t_x$ may be 0.1 s, 0.3 s, 0.5 s, 1s, or another value. Similarly, $t_y$ may be 0.1 s, 0.3 s, 0.5 s, 1s, or another value.

In a feasible embodiment, the obtaining a target video based on the fourth video clip, the fifth video clip, and the second video clip includes: if the collection frame rate of the video stream is greater than a play frame rate of the target video, performing a sampling operation on the fourth video clip and the fifth video clip to obtain a sixth video clip and a seventh video clip, where a ratio of a frame quantity of the sixth video clip to a frame quantity of the fourth video clip is equal to a ratio of a play frame rate of the target video to the collection frame rate of the video stream, a ratio of a frame quantity of the seventh video clip to a frame quantity of the fifth video clip is equal to a ratio of the play frame rate of the target video to the collection frame rate of the video stream, the target video includes the second video clip, the sixth video clip, and the seventh video clip, and the second video clip, the sixth video clip, and the seventh video clip are temporally consecutive.

It should be noted that, that the second video clip, the sixth video clip, and the seventh video clip are temporally consecutive means that image frames in the second video clip, the sixth video clip, and the seventh video clip are temporally consecutive.

Both the fourth video clip and the fifth video clip are video clips that are played at a constant speed, and a video play rate is generally less than the collection frame rate of the video stream. Therefore, sampling needs to be performed on the fourth video clip and the fifth video clip, and the sampling may include uniform sampling and non-uniform sampling.

It should be understood that the constant speed means that when a video is played at the speed, frame freezing of pictures viewed by the user cannot be perceived, and fast-forwarding of the video cannot be perceived by the user.

It should be noted that the target play frame rate is also the constant speed mentioned herein, and the constant speed is generally 24 fps to 30 fps.

For example, the user expects that the fourth video clip and the fifth video clip each are played for 1 s at a constant speed, a frame quantity of the fourth video clip is 120, and the constant speed is 30 fps. If the fourth video clip is played for is at a play speed of 30 fps, sampling needs to be performed on the fourth video clip, to obtain a sixth video clip. A frame quantity of the sixth video clip is 30. If uniform sampling is used, one frame is sampled at an interval of three frames. The fifth video clip may be processed in a similar manner to obtain a seventh video clip.

After the sixth video clip and the seventh video clip are obtained, unified processing is performed on timestamps of images in the second video clip, the sixth video clip, and the seventh video clip, so that the timestamps of the images in the sixth video clip, the second video clip, and the seventh video clip are temporally consecutive, to obtain the target video. The target video includes the second video clip, the sixth video clip, and the seventh video clip.

It should be noted herein that the shooting scene includes the main object and a background. In an entire recording process, the main object moves, and the background remains unchanged.

It should be noted herein that the electronic device obtains the video stream in real time, and the electronic device buffers a video stream of preset duration tg. For example, the electronic device already buffers a video stream of tg. After tg', a video stream of tg' that is earliest buffered in the previously buffered video stream of tg is deleted, and a newly obtained video stream of tg' is buffered. The buffered video stream is processed by using the foregoing method, to obtain the target video.

Optionally, tg is 0.5 s, 1s, 2 s, 4 s, or another value, tg' is 0.1 s, 0.2 s, 0.3 s, 0.4 s, or another value, and tg is greater than tg'.

In another specific embodiment, the electronic device obtains and stores a video stream of preset duration tm, and then performs the following operations according to the specific method described in the foregoing steps S301 to S303: detecting that a preset motion occurs on a main object in a video stream; determining a first video clip in the video stream based on the preset motion; determining a first frame rate based on the preset motion; and processing the first video clip based on the first frame rate to obtain a second video clip, where a play time of the second video clip is greater than a collection time of the first video clip.

For specific descriptions of the foregoing operations, refer to related descriptions of steps S301 to S303. Details are not described herein again.

Optionally, tm is 0.5 s, 1 s, 2 s, 3 s, 4 s, 5 s, or another value.

In an existing technology, background music is generally not added during recording of a slow-motion video, and a user needs to manually add background music after recording the slow-motion video, which is troublesome for the user.

Therefore, in a feasible embodiment of this application, background music is added to the slow-motion video after the slow-motion video is obtained.

That background music is added to the slow-motion video includes: obtaining scene information of the second video clip; obtaining, based on the scene information of the second video clip, a music database corresponding to the second video clip; and determining any piece of music in the music database corresponding to the second video clip as background music of the target video.

It should be noted herein that the shooting scene includes a background and the main object. In an entire recording process, the background remains unchanged, and the main object moves.

Figure 7G:
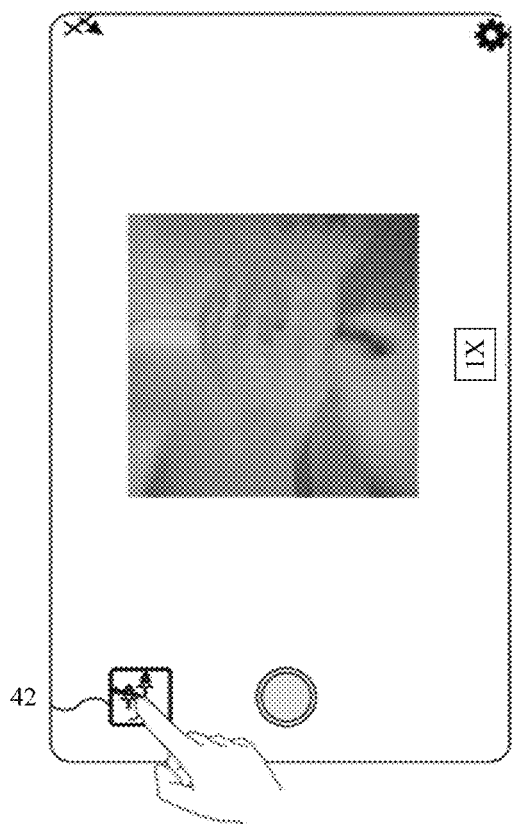
FIG. 7G and FIG. 7H are a schematic diagram of a target video playback manner according to an embodiment of this application.
Figure 7H:
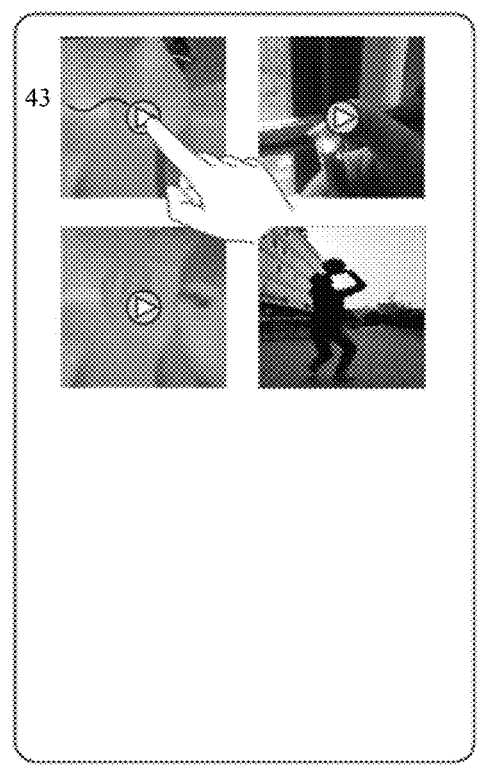

Optionally, after the slow-motion video is obtained, the slow-motion video is directly played, or the slow-motion video and the background music of the slow-motion video are directly played. Alternatively, after the slow-motion video is obtained, the user taps an icon 42 corresponding to an image library application, as shown in FIG. 7G, to enter the image library, and taps a play function button 43 on an icon of a video to be played, as shown in FIG. 7H, to play the slow-motion video and the background music. The icon 42 and the play function button 43 are merely used as an example for description, and are not intended to limit this application.

Figure 8A:
FIG. 8A, FIG. 8B, FIG. 8C, FIG. 8D, FIG. 8E, FIG. 8F, FIG. 8G, FIG. 8H, FIG. 8I, FIG. 8J, FIG. 8K, FIG. 8L, and FIG. 8M are UI interfaces for recording a slow-motion video according to an embodiment of this application.
Figure 8B:
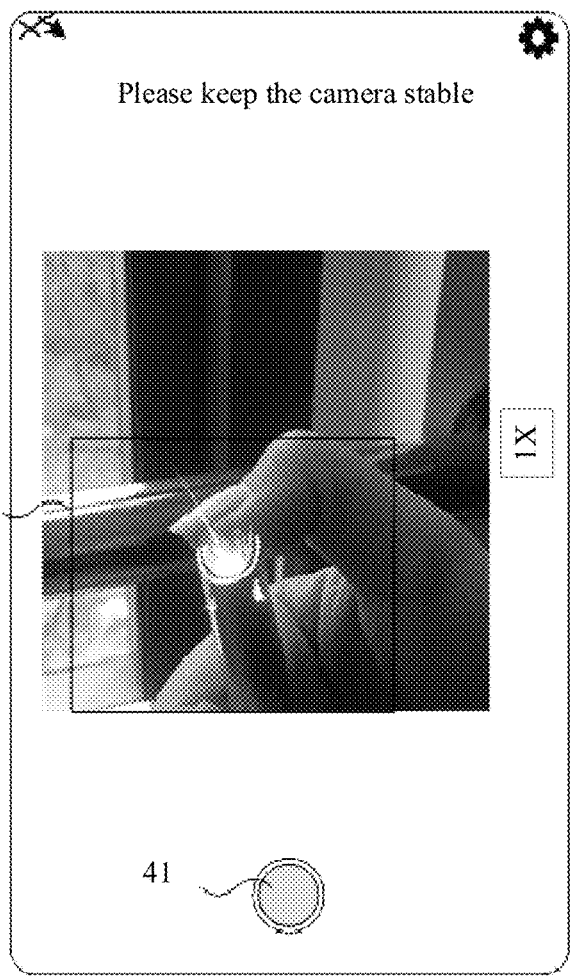
Figure 8C:
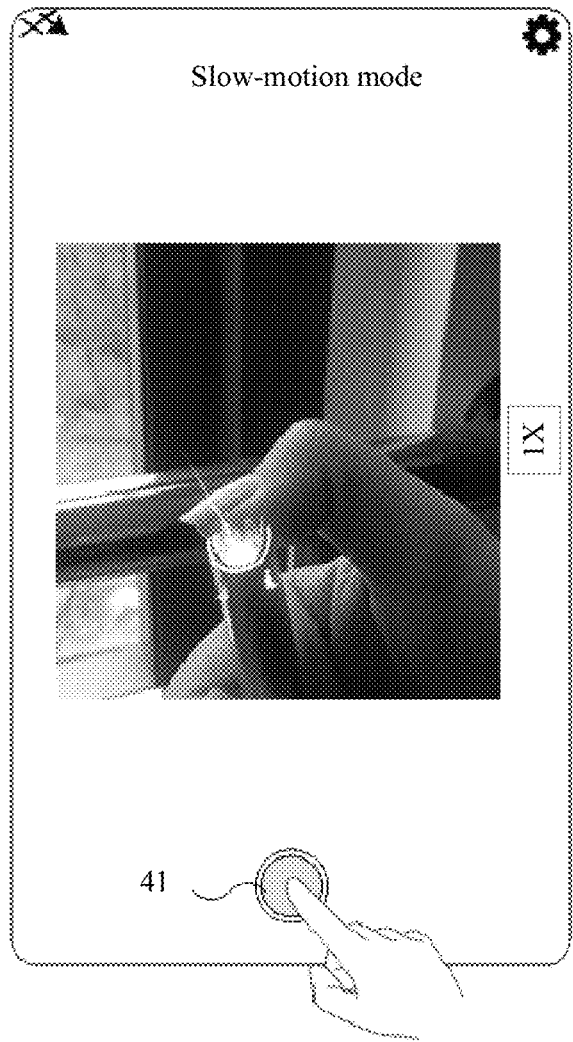
Figure 8D:
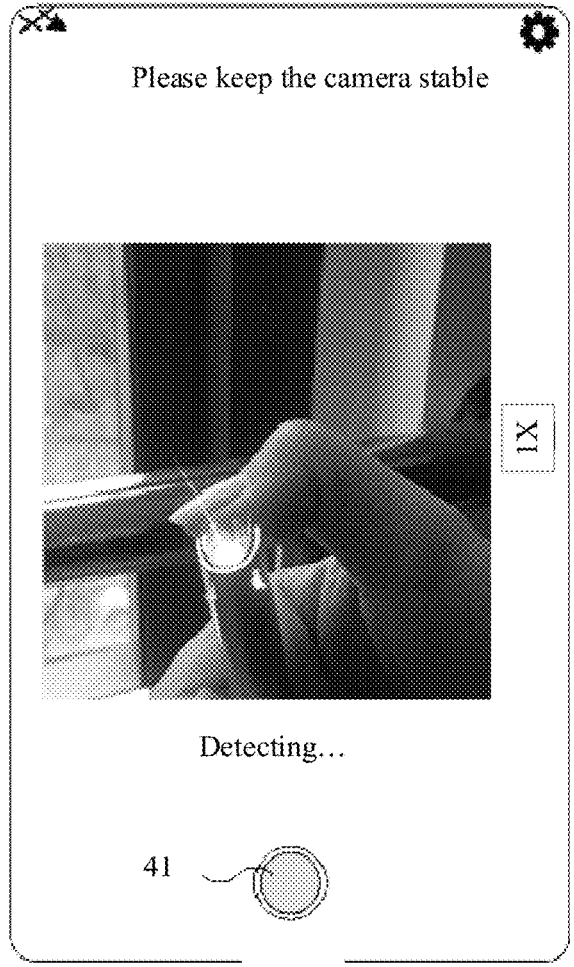
Figure 8E:
Figure 8F:
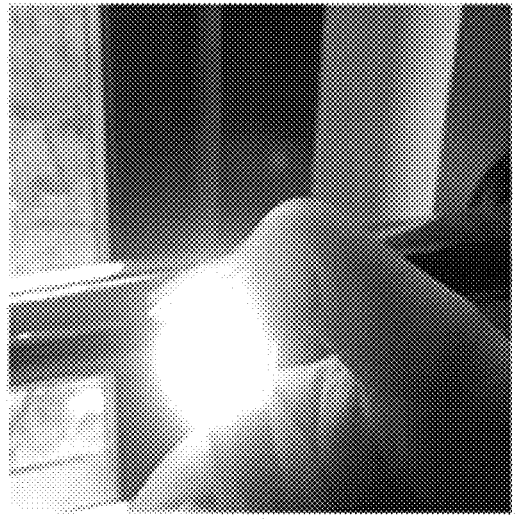
Figure 8G:
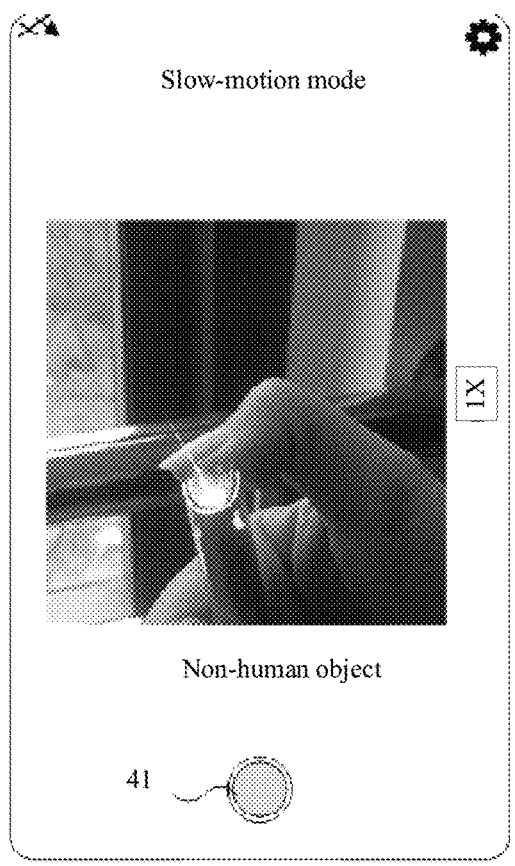
Figure 8H:
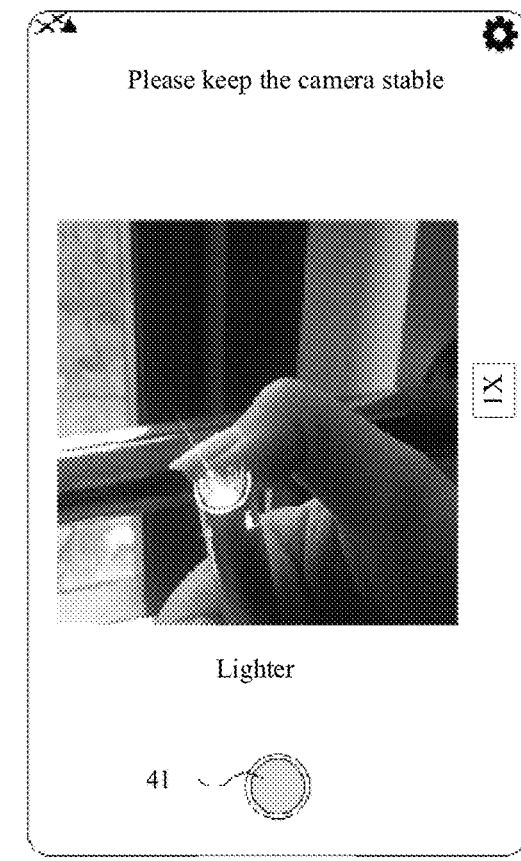

In a specific embodiment, recording a slow-motion video of making a fire with a lighter is described as an example. After a user taps a "Slow-motion" label shown in FIG. 4C, a slow-motion video recording interface shown in FIG. 8A is displayed. In the interface, content of a first prompt label is "Slow-motion mode", to prompt the user that recording of a slow-motion video can be started, and content of a second prompt label is "Please keep the camera stable". Optionally, the slow-motion video recording interface further includes a detection box, to prompt the user to aim at the lighter, as shown in FIG. 8B. As shown in FIG. 8C, after the user taps a slow-motion video recording function button 41, an electronic device displays a recording start interface shown in FIG. 8D, and content of a third prompt label is "Detecting . . . ". The electronic device obtains a detection image, and the detection image may be shown in FIG. 8E. The electronic device detects a main object in the detection image to determine that the main object is a person or a non-human object. When it is determined that the main object is a non-human object, the recording start interface is shown in FIG. 8G, where content of a third prompt label in the recording start interface is "Non-human object", or is shown in FIG. 8H, where content of a third prompt label in the recording start interface is "Lighter".

Figure 8I:
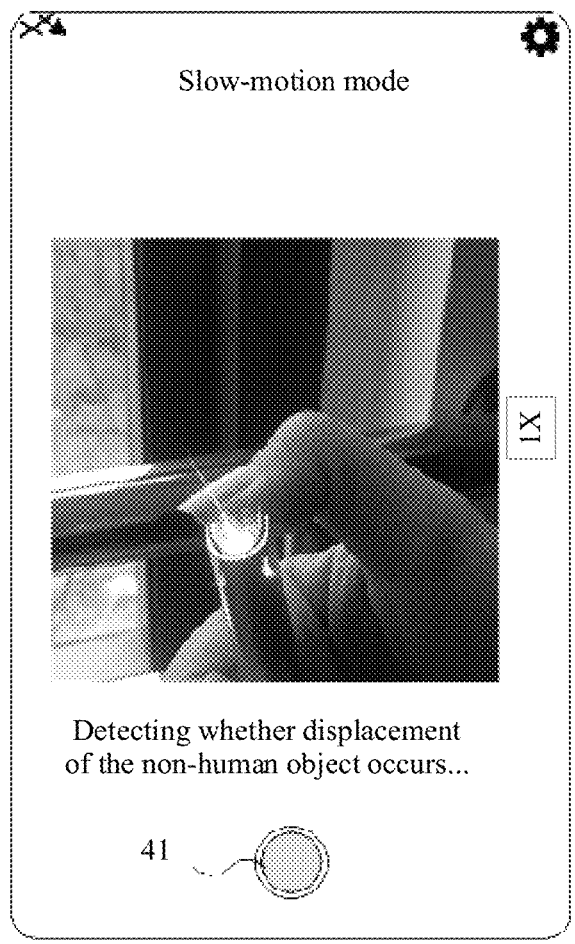
Figure 8J:
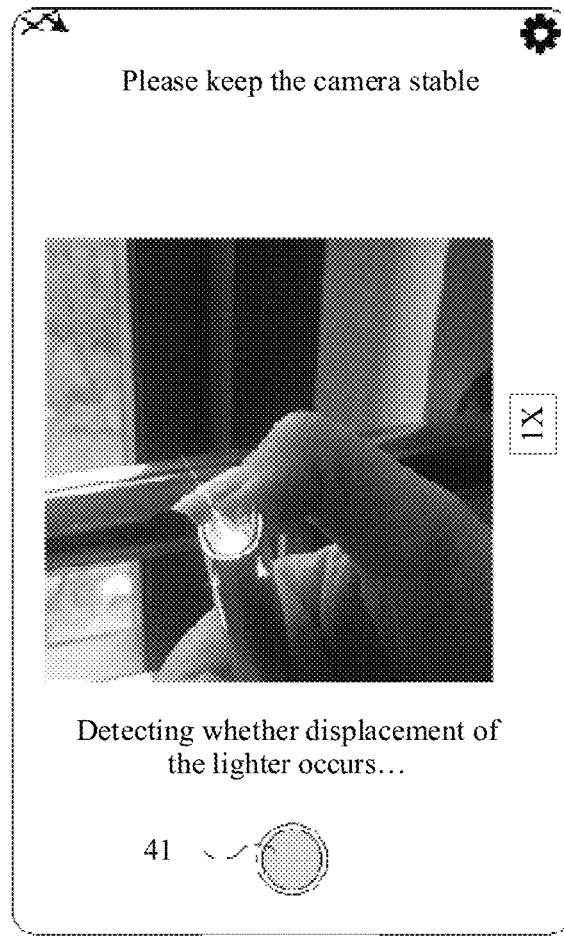

The electronic device obtains displacement detection images from a video stream. For the detection images, refer to FIG. 8E and FIG. 8F. Displacement detection is performed on the main object (which is the lighter) based on the detection image to obtain a displacement detection result. In this case, the content of the third prompt label is "Detecting whether displacement of the non-human object occurs . . . " or "Detecting whether displacement of the lighter occurs . . . ", as shown in FIG. 8I or FIG. 8J.

Figure 8K:
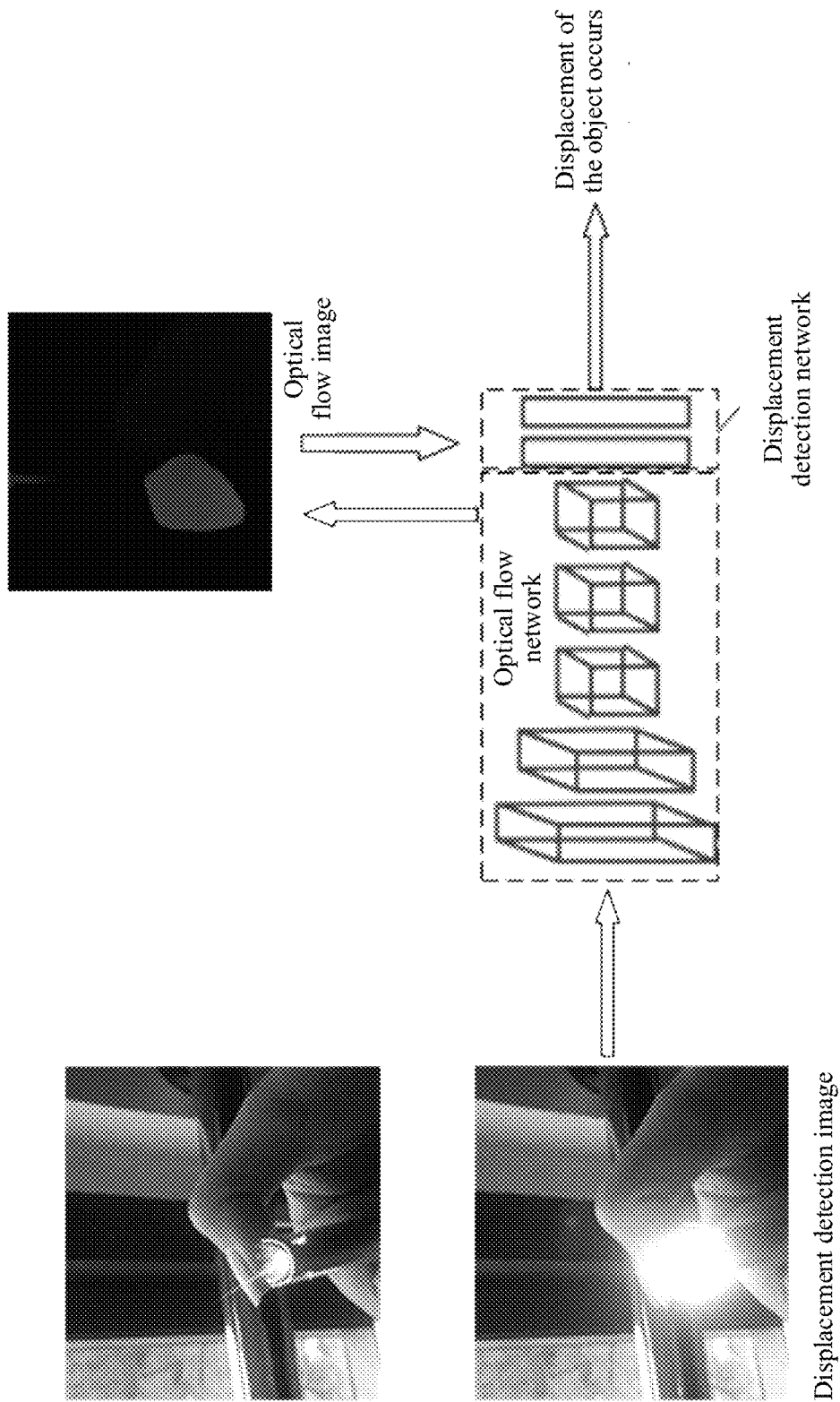

For a specific process, refer to FIG. 8K. As shown in FIG. 8K, the electronic device inputs images shown in FIG. 8E and FIG. 8F into an optical flow network for computing to obtain an optical flow image, then inputs the optical flow image into a displacement detection network for computing to obtain corresponding eigenvectors, and finally, determines a displacement detection result based on the eigenvectors. The displacement detection result indicates that the non-human object moves.

It is assumed that the video stream includes 960 frames, and a collection frame rate of the video stream is 480 fps. 30 frames of images are obtained from the video stream, and then two adjacent frames of the 30 images are computed according to a process shown in FIG. 8K, to obtain 29 eigenvectors. 29 motion velocities are obtained based on the 29 eigenvectors, and a largest motion velocity is selected from the 29 motion velocities. Finally, based on a correspondence between a motion velocity and a frame rate, a frame rate corresponding to the largest motion velocity is obtained, for example, 480 fps. This frame rate is the first frame rate. In an example, as shown in FIG. 6F, the content of the third prompt label is "480 fps".

After obtaining 29 eigenvectors, the electronic device separately computes a degree of similarity between the first eigenvector of the 29 eigenvectors and the other eigenvectors. If a degree of similarity between the fourth eigenvector and the first eigenvector is the smallest, an image corresponding to the fourth eigenvector is a first target image. Assuming that a time span of a first video clip is 0.5, a frame quantity of the first video clip is 240 frames. 120 frames using the first target image as a center are selected from the video stream, to obtain the first video clip. Because the collection frame rate of the video stream is less than a frame rate of the slow-motion video, a frame interpolation operation is performed on the first video clip, so that a frame quantity of a second video clip obtained after frame interpolation is 480. Finally, a target video is obtained based on the second video clip. For this process, refer to related descriptions of the foregoing step S303. Details are not described herein again. In the embodiment shown in FIG. 3A, the first target image is an image shown in FIG. 8F, where a flame of the lighter is the largest. In the video stream, an image with a timestamp $t_2$ is an image shown in FIG. 8E, where the lighter starts to burst out sparks, and an image with a timestamp $t_3$ is an image in which the flame of the lighter starts to go out.

Any image is selected from the second video clip, then scene information in the image is obtained, and a corresponding music database is determined based on the scene information of the image. Finally, any piece of music "music A" is obtained from the music database and determined as background music of the slow-motion video.

Figure 8L:
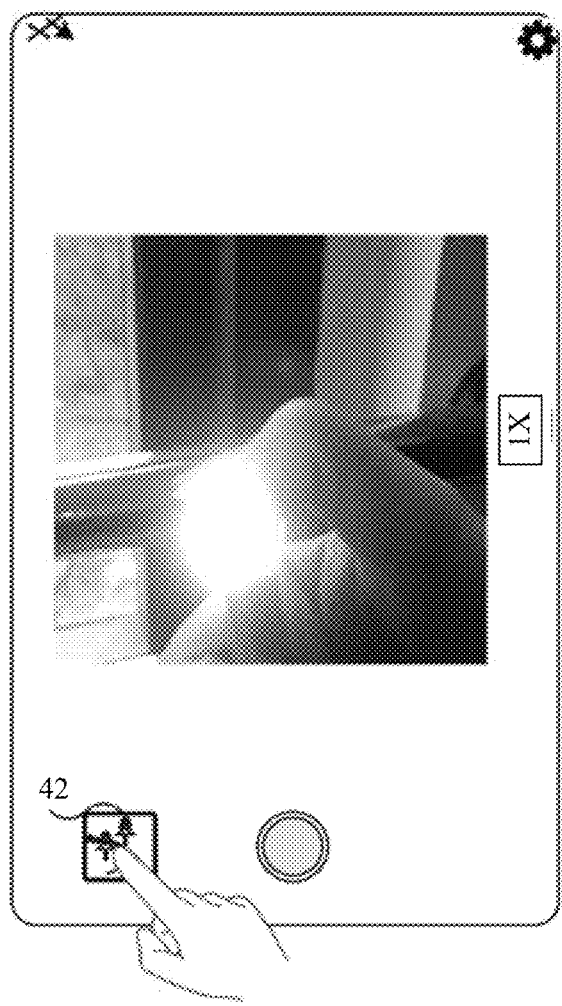
Figure 8M:
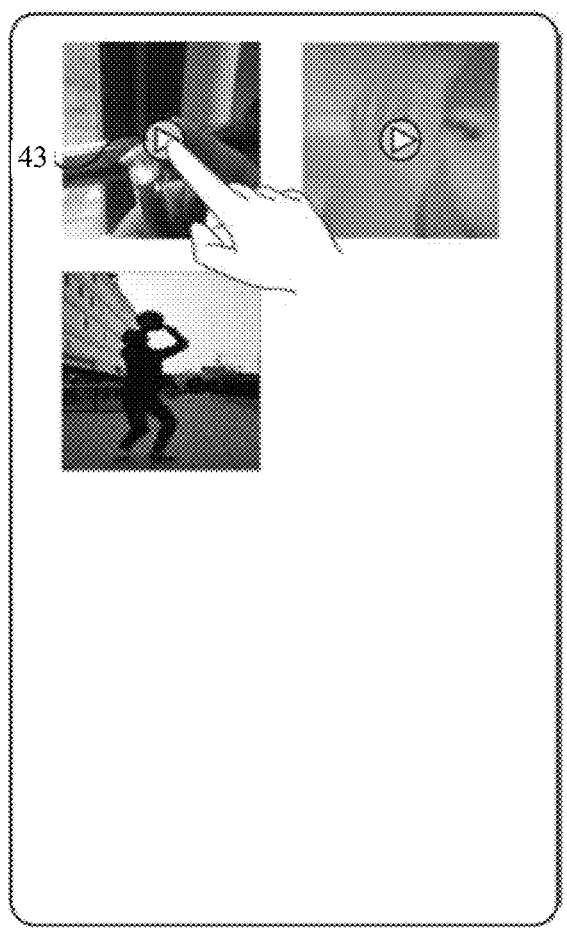

After the slow-motion video is obtained, the electronic device directly plays the slow-motion video and the background music "music A" of the slow-motion video. Alternatively, after the slow-motion video is obtained, the user taps an icon 42 corresponding to an image library application, as shown in FIG. 8L, to enter the image library, and taps a play function button 43 on an icon of a video to be played, as shown in FIG. 8M, to play the slow-motion video and the background music "music A". The icon 42 and the play function button 43 are merely used as an example for description, and are not intended to limit this application.

Figure 9A:
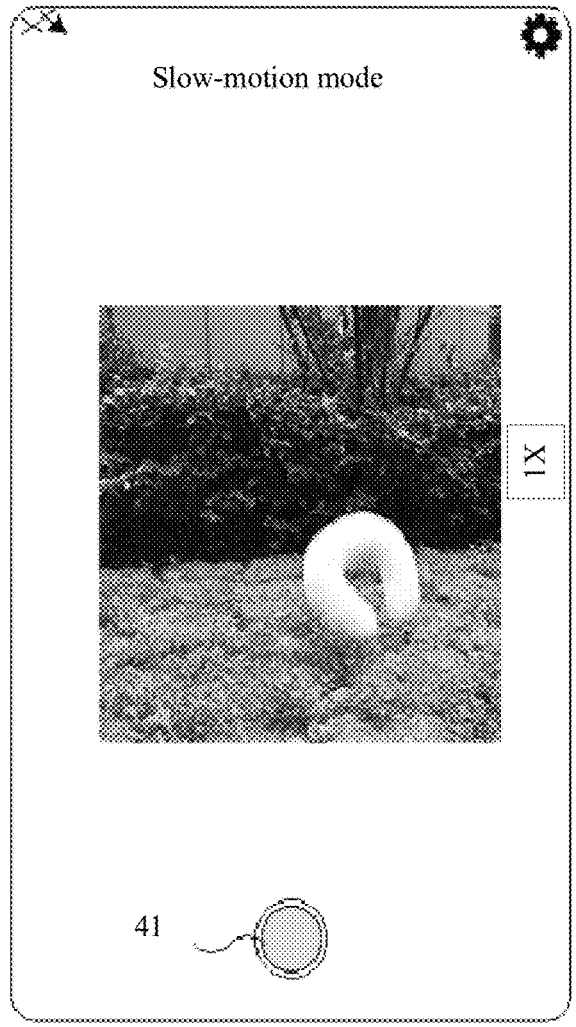
FIG. 9A, FIG. 9B, FIG. 9C, FIG. 9D, FIG. 9E, FIG. 9F, FIG. 9G, FIG. 9H, FIG. 9I, FIG. 9J, FIG. 9K, FIG. 9L, FIG. 9M, and FIG. 9N are UI interfaces for recording a slow-motion video according to an embodiment of this application.
Figure 9B:
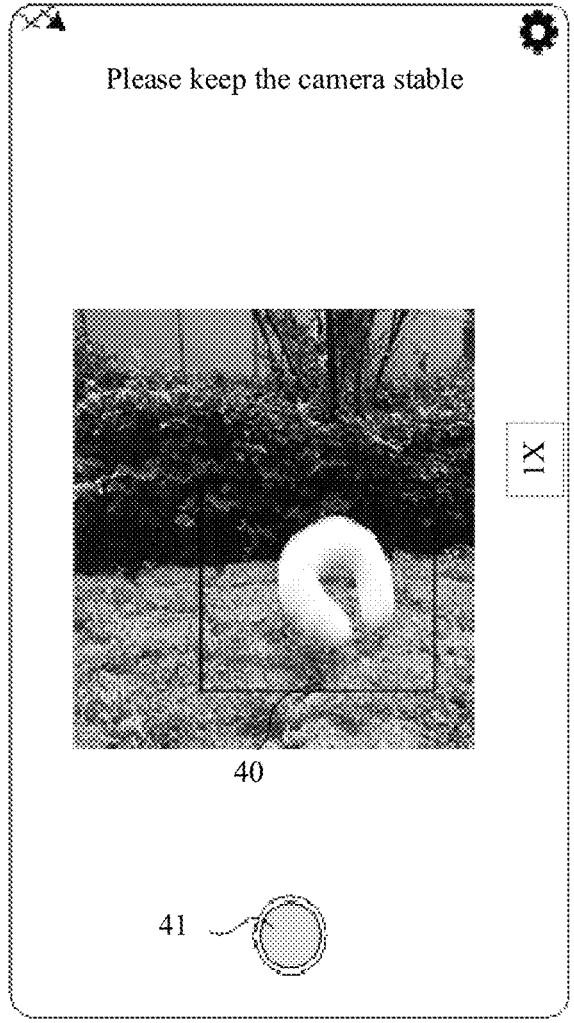
Figure 9C:
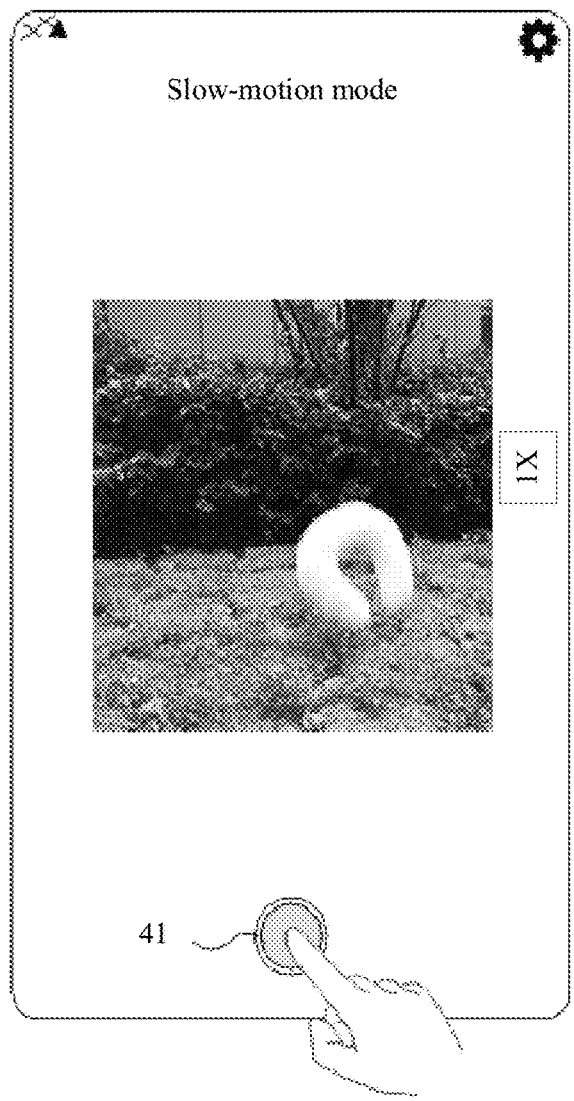
Figure 9D:
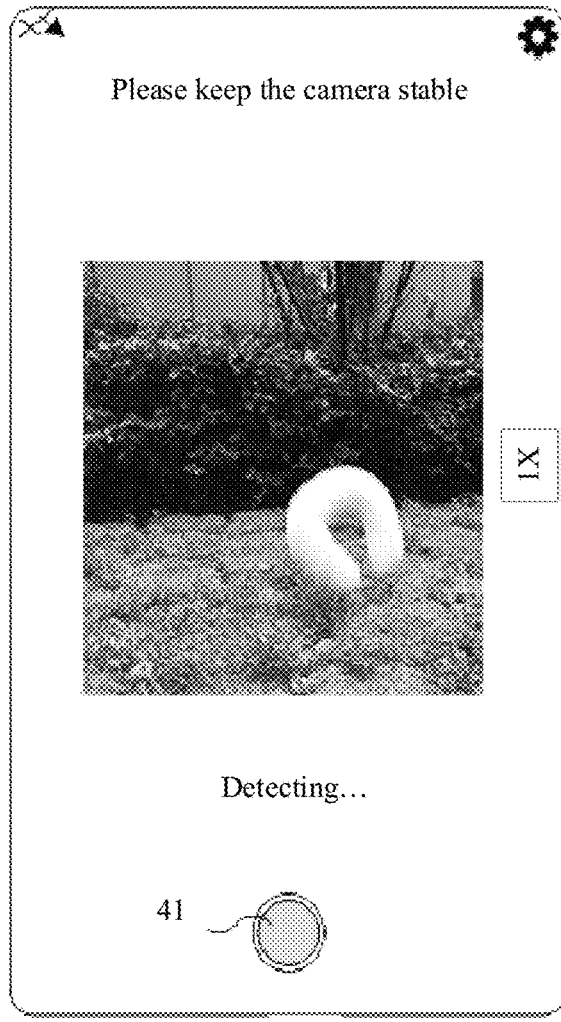
Figure 9E:
Figure 9F:
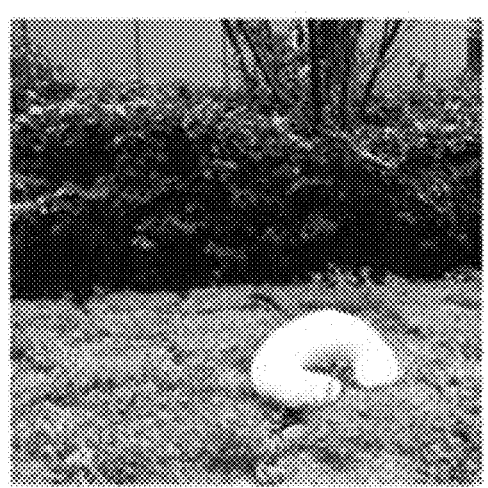
Figure 9G:
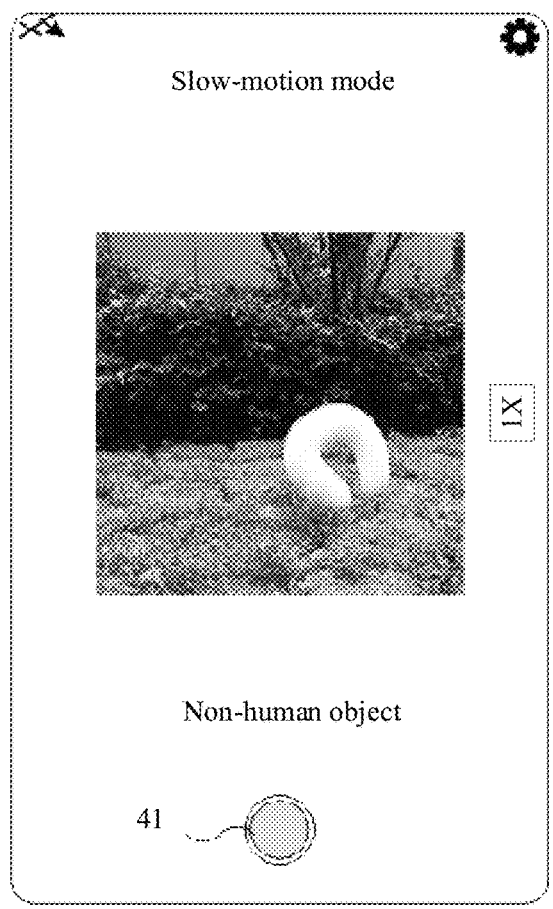
Figure 9H:

In a specific embodiment, recording a slow-motion video of falling of a U-shaped pillow after being thrown upward is described as an example. After a user taps a "Slow-motion" label shown in FIG. 4C, a slow-motion video recording interface shown in FIG. 9A is displayed. In the interface, content of a first prompt label is "Slow-motion mode", to prompt the user that recording of a slow-motion video can be started, and content of a second prompt label is "Please keep the camera stable". Optionally, the slow-motion video recording interface further includes a detection box, to prompt the user to aim at the U-shaped pillow, as shown in FIG. 9B. As shown in FIG. 9C, after the user taps a slow-motion video recording function button 41, an electronic device displays a recording start interface shown in FIG. 9D, and content of a third prompt label is "Detecting . . . ". At the same time, the electronic device obtains a detection image, and the detection image may be shown in FIG. 9E. The electronic device detects the detection image to determine that the main object is a person or a non-human object. When it is determined that the main object is a non-human object, the recording start interface is shown in FIG. 9G, where content of the third prompt label in the recording start interface "Non-human object", or shown in FIG. 9H, where content of the third prompt label in the recording start interface is "U-shaped pillow".

Figures 9I, 9J:
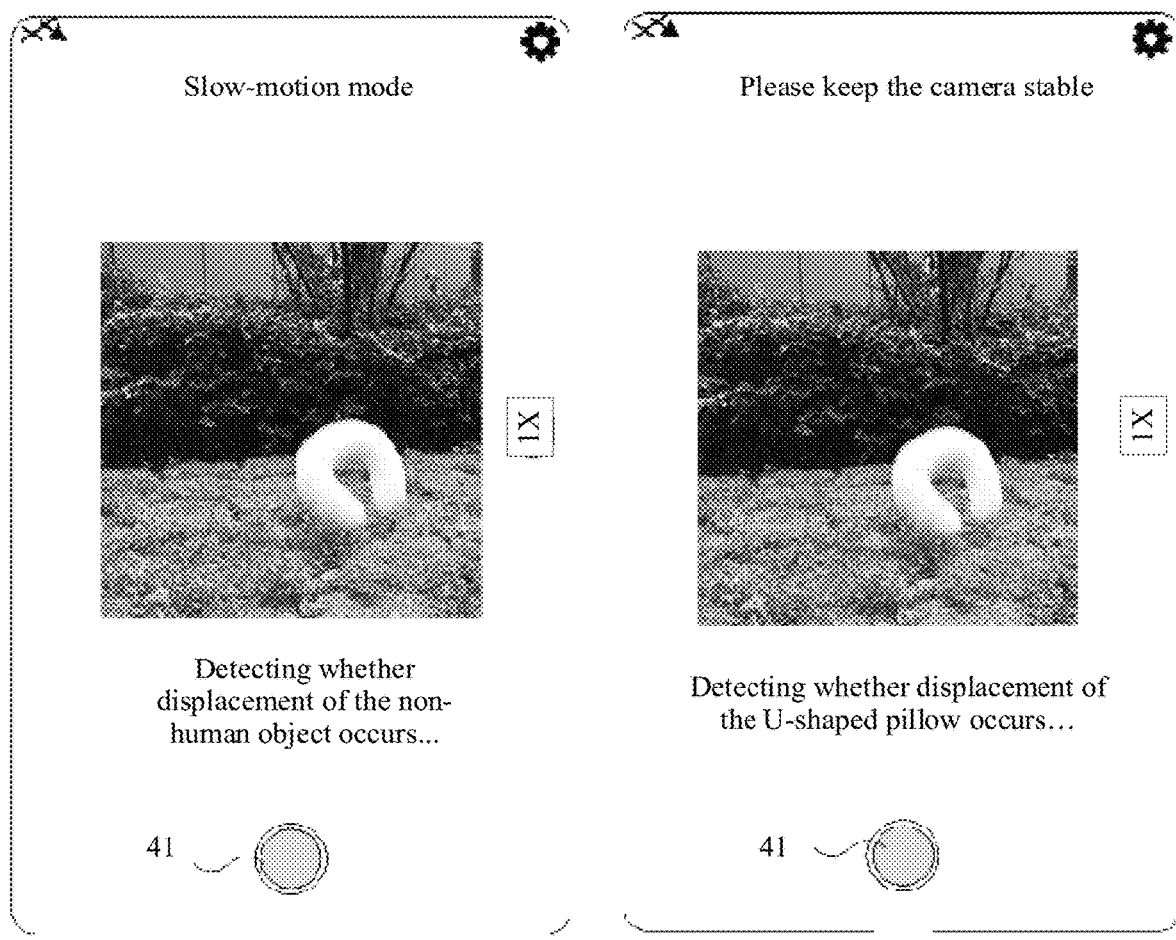

The electronic device obtains displacement detection images from a video stream. For the detection images, refer to FIG. 9E and FIG. 9F. Displacement detection is performed on the main object (which is the U-shaped pillow) based on the detection image to obtain a displacement detection result. In this case, the content of the third prompt label is "Detecting whether displacement of the non-human object occurs . . . " or "Detecting whether displacement of the U-shaped pillow occurs . . . ", as shown in FIG. 9I or FIG. 9J.

Figure 9K:
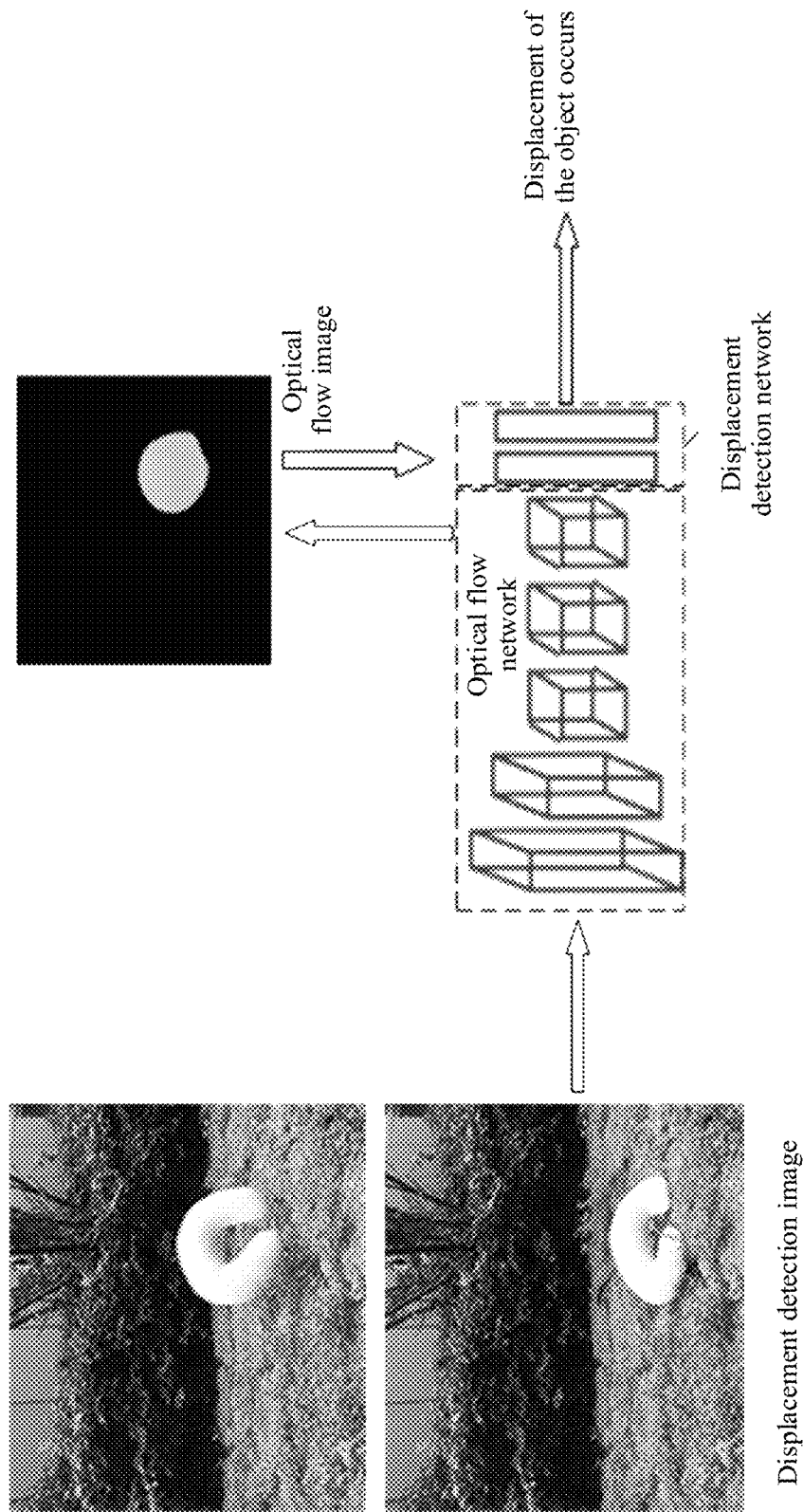

For a specific process, refer to FIG. 9K. As shown in FIG. 9K, the electronic device inputs images shown in FIG. 9E and FIG. 9F into an optical flow network for computing to obtain an optical flow image, then inputs the optical flow image into a displacement detection network for computing to obtain corresponding eigenvectors, and finally, determines a displacement detection result based on the eigenvectors. The displacement detection result indicates that the non-human object moves.

Figure 9L:
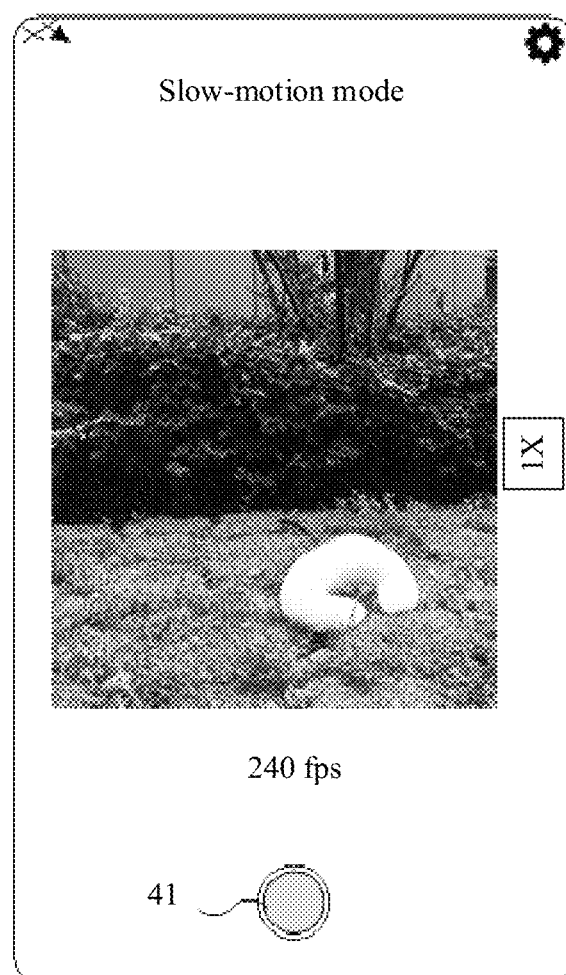

It is assumed that the video stream includes 960 frames, and a collection frame rate of the video stream is 480 fps. 30 frames of images are obtained from the video stream, and then two adjacent frames of the 30 images are computed according to a process shown in FIG. 9K, to obtain 29 eigenvectors. 29 motion velocities are obtained based on the 29 eigenvectors, and a largest motion velocity is selected from the 29 motion velocities. Finally, based on a correspondence between a motion velocity and a frame rate, a frame rate corresponding to the largest motion velocity is obtained, for example, 240 fps. This frame rate is an expected frame rate of the slow-motion video. In an example, as shown in FIG. 9L, content of the third prompt label is "240 fps".

After obtaining 29 eigenvectors, the electronic device separately computes a degree of similarity between the first eigenvector of the 29 eigenvectors and the other eigenvectors. If a degree of similarity between the fourth eigenvector and the first eigenvector is the smallest, an image corresponding to the fourth eigenvector is a target image. Assuming that a time span of a first video clip is 0.5, a frame quantity of the first video clip is 240 frames. 120 frames using the target image as a center are selected from the video stream, to obtain the first video clip. Because the collection frame rate of the video stream is greater than a frame rate of the slow-motion video, a sampling operation is performed on the first video clip, so that a frame quantity of a second video clip obtained after sampling is 120. Finally, a target video is obtained based on the second video clip. For this process, refer to related descriptions of the foregoing step S303. Details are not described herein again. In the embodiment shown in FIG. 3A, the first target image is an image shown in FIG. 9F, where the U-shaped pillow is about to fall. In the video stream, an image with a timestamp $t_2$ is an image shown in FIG. 9E, where the U-shaped pillow already starts to fall, and an image with a timestamp $t_3$ is an image in which the U-shaped pillow is already on the ground.

Any image is selected from the second video clip, then scene information in the image is obtained, and a corresponding music database is determined based on the scene information of the image. Finally, any piece of music "music B" is obtained from the music database and determined as background music of the target video.

Figure 9M:
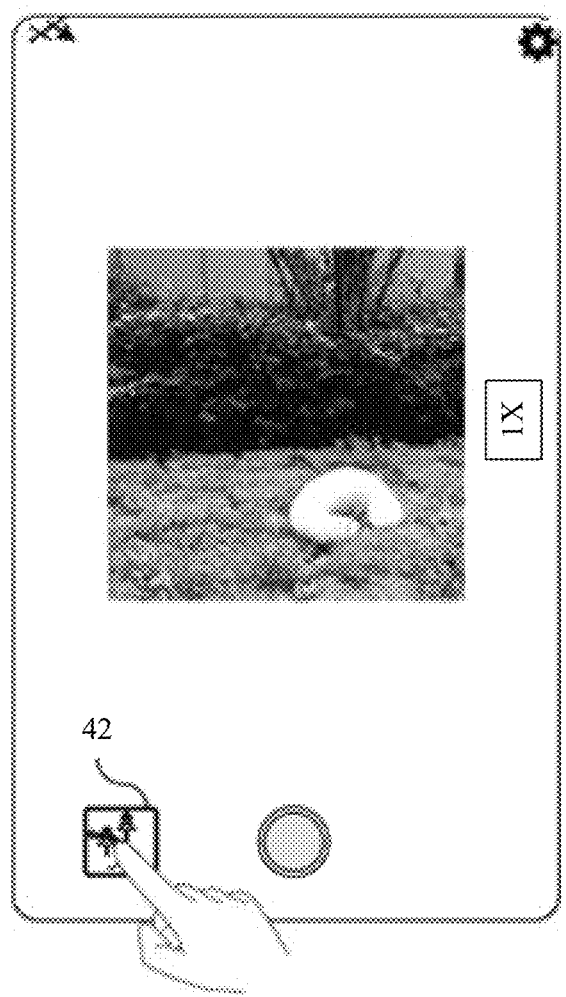
Figure 9N:
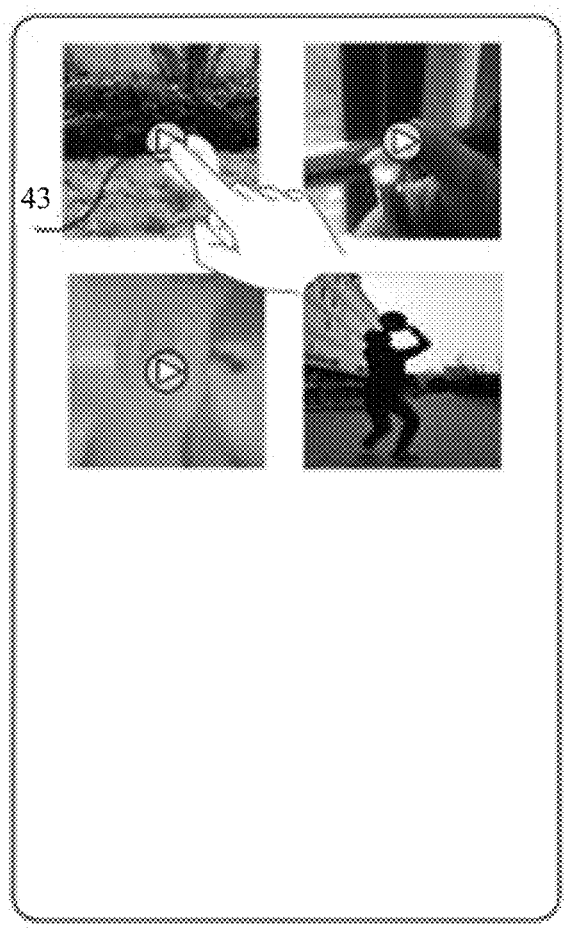

After the slow-motion video is obtained, the electronic device directly plays the slow-motion video and the background music "music B" of the slow-motion video. Alternatively, after the slow-motion video is obtained, the user taps an icon 42 corresponding to an image library application, as shown in FIG. 9M, to enter the image library, and taps a play function button 43 on an icon of a video to be played, as shown in FIG. 9N, to play the slow-motion video and the background music "music B". The icon 42 and the play function button 43 are merely used as an example for description, and are not intended to limit this application.

It can be learned that, in the solutions in this embodiment of this application, it is detected that the preset motion occurs on the main object in the video stream, and the first video clip is determined in the video stream based on the preset motion; the first frame rate is determined based on the preset motion; and the first video clip is processed based on the first frame rate to obtain the second video clip. A play time of the second video clip at a target play frame rate is greater than a collection time of the first video clip, and the first frame rate is greater than the target play frame rate. When a main object for shooting moves, the first video clip (namely, a highlight clip) is obtained from the video stream, so that the electronic device can accurately capture a highlight moment of the main object. This improves user experience. In addition, before the first video clip is obtained, detection is performed on the main object, to avoid that a slow-motion video needed by the user is not recorded due to shake of the electronic device or a slight image change.

Figure 10:
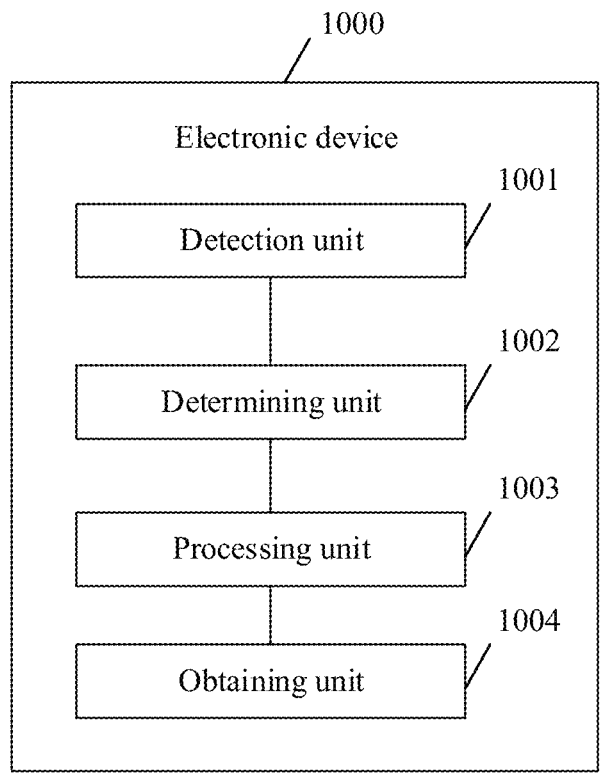
FIG. 10 is a schematic diagram of a structure of another electronic device according to an embodiment of this application.

Refer to FIG. 10. FIG. 10 is a schematic diagram of a structure of an electronic device according to an embodiment of this application. As shown in FIG. 10, the electronic device includes: a detection unit 1001, configured to detect that a preset motion occurs on a main object in a video stream; a determining unit 1002, configured to: determine a first video clip in the video stream based on the preset motion, and determine a first frame rate based on the preset motion; and a processing unit 1003, configured to process the first video clip based on the first frame rate to obtain a second video clip, where a play time of the second video clip at a target play frame rate is greater than a collection time of the first video clip, and the first frame rate is greater than the target play frame rate.

In a feasible embodiment, the main object in the video stream is a non-human object, and in the aspect of detecting that a preset motion occurs on a main object in a video stream, the detection unit 1001 is configured to detect that displacement of the non-human object occurs in a shooting scene.

In a feasible embodiment, the main object in the video stream is a person, and in the aspect of detecting that a preset motion occurs on a main object in a video stream, the detection unit 1001 is configured to detect that the person makes a target posture in a shooting scene.

In a feasible embodiment, the detection unit 1001 is further configured to: before the first video clip in the video stream is determined based on the preset motion, when a slow-motion video recording function is enabled or after a slow-motion video recording function is enabled, obtain a detection image from the video stream, and detect that a main object in the detection image is a person or a non-human main object.

In a feasible embodiment, in the aspect of determining a first video clip in the video stream based on the preset motion, the determining unit 1002 is configured to: obtain a first target image from the video stream, where the first target image is an image that is in the video stream and that corresponds to a moment at which the main object has largest acceleration in a process of the preset motion; obtain a timestamp $t_{w1}$ of the first target image in the video stream; and obtain the first video clip from the video stream based on the timestamp $t_{w1}$ of the first target image and a time span t of the first video clip, where a timestamp of a start frame of the first video clip is $t_2=t_{w1}-at$, a timestamp of an end frame of the first video clip is $t_3=t_{w1}+bt$, a and b are constants, $a+b=1$, and the first video clip includes an image with a timestamp not less than $t_2$ and not greater than $t_3$.

In a feasible embodiment, in the aspect of determining a first video clip in the video stream based on the preset motion, the determining unit 1002 is configured to: obtain a second target image from the video stream, where a timestamp of the second target image is a moment at which a preset to-be-captured action of the main object is detected; obtain a timestamp $t_{w2}$ of the second target image in the video stream; and obtain the first video clip from the video stream based on the timestamp $t_{w2}$ of the second target image and a time span t of the first video clip, where a timestamp of a start frame of the first video clip is $t_2=t_{w2}-at$, a timestamp of an end frame of the first video clip is $t_3=t_{w2}+bt$, a and b are constants, $a+b=1$, and the first video clip includes an image with a timestamp not less than $t_2$ and not greater than $t_3$.

In a feasible embodiment, in the aspect of determining a first video clip in the video stream based on the preset motion, the determining unit 1002 is configured to: obtain a third target image from the video stream; obtain a timestamp $t_{w3}$ of the third target image in the video stream, where the timestamp $t_{w3}$ is a moment at which the person in the shooting scene makes the target posture or a moment at which the displacement of the non-human object occurs; and obtain the first video clip based on the timestamp $t_{w3}$ of the third target image and a time span t of the first video clip, where a timestamp of a start frame of the first video clip is $t_2=t_{w3}$, a timestamp of an end frame of the first video clip is $t_3=t_{w3}+t$, and the first video clip includes an image with a timestamp not less than $t_2$ and not greater than $t_3$.

In a feasible embodiment, in the aspect of determining a first video clip in the video stream based on the preset motion, the determining unit 1002 is configured to: obtain a third video clip from the video stream, where the third video clip is a video clip including a preset to-be-captured action; obtain a timestamp $t_{q1}$ of a start frame and a timestamp $t_{s1}$ of an end frame of the third video clip; and obtain the first video clip based on the timestamp $t_{q1}$, the timestamp $t_{s1}$, and a time span t of the first video clip, where a timestamp of a start frame of the first video clip is $t_2=t_{q1}-at$, a timestamp of an end frame of the first video clip is $t_3=t_{s1}+bt$, a and b are constants, $at+bt+t_{s1}-t_{q1}=t$, and the first video clip includes an image with a timestamp not less than $t_2$ and not greater than $t_3$.

In a feasible embodiment, in the aspect of determining a first frame rate based on the preset motion, the determining unit 1002 is configured to: obtain a motion velocity of the main object from the video stream, and determine the first frame rate based on the motion velocity of the main object, where a larger motion velocity of the main object indicates a larger first frame rate.

In a feasible embodiment, in the aspect of determining a first frame rate based on the preset motion, the determining unit 1002 is configured to: obtain the first frame rate based on the target posture of the main object, where different target postures of the main object indicate different first frame rates.

In a feasible embodiment, the processing unit 1003 is configured to: if the first frame rate is greater than a collection frame rate of the video stream, perform a frame interpolation operation on the first video clip to obtain the second video clip; or if the first frame rate is less than a collection frame rate of the video stream, perform a sampling operation on the first video clip to obtain the second video clip, where a ratio of a frame quantity of the second video clip to a frame quantity of the first video clip is equal to a ratio of the first frame rate to the collection frame rate of the video stream.

In a feasible embodiment, the first frame rate is different from the collection frame rate of the video stream.

In a feasible embodiment, the electronic device 1000 further includes: an obtaining unit 1004, configured to: obtain a fourth video clip and a fifth video clip from the video stream; and obtain a target video based on the fourth video clip, the fifth video clip, and the second video clip.

A timestamp of a start frame of the fourth video clip is $t_{q2}=t_2-t_x$, an end frame of the fourth video clip is a previous frame of the start frame of the first video clip, a start frame of the fifth video clip is a next frame of the end frame of the first video clip, a timestamp of an end frame of the fifth video clip is $t_{s2}=t_3+t_y$, the fourth video clip includes an image with a timestamp greater than to and less than $t_2$, the fifth video clip includes an image with a timestamp greater than $t_3$ and less than $t_{s2}$, and $t_x$ and $t_y$ are the same or different.

In a feasible embodiment, in the aspect of obtaining a target video based on the fourth video clip, the fifth video clip, and the second video clip, the obtaining unit 1004 is configured to: if the collection frame rate of the video stream is greater than a play frame rate of the target video, perform a sampling operation on the fourth video clip and the fifth video clip to obtain a sixth video clip and a seventh video clip.

A ratio of a frame quantity of the sixth video clip to a frame quantity of the fourth video clip is equal to a ratio of a play frame rate of the target video to the collection frame rate of the video stream, a ratio of a frame quantity of the seventh video clip to a frame quantity of the fifth video clip is equal to a ratio of the play frame rate of the target video to the collection frame rate of the video stream, the target video includes the second video clip, the sixth video clip, and the seventh video clip, and the second video clip, the sixth video clip, and the seventh video clip are temporally consecutive.

In a feasible embodiment, the determining unit 1002 is further configured to: after the timestamp $t_3$ of the end frame of the first video clip is obtained, determine a moment for ending slow-motion video recording, where the moment for ending slow-motion video recording is $t_4$, $t_4=t_3+t'$, and $t'$ is preset duration; or the moment for ending slow-motion video recording is a moment after an instruction of the user for stopping slow-motion video recording is received, and the moment is before $t_4$.

It should be noted that the foregoing units (the detection unit 1001, the determining unit 1002, the processing unit 1003, and the obtaining unit 1004) are configured to perform related steps of the foregoing method. For example, the determining unit 1002 is configured to perform related content of step S302, the detection unit 1001 is configured to perform related content of step S301, and the processing unit 1003 and the obtaining unit 1004 are configured to perform related content of step S303.

In this embodiment, the electronic device 1000 is represented in a form of units. The "unit" herein may be an application-specific integrated circuit (application-specific integrated circuit, ASIC), a processor and a memory that execute one or more software or firmware programs, an integrated logic circuit, and/or another device that can provide the foregoing functions. In addition, the detection unit 1001, the determining unit 1002, the processing unit 1003, and the obtaining unit 1004 may be implemented by using a processor 1101 of an electronic device shown in FIG. 11.

Figure 11:
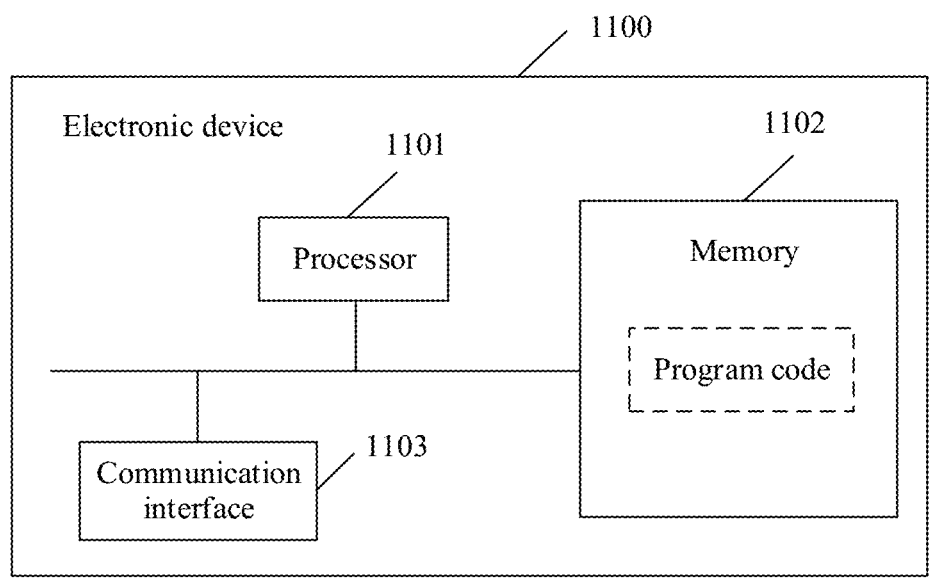
FIG. 11 is a schematic diagram of a structure of another electronic device according to an embodiment of this application.

The electronic device 1100 shown in FIG. 11 may be implemented by using a structure in FIG. 11. The electronic device 1100 includes at least one processor 1101, at least one memory 1102, and at least one communication interface 1103. The processor 1101, the memory 1102, and the communication interface 1103 are connected to and communicate with each other through a communication bus.

The processor 1101 may be a general-purpose central processing unit (CPU), a microprocessor, an application-specific integrated circuit (application-specific integrated circuit, ASIC), or one or more integrated circuits for controlling program execution for the foregoing solutions.

The communication interface 1103 is configured to communicate with another device or a communication network, such as the Ethernet, a radio access network (RAN), or a WLAN.

The memory 1102 may be but is not limited to a read-only memory (ROM) or another type of static storage device capable of storing static information and instructions, a random-access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction or data structure form and can be accessed by a computer. The memory may exist independently, and is connected to the processor through the bus. The memory may alternatively be integrated with the processor.

The memory 1102 is configured to store application code for executing the foregoing solutions, and the processor 501 controls the execution. The processor 1101 is configured to execute the application code stored in the memory 1102.

The code stored in the memory 1102 may be used to perform the slow-motion video shooting method provided above, for example, detect that a preset motion occurs on a main object in a video stream, determine a first video clip in the video stream based on the preset motion, determine a first frame rate based on the preset motion, and process the first video clip based on the first frame rate to obtain a second video clip, where a play time of the second video clip is greater than a collection time of the first video clip.

An embodiment further provides a computer storage medium. The computer storage medium may store a program, and when the program is executed, some or all steps of any slow-motion video shooting method described in the foregoing method embodiments are included.

It should be noted that, for ease of description, the foregoing method embodiments are expressed as combinations of a series of actions. However, persons skilled in the art should know that the present disclosure is not limited to the described action sequence, because some steps may be performed in other sequences or performed simultaneously. In addition, persons skilled in the art should also know that all embodiments described in the specification are example embodiments, and the related actions and modules are not necessarily mandatory.

In the foregoing embodiments, descriptions of embodiments have respective focuses. For a part that is not described in detail in an embodiment, refer to related descriptions in other embodiments.

In several embodiments provided in this application, it should be understood that the disclosed apparatuses may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical form or other forms.

The units described as separate parts may or may not be physically separate, and parts displayed as units may or may not be physical units, may be located at one position, or may be distributed on a plurality of network units. Some or all of the units may be selected according to actual requirements to achieve the objectives of the solutions of embodiments.

In addition, functional units in embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions may be implemented in a form of a software product. The computer software product is stored in a memory and includes several instructions for instructing a computer device (which may be a personal computer, a server, a network device, or the like) to perform all or some of the steps of the methods described in embodiments. The foregoing memory includes any medium that can store program code, for example, a USB flash drive, a ROM, a RAM, a removable hard disk, a magnetic disk, or an optical disc.

Persons of ordinary skill in the art may understand that all or some of the steps of the methods in embodiments may be implemented by a program instructing related hardware. The program may be stored in a computer-readable memory. The memory may include a flash memory, a ROM, a RAM, a magnetic disk, an optical disc, or the like.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A slow-motion video shooting method, comprising:
   detecting that a preset motion has occurred on a first main object in a video stream having a collection frame rate;
   determining a first video clip in the video stream based on the preset motion;
   determining a first frame rate based on the preset motion, wherein the first frame rate is different from the collection frame rate; and
   processing the first video clip based on the first frame rate to obtain a second video clip, wherein processing the first video clip comprises:
     performing, when the first frame rate is greater than the collection frame rate, frame interpolation on the first video clip to obtain the second video clip; and
     performing, when the first frame rate is less than the collection frame rate, sampling on the first video clip to obtain the second video clip, wherein a first ratio of a first frame quantity of the second video clip to a second frame quantity of the first video clip is equal to a second ratio of the first frame rate to the collection frame rate,
   wherein a play time of the second video clip at a target play frame rate is greater than a collection time of the first video clip, and
   wherein the first frame rate is greater than the target play frame rate.

2. The slow-motion video shooting method of claim 1, wherein the first main object is a non-human object, and wherein detecting that the preset motion occurs comprises detecting that displacement of the non-human object occurs in a shooting scene.

3. The slow-motion video shooting method of claim 1, wherein the first main object in the video stream is a person, and wherein detecting that the preset motion occurs comprises detecting that the person makes a target posture in a shooting scene.

4. The slow-motion video shooting method of claim 1, wherein determining the first video clip comprises:
   obtaining a first target image from the video stream, wherein the first target image corresponds to a moment at which the first main object has a largest acceleration in a process of the preset motion;
   obtaining a first timestamp $t_{w1}$ of the first target image in the video stream; and
   obtaining the first video clip based on the first timestamp $t_{w1}$ and a time span t of the first video clip, wherein a second timestamp $t_2$ of a start frame of the first video clip is $t_2 = t_{w1} - at$, wherein a third timestamp $t_3$ of an end frame of the first video clip is $t_3 = t_{w1} + bt$, wherein a and b are constants, wherein a+b=1, and wherein the first video clip comprises an image with a fourth timestamp that is not less than $t_2$ and that is not greater than $t_3$.

5. The slow-motion video shooting method of claim 1, wherein determining the first video clip comprises:
   obtaining a first target image from the video stream, wherein a first timestamp $t_{w2}$ of the first target image is a moment at which a preset to-be-captured action of the first main object is detected;
   obtaining the first timestamp $t_{w2}$; and
   obtaining the first video clip based on the first timestamp $t_{w2}$ and a time span t of the first video clip, wherein a second timestamp $t_2$ of a start frame of the first video clip is $t_2 = t_{w2} - at$, wherein a third timestamp $t_3$ of an end frame of the first video clip is $t_3 = t_{w2} + bt$, wherein a and b are constants, wherein a+b=1, and wherein the first video clip comprises an image with a fourth timestamp that is not less than $t_2$ and that is not greater than $t_3$.

6. The slow-motion video shooting method of claim 1, wherein determining the first video clip comprises:
   obtaining a first target image from the video stream;
   obtaining a first timestamp $t_{w3}$ of the first target image, wherein the first timestamp $t_{w3}$ is a moment at which a person makes a target posture in a shooting scene or a moment at which displacement of a non-human object occurs in the shooting scene; and
   obtaining the first video clip based on the first timestamp $t_{w3}$ and a time span t of the first video clip, wherein a second timestamp $t_2$ of a start frame of the first video clip is $t_2 = t_{w3}$, wherein a third timestamp $t_3$ of an end frame of the first video clip is $t_3 = t_{w3} + t$, and wherein the first video clip comprises an image with a fourth timestamp that is not less than $t_2$ and that is not greater than $t_3$.

7. The slow-motion video shooting method of claim 1, wherein determining the first video clip comprises:
   obtaining a third video clip from the video stream, wherein the third video clip is a video clip comprising a preset to-be-captured action;
   obtaining a first timestamp $t_{q1}$ of a start frame of the third video clip and a second timestamp $t_{s1}$ of an end frame of the third video clip; and
   obtaining the first video clip based on the first timestamp $t_{q1}$, the second timestamp $t_{s1}$, and a time span t of the first video clip, wherein a third timestamp $t_2$ of a start frame of the first video clip is $t_2 = t_{q1} - at$, wherein a fourth timestamp $t_3$ of an end frame of the first video clip is $t_3 = t_{s1} + bt$, wherein a and b are constants, wherein $at + bt + t_{s1} - t_{q1} = t$, and wherein the first video clip comprises an image with a fifth timestamp that is not less than $t_2$ and that is not greater than $t_3$.

8. The slow-motion video shooting method of claim 2, wherein determining the first frame rate comprises:
   obtaining a motion velocity of the first main object;
   determining the first frame rate based on the motion velocity, wherein a larger motion velocity of the first main object indicates a larger first frame rate.

9. The slow-motion video shooting method of claim 3, wherein determining the first frame rate comprises obtaining the first frame rate based on the target posture of the first main object, and wherein different target postures of the first main object indicate different first frame rates.

10. The slow-motion video shooting method of claim 1, wherein the collection frame rate is a rate at which an image sensor or a camera of an electronic device collects images.

11. The slow-motion video shooting method of claim 4, further comprising:
   obtaining a third video clip and a fourth video clip from the video stream; and obtaining a target video based on the third video clip, the fourth video clip, and the second video clip, wherein a fifth timestamp $t_{q2}$ of a start frame of the third video clip is $t_{q2}=t_2-t_x$, wherein an end frame of the third video clip is a previous frame of the start frame of the first video clip, wherein a start frame of the fourth video clip is a next frame of the end frame of the first video clip, wherein a sixth timestamp $t_{s2}$ of an end frame of the fourth video clip is $t_{s2}=t_3+t_y$, wherein the third video clip comprises an image with a seventh timestamp that is greater than $t_{q2}$ and that is less than $t_2$, wherein the fourth video clip comprises an image with an eighth timestamp that is greater than $t_3$ and that is less than $t_{s2}$, and wherein $t_x$ and $t_y$ are the same or different.

12. The slow-motion video shooting method of claim 11, wherein obtaining the target video comprises performing, when a collection frame rate of the video stream is greater than a play frame rate of the target video, sampling on the third video clip and the fourth video clip to obtain a fifth video clip and a sixth video clip, wherein a first ratio of a frame quantity of the fifth video clip to a frame quantity of the third video clip is equal to a second ratio of a play frame rate of the target video to the collection frame rate, wherein a third ratio of a frame quantity of the sixth video clip to a frame quantity of the fourth video clip is equal to a fourth ratio of the play frame rate of the target video to the collection frame rate, wherein the target video comprises the second video clip, the fifth video clip, and the sixth video clip, and wherein the second video clip, the fifth video clip, and the sixth video clip are temporally consecutive.

13. The slow-motion video shooting method of claim 4, further comprising:
   obtaining the third timestamp $t_3$; and
   subsequent to obtaining the third timestamp $t_3$, determining a first moment for ending slow-motion video recording,
   wherein either:
      the first moment is $t_4$, wherein $t_4=t_3+t'$, and wherein $t'$ is a preset duration; or
      the first moment is a moment after an instruction of a user for stopping slow-motion video recording is received, and wherein the moment is before $t_4$.

14. The slow-motion video shooting method of claim 1, wherein before determining the first video clip, the slow-motion video shooting method further comprises:
   obtaining, when a slow-motion video recording function is enabled or after the slow-motion video recording function is enabled, a detection image from the video stream; and
   detecting that a second main object in the detection image is a person or a non-human object.

15. An electronic device, comprising:
   a memory configured to store instructions; and
   one or more processors coupled to the memory and configured to execute the instructions to cause the electronic device to:
      detect that a preset motion has occurred on a main object in a video stream having a collection frame rate;
      determine a first video clip in the video stream based on the preset motion;
      determine a first frame rate based on the preset motion, wherein the first frame rate is different from the collection frame rate; and
      process the first video clip based on the first frame rate to obtain a second video clip, wherein to process the first video clip, the one or more processors are further configured to cause the electronic device to:
         perform, when the first frame rate is greater than the collection frame rate, frame interpolation on the first video clip to obtain the second video clip; and
         perform, when the first frame rate is less than the collection frame rate, sampling on the first video clip to obtain the second video clip, wherein a first ratio of a first frame quantity of the second video clip to a second frame quantity of the first video clip is equal to a second ratio of the first frame rate to the collection frame rate,
      wherein a play time of the second video clip at a target play frame rate is greater than a collection time of the first video clip, and
      wherein the first frame rate is greater than the target play frame rate.

16. The electronic device of claim 15, wherein the main object is a non-human object, and wherein the one or more processors are further configured to cause the electronic device to detect that displacement of the non-human object occurs in a shooting scene.

17. The electronic device of claim 15, wherein the main object is a person, and wherein the one or more processors are further configured to cause the electronic device to detect that the person makes a target posture in a shooting scene.

18. The electronic device of claim 15, wherein the one or more processors are further configured to cause the electronic device to determine the first video clip by causing the electronic device to:
   obtain a first target image from the video stream, wherein the first target image corresponds to a moment at which the main object has largest acceleration in a process of the preset motion;
   obtain a first timestamp $t_{w1}$ of the first target image; and
   obtain the first video clip from the video stream based on the first timestamp $t_{w1}$ and a time span t of the first video clip, wherein a second timestamp $t_2$ of a start frame of the first video clip is $t_2=t_{w1}-at$, wherein a third timestamp $t_3$ of an end frame of the first video clip is $t_3=t_{w1}+bt$, wherein a and b are constants, wherein $a+b=1$, and wherein the first video clip comprises an image with a fourth timestamp that is not less than $t_2$ and that is not greater than $t_3$.

19. A computer program product comprising instructions that are stored on a non-transitory computer-readable medium and that, when executed by one or more processors, cause an electronic device to:
   detect that a preset motion has occurred on a main object in a video stream having a collection frame rate;
   determine a first video clip in the video stream based on the preset motion;
   determine a first frame rate based on the preset motion, wherein the first frame rate is different from the collection frame rate; and
   process the first video clip based on the first frame rate to obtain a second video clip, wherein to process the first video clip, the one or more processors are further configured to cause the electronic device to:
      perform, when the first frame rate is greater than the collection frame rate, frame interpolation on the first video clip to obtain the second video clip; and
      perform, when the first frame rate is less than the collection frame rate, sampling on the first video clip to obtain the second video clip, wherein a first ratio of a first frame quantity of the second video clip to a second frame quantity of the first video clip is equal to a second ratio of the first frame rate to the collection frame rate, wherein a play time of the second video clip at a target play frame rate is greater than a collection time of the first video clip, and wherein the first frame rate is greater than the target play frame rate.

20. The computer program product of claim 19, wherein the collection frame rate is a rate at which an image sensor or a camera of an electronic device collects images.

* * * * *

UNITED STATES PATENT AND TRADEMARK OFFICE
CERTIFICATE OF CORRECTION

PATENT NO. : 12,361,711 B2  
APPLICATION NO. : 17/699510  
DATED : July 15, 2025  
INVENTOR(S) : Rui Chen et al.

Page 1 of 1

It is certified that error appears in the above-identified patent and that said Letters Patent is hereby corrected as shown below:

In the Claims

Claim 7, Column 40, Line 47: "at+bt+$t_{s1}$-$t_{q1}$-t, and" should read "at+bt+$t_{s1}$-$t_{q1}$=t, and"

Signed and Sealed this  
Nineteenth Day of August, 2025

Coke Morgan Stewart  
*Acting Director of the United States Patent and Trademark Office*